(12) United States Patent
Storey et al.

(10) Patent No.: US 9,315,595 B2
(45) Date of Patent: Apr. 19, 2016

(54) AMINE-TERMINATED TELECHELIC POLYMERS AND PRECURSORS THERETO AND METHODS FOR THEIR PREPARATION

(71) Applicants: Chevron Oronite Company LLC, San Ramon, CA (US); The University of Southern Mississippi, Hattiesburg, MS (US)

(72) Inventors: Robson F. Storey, Hattiesburg, MS (US); Casey D. Stokes, Belle Chasse, LA (US); James J. Harrison, Novato, CA (US); Nemesio Martinez-Castro, Bristol, PA (US)

(73) Assignees: Chevron Oronite Company LLC, San Ramon, CA (US); The University of Southern Mississippi, Hattiesburg, MS (US)

( * ) Notice: Subject to any disclaimer, the term of this patent is extended or adjusted under 35 U.S.C. 154(b) by 377 days.

(21) Appl. No.: 14/040,256

(22) Filed: Sep. 27, 2013

(65) Prior Publication Data

US 2014/0031497 A1 Jan. 30, 2014

Related U.S. Application Data

(62) Division of application No. 12/415,829, filed on Mar. 31, 2009, now Pat. No. 8,552,122.

(51) Int. Cl.
*C08F 8/30* (2006.01)
*C10L 1/238* (2006.01)
*C10L 10/04* (2006.01)
*C10L 10/06* (2006.01)
*C10M 133/58* (2006.01)

(52) U.S. Cl.
CPC . *C08F 8/30* (2013.01); *C10L 1/238* (2013.01); *C10L 10/04* (2013.01); *C10L 10/06* (2013.01); *C10M 133/58* (2013.01); *C08F 2810/40* (2013.01); *C10M 2215/30* (2013.01); *C10N 2230/04* (2013.01); *C10N 2230/041* (2013.01); *C10N 2270/00* (2013.01)

(58) Field of Classification Search
CPC ........ C08F 8/30; C08F 2810/40; C10L 1/238; C10L 10/04; C10L 10/06; C10M 133/58; C10M 2215/30; C10N 2230/04; C10N 2230/041; C10N 2270/00
USPC ........................................ 525/375, 333.7, 371
See application file for complete search history.

(56) References Cited

U.S. PATENT DOCUMENTS

| | | |
|---|---|---|
| 3,632,600 A | 1/1972 | Morris et al. |
| 3,756,793 A | 9/1973 | Robinson et al. |
| 4,191,537 A | 3/1980 | Lewis et al. |
| 4,342,849 A | 8/1982 | Kennedy |
| 4,486,572 A | 12/1984 | Kennedy |
| 4,758,631 A | 7/1988 | Kennedy et al. |
| 4,814,405 A | 3/1989 | Kennedy |
| 4,910,321 A | 3/1990 | Kennedy et al. |
| 4,943,616 A | 7/1990 | Mishra et al. |
| 4,946,899 A | 8/1990 | Kennedy et al. |
| 5,004,478 A | 4/1991 | Vogel et al. |
| 5,032,653 A | 7/1991 | Cheradame et al. |
| 5,122,572 A | 6/1992 | Kennedy et al. |
| 5,169,914 A | 12/1992 | Kaszas et al. |
| 5,225,492 A | 7/1993 | Kennedy et al. |
| 5,340,881 A | 8/1994 | Kennedy et al. |
| 5,350,819 A | 9/1994 | Shaffer |
| 5,395,885 A | 3/1995 | Kennedy et al. |
| 5,444,135 A | 8/1995 | Cheradame et al. |
| 5,448,000 A | 9/1995 | Gullapalli et al. |
| 5,451,647 A | 9/1995 | Faust et al. |
| 5,506,316 A | 4/1996 | Shaffer |
| 5,580,935 A | 12/1996 | Shaffer |
| 5,629,394 A | 5/1997 | Cheradame et al. |
| 5,663,470 A | 9/1997 | Chen et al. |
| 5,690,861 A | 11/1997 | Faust |
| 5,777,044 A | 7/1998 | Faust |
| 5,945,491 A | 8/1999 | Matyjaszewski et al. |

(Continued)

FOREIGN PATENT DOCUMENTS

| | | |
|---|---|---|
| EP | 0206756 | 6/1986 |
| EP | 0341012 | 11/1989 |
| EP | 0356726 | 3/1990 |
| EP | 0382159 | 8/1990 |
| EP | 0397081 | 11/1990 |
| SU | 293804 | 1/1970 |
| WO | WO 99/09074 | 2/1999 |

OTHER PUBLICATIONS

Cirpan et al., "Synthesis and electroactivity of pyrrole end-functionalized poly(2-methyl-2-oxazoline)," European Polymer Journal 37, 2225-2229, 2001.

(Continued)

*Primary Examiner* — Bijan Ahvazi
*Assistant Examiner* — Chun-Cheng Wang
(74) *Attorney, Agent, or Firm* — Jones Day

(57) ABSTRACT

Disclosed is a method of preparing terminally functionalized telechelic polymers using a cationic living polymer product or a terminal tert-chloride chain end of a carbocationic quasiliving polymer product, which comprises quenching the polymer product with a functionalized N-substituted pyrrole to thereby introduce the functionalized N-substituted pyrrole at the terminal reactive polymer chain end(s). A method is also disclosed whereby the N-substituent may be derivatized to a basic amine containing functional group. Also disclosed are the terminal functionalized polyisobuyl N-substituted pyrrole compounds where the polyisobutyl group is substituted at the 2 and 3 position of the N-substituted pyrrole.

36 Claims, 21 Drawing Sheets

(56) References Cited

U.S. PATENT DOCUMENTS

| | | | |
|---|---|---|---|
| 6,033,446 | A | 3/2000 | Cherpeck et al. |
| 6,194,597 | B1 | 2/2001 | Faust et al. |
| 6,407,066 | B1 | 6/2002 | Dressen et al. |
| 6,515,083 | B2 | 2/2003 | Ozawa et al. |
| 6,602,965 | B1 | 8/2003 | Terazawa et al. |
| 6,642,318 | B1 | 11/2003 | Chiefari et al. |
| 6,753,391 | B1 | 6/2004 | Lewandowski et al. |
| 6,818,716 | B2 | 11/2004 | Wendland et al. |
| 6,969,744 | B2 | 11/2005 | Stokes et al. |
| 7,576,161 | B2 | 8/2009 | Stokes |
| 8,394,898 | B2 | 3/2013 | Storey et al. |
| 2004/0260033 | A1* | 12/2004 | Stokes .................. C08F 2/38 525/375 |
| 2006/0041081 | A1 | 2/2006 | Stokes et al. |
| 2006/0264577 | A1 | 11/2006 | Faust et al. |
| 2011/0028681 | A1 | 2/2011 | Storey et al. |

OTHER PUBLICATIONS

Faust et al., "Living carbocationic polymerization. XXI. Kinetic and mechanistic studies of isobutylene polymerization initiated by trimethylpentyl esters of different acids," J. Macromol. Sci.—Chem., A27(6), 649-667, 1990.

Fodor et al., "Synthetic applications of non-polymerizable monomers in living carbocationic polymerizations," Polymer Reprints 35, 492-493, 1994.

Hadjikyriacou et al., "Cationic macromolecular design and synthesis using furan derivatives," Macromolecules, 32, 6393-6399, 1999.

Hadjikyriacou et al., "Living coupling reaction in living cationic polymerization. 3. Coupling reaction of living polyisobutylene using bis(furanyl) derivatives," Macromolecules, 33, 730-733, 2000.

Hadjikyriacou et al., "Living coupling reaction in living cationic polymerization. 4. Synthesis of telechelic polyisobutylenes using bis-furanyl derivatives as coupling agents," J.M.S.—Pure Appl. Chem. A37, 1333-1352, 2000.

Ivan et al., "Living carbocationic polymerization. XXX. One-pot synthesis of allyl-terminated linear and tri-arm star polyisobutylenes, and epoxy- and hydroxy-telechelics therefrom," J. Polymer Sci. Part A. Polymer Chem. 28, 89-104, 1990.

Keaton, "Living Ziegler-Natta polymerization," http://www.organicdivision.org/ama/orig/Fellowship/2002_2003_Awardees/Essays/keaton.pdf.

Kennedy et al., "Living carbocationic polymerization. XXXIX. Isobutylene polymerization in the presence of pyridine and various other electron donors," J. Macromol. Sci.—Chem. A28, 197-207, 1991.

Koroskenyl et al., "Initiation via haloboration in living cationic polymerization. 6. A novel method for the synthesis of primary amine functional polyisobutylenes," Pure Appl. Chem., A36(12), 1879-1893, 1999.

Machl et al., "Novel synthetic routes to aminfunctionalized polyisobutylenes," Polymer Reprints 44(2), 858-859, 2003.

Martinez-Castro et al., "Primary halide-terminated polyisobutylene: End-quenching of quasiliving carbocationic polymerization with N-(w-haloalkyl)pyrrole," Macromolecules 42, 4963-4971. 2009.

Morgan et al., "Primary hydroxy-terminated polyisobutylene via end-quenching with a protected N-(w-hydroxyalkyl)pyrrole," Macromolecules 43, 1329-1340, 2010.

Percec et al., "New telechelic polymers and sequential copolymers by polyfunctional initiator-transfer agents (Inifers) 29. Synthesis of α,ω-di(amino)polyisobutylenes," Polymer Bulletin 9, 27-32, 1983.

Roth et al., "A novel method of the determination of propagation rate constants: Carbocationic oligomerization of isobutylene," Macromolecules, 29(19), 6104-6109, 1996.

Sawamoto et al., "End-functionalized polymers by living cationic polymerization. 1. Mono- and bifunctional poly(vinyl ethers) with terminal malonate or carboxyl groups," Macromolecules, 20, 1-6, 1987.

Simison et al., "End-quenching of quasiliving carbocationic isobutylene polymerization with hindered bases: Quantitative formation of exo-olefin-terminated polyisobutylene," Macromolecules, 39, 2481-2487, 2006.

Storey et al., "N-Methylpyrrole-terminated polyisobutylene through end-quenching of quasiliving carbocationic polymerization," Macromolecules, 38, 4618-4624, 2005.

Notice of Allowability mailed Aug. 11, 2005, U.S. Appl. No. 10/600,898.

Office Action mailed Apr. 1, 2008, U.S. Appl. No. 11/186,157.
Office Action mailed Oct. 20, 2008, U.S. Appl. No. 11/186,157.
Office Action mailed Feb. 20, 2009, U.S. Appl. No. 11/186,157.

* cited by examiner

AMINE-TERMINATED TELECHELIC POLYMERS AND PRECURSORS THERETO AND METHODS FOR THEIR PREPARATION

CROSS REFERENCE TO RELATED APPLICATION(S)

This application is a divisional application of U.S. application Ser. No. 12/415,829, filed Mar. 31, 2009; the disclosure of which is incorporated herein by reference in its entirety.

FIELD

Provided herein are methods for producing telechelic polymers through cationic polymerization of a suitable monomer under living polymerization conditions and quenching the polymerization with an N-substituted pyrrole. The N-substituent contains a functional group that may be derivatized to basic amines. These polymers containing functional N-substituted pyrroles may be employed as soft segments for block copolymers and crosslinked network polymers and as fuel additives and/or lubricating additives. For example, in a fuel composition or lubricating oil composition, such an additive is particularly useful as a detergent-dispersant. Provided herein are polyisobutyl N-substituted pyrroles prepared via carbocationic polymerization.

BACKGROUND

While almost all monomers containing carbon-carbon double bonds undergo radical polymerization, ionic polymerization is highly selective. This is due in part to the stability of the propagating species. Cationic polymerization involves carbenium ions and is essentially limited to those monomers with an electron releasing substituent such as alkoxy, phenyl, vinyl and 1,1-dialkyl; while anionic polymerization involves carbanions and requires monomers possessing electron withdrawing groups such as nitrile, carboxyl, phenyl and vinyl.

Compared to carbanions, which maintain a full octet of valence electrons, carbenium ions are deficient by two electrons and are much less stable and therefore, controlled cationic polymerization requires specialized systems. The instability or high reactivity of the carbenium ions facilitates undesirable side reactions such as bimolecular chain transfer to monomer, β-proton elimination, and carbenium ion rearrangement, all of which limit the control over the cationic polymerization. Typically, low temperatures are necessary to suppress these reactions. Additionally, other considerations such as stabilization of the propagating centers (typically by appropriate choice of counterion and solvent system), use of additives to suppress ion-pair dissociation and undesirable protic initiation, and the use of high-purity reagents to prevent the deactivation of the carbenium by heteroatomic nucleophiles (such as alcohols or amines) are often required. However, if one carefully selects the system, cationic polymerization can display living characteristics.

Through these living cationic systems, cationic polymerization can be controlled to yield tailored polymers with narrow molecular weight distributions and precisely controlled molecular weight, micro-architecture, and end group functionality. Controlled cationic polymerizations are deemed to be achieved under conditions in which chain end termination is reversible (quasiliving conditions) and undesirable reactions such as chain transfer and water-initiation are suppressed. A tremendous advantage of living and quasiliving polymerization is the opportunity for direct synthesis of telechelic polymers by one-pot in situ functionalization of the polymer by reaction of the living chain ends with an appropriate quenching reagent. Historically, telechelic polymer synthesis has often required one or more post-polymerization reactions to convert the chain ends to the desired functional group. For example, Kennedy et al. (Percec, V.; Guhaniyogi, S. C.; Kennedy, J. P. *Polym. Bull.* 1983, 9, 27-32) synthesized primary amine-terminated polyisobutylene using the following sequence of end-group transformations: 1) tert-alkyl chloride to exo olefin using potassium tert-butoxide, 2) exo olefin to primary alcohol using hydroboration/oxidation, 3) primary alcohol to primary tosylate using tosyl chloride, 4) primary tosylate to primary phthalimide using potassium phthalimide, and finally 5) primary phthalimide to primary amine using hydrazine. More recently, Binder et al. (Machl, D.; Kunz, M. J.; Binder, W. H. *ACS Div. Polym. Chem., Polym. Preprs.* 2003, 44(2), 858-859) quenched living polymerization of isobutylene with 1-(3-bromopropyl)-4-(1-phenylvinyl)benzene, and then carried out a series of post-polymerization reactions on the product to obtain amine-terminated PIBs. However, the resulting end group structures were complex and bulky and very different from those disclosed herein, and the functionalization of the end groups was less than quantitative. Commercial functionalization of oil and fuel additive polymers has also been a complex multi-step process. For example, polyisobutylene-based oil dispersants are typically produced by first polymerizing isobutylene (IB) to form an olefin-terminated polyisobutylene (PIB), reacting the PIB with maleic anhydride to form PIB-succinic anhydride (PIBSA), and then reacting PIBSA with a polyamine to form a PIB-succinimide amine. In total, the dispersant requires three synthetics steps; each stage requires separate reaction conditions and exhibits less than 100% yield. Commercial implementation of in situ functionalization could reduce the time, energy, and overall cost associated with the production of oil and fuel additives.

Living polymerization refers to any polymerization during which propagation proceeds with the exclusion of termination and chain transfer and thus yields polymers retaining (virtually indefinitely) their ability to add further monomer whenever it is supplied to the system. This description is often too rigorous for actual systems and is approximated herein by quasiliving carbocationic polymerization (QLCCP), which includes chain growth polymerizations that proceed in the absence of irreversible chain breaking mechanisms during the effective lifetime of monomer consumption.

With the advent of carbocationic living polymerization and QLCCP, there have been attempts to functionalize these living polymers. The extent of success of these attempts has been directly linked to the type of monomer being polymerized. Simple one pot (or in situ) chain end functionalization of more reactive carbocationic monomers, like isobutyl vinyl ether, can occur using ionic nucleophilic quenching reagents, i.e. methanol, alkyl lithium etc. (see, e.g., Sawamoto, M.; Enoki, T.; Higashimura, T. *Macromolecules* 1987, 20, 1-6). However chain end functionalization does not occur when these reagents are added to living polymerization of less reactive monomers such as isobutylene (see, e.g.: Ivan, B.; Kennedy, J. P. *J. Polym. Sci.: Part A: Polym. Chem.* 1990, 28, 89-104; Fodor, Zs.; Hadjikyriacou, S.; Li, D.; Faust, R. *ACS Div. Polym. Chem., Polym Preprs.* 1994, 35(2), 492-493). Addition of these reagents at the end of polymerization resulted in the consumption of the catalyst and the formation of tert-alkyl chloride chain ends on the polyisobutylene (PIB) rather than the desired nucleophilic substitution. This represented a trivial result since QLCCP of IB produces tert-chloride end groups anyway, as a direct consequence of the inherent, reversible termination mechanism in these polymerization systems. The accepted rationale is that quasiliving PIB is composed primarily of dormant (reversibly terminated) chains. Thus, most added reagents, particularly strong nucleophiles, quench the Lewis acid co-initiator and therefore yield only the tert-chloride chain end. Tert-chloride groups are not useful in nucleophilic substitution reactions, because the elimination product is usually obtained instead. Tert-chloride groups are also often undesirable as a dispersant/detergent for lubricants and fuels due to environmental reasons and since their presence may decrease the effectiveness of controlling soot and other engine contaminants. Additionally, tert-chloride groups tend to decompose, liberating HCl, which is corrosive toward metal surfaces within the engines.

The most notable exception to the above general rule was the discovery that allyltrimethylsilane (ATMS), when added in excess to living polyisobutylene, does not react with the Lewis acid but rather is alkylated by the PIB chain end, thereby providing living PIB with allylic ends groups in situ, U.S. Pat. No. 4,758,631. A related U.S. Pat. No. 5,580,935 teaches the use of alkylsilylpseudohalides as quenching agents, thereby adding to the choice of chemistries. However, functionalization of cationic polymers in situ with suitable nitrogen compounds for use in dispersants and/or detergents has been elusive. Based upon the success of ATMS, Faust et al. investigated 2-substituted furan derivatives and found that quantitative reaction with quasiliving PIB chain ends could be achieved in both titanium tetrachloride (TiCl$_4$) and BCl$_3$ co-initiated systems (*Macromolecules* 1999, 32, 6393, and *J. Macromol., Sci Pure Appl. Chem.* 2000, A37, 1333. Similarly, Ivan in WO 99/09074 disclosed quenching quasiliving PIB with furan derivatives and thiophene derivatives while postulating that any aromatic ring, including 5-7 membered heterocycles as well as optionally substituted moieties could be employed to quench and effectively functionalize QLCP PIB through electrophilic aromatic substitution. We have found that there is particularity of the aromatic ring, the substituent group on the ring, as well as the position of the substituent group on the ring. Incorrect selection of the aromatic ring or substituent, such as substituents which contain certain nucleophile segments (such as —OH, —NH$_2$) can deactivate the catalyst and render the PIB chain end unaffected and carrying only tert-chloride end groups, or in certain circumstances, couple the quasiliving polymer. U.S. Pat. No. 6,969, 744 discloses that high yields of monodisperse telechelic polymers can be produced by cationic polymerization of a suitable monomer under living polymerization conditions, followed by quenching the polymerization with an N-substituted pyrrole. The resulting telechelic polymers contain a tertiary nitrogen atom whose lone pair of electrons take part in the aromatic sextet of electrons in the 5-membered, aromatic pyrrole ring. However, the latter patent fails to disclose functional groups within the N-substituent of the N-substituted pyrrole that are readily converted to functional groups containing basic nitrogen.

SUMMARY

Described herein are methods for producing telechelic polymers through cationic polymerization of a suitable monomer under living polymerization conditions and quenching the polymerization with an N-substituted pyrrole. The N-substituent contains a functional group that may be derivatized to basic amine. Particularly, the methods described herein are directed to functionalization of a living or quasiliving polymer product by reacting and covalently bonding a functionalized N-substituted pyrrole to the carbocationic propagating center. Surprisingly, a functionalized N-substituted pyrrole employed as quenching agent to a living polymer or quasiliving polymer system can produce high amounts of monofunctional polymers having a single terminal N-substituted pyrrole group. Additionally, bi- and multifunctional terminal N-substituted pyrrole groups can be formed depending on the functionality and micro-architecture of the living polymer. This method can be carried out with substantially no EAS coupling and, in some embodiments, less than 10 weight percent EAS coupling based upon total polymer produced. The N-substituent of the N-substituted pyrrole can be substituted with functional groups that do not complex with the catalyst system and are amenable to further reaction for the introduction of basic amine.

Accordingly, disclosed is a method for preparing a telechelic polymer of the formula I:

formula I

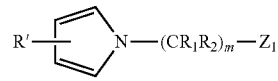

wherein:
R$_1$ and R$_2$ are, independently in each —(CR$_1$R$_2$)— unit, hydrogen or alkyl from 1 to 6 carbon atoms;
m is an integer from 2 to 20;
Z$_1$ is —F, —Cl, —Br, —I, —At, —CN, —NC, —N$_3$, —NCO, —OCN, —NCS or —SCN; and
R' is a monovalent polyolefin group;
comprising
a) ionizing a polyolefin in the presence of a Lewis acid or mixture of Lewis acids to form a carbocation-terminated polyolefin;
b) reacting the carbocation-terminated polyolefin from step (a) with an N-substituted pyrrole of formula II:

formula II

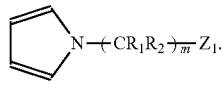

In some embodiments, R$_1$ and R$_2$ are selected so that the carbon adjacent to Z$_1$ has at least one hydrogen. In some embodiments, R$_1$ and R$_2$ are selected so that the carbon adjacent to Z$_1$ is a —CH$_2$— group. In some embodiments, R$_1$ and R$_2$ in each —(CR$_1$R$_2$)— unit are hydrogen. In some embodiments, m is an integer from 2 to 6 and R$_1$ and R$_2$ in each —(CR$_1$R$_2$)— unit are hydrogen.

In some embodiments, Z$_1$ is —F, —Cl, —Br, —I, —CN, —NC, —N$_3$, —NCO, —OCN, —NCS or —SCN. In some embodiments, Z$_1$ is —Cl, —Br, —I, —CN, or —N$_3$. In some embodiments, Z$_1$ is —Br, —CN, or —N$_3$.

The methods described herein can be used for the manufacture and synthesis of telechelic polymers with —F, —Cl, —Br, —I, —At, —CN, —NC, —N$_3$, —NCO, —OCN, —NCS or —SCN attached to the polymer via an N-substituted pyrrole linkage. Accordingly, another aspect of the methods provided herein is directed to the product produced by this method.

This method can have a further step of contacting the resulting product formed above with a reagent or reagents in order to transform, displace, or react with, Z$_1$ in a manner such as to create compounds of formula III.

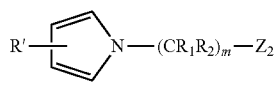

formula III wherein:
$R_1$ and $R_2$ are, independently in each —$(CR_1R_2)$— unit, hydrogen or alkyl from 1 to 6 carbon atoms;
R' is a monovalent polyolefin group;
m is an integer from 2 to 20; and
$Z_2$ is —$NR_4R_5$, —$N[(R_4)(COR_5)]$, —$N[(COR_4)(COR_5)]$, polyamino, polyamidoamino, polyaminoamido, —$OR_6$, a polyether group, polyetheramino, or —$COOR_6$;
  wherein $R_4$ and $R_5$ are each, independently, hydrogen, alkyl, or aryl; and $R_6$ is hydrogen, alkyl, aryl, alkaryl, or aralkyl.

In some embodiments, $Z_1$ can be displaced by a halide or pseudohalide prior to said further step.

In one embodiment, the reagent is a nucleophile, such as an amine, amide, imide, etc., in which case $Z_1$ is displaced to introduce a nitrogen group on the telechelic polymer. In another embodiment, the reagent is a reducing agent which is capable of reducing $Z_1$, such as —$N_3$ or —CN to provide a basic nitrogen group on the telechelic polymer; for example, the reagent could be a hydrogenation agent used under reactive conditions. In some embodiments, provided herein are the products produced according to the methods described herein, including the products produced according to the further step of contacting the resulting product formed above with the reagent or reagents.

Suitable quasiliving polymer products having terminal tert-chloride chain end(s) can be pre-made by various methods. In some embodiments, these quasiliving polymer products can be made in situ, thus leading to one-pot functionalization reactions. In some embodiments, the quasiliving polymer is formed by contacting at least one cationically polymerizable monomer with an initiator, in the presence of a Lewis acid and solvent under suitable quasiliving polymerization reaction conditions. Suitable cationically polymerizable monomers can be a single monomer, such that the quasiliving polymer product is a homopolymer; or selected from at least two cationically monomers, such that the quasiliving polymer product is a copolymer. In some embodiments, at least one cationically polymerizable monomer is selected from the group consisting of isobutylene, 2-methyl-1-butene, 3-methyl-1-butene, 4-methyl-1-pentene, beta-pinene, isoprene, butadiene, and styrene, p-methylstyrene, vinyl toluene, α-methylstyrene, p-chlorostyrene, p-acetoxystryene, and similar styrenic monomers. In some embodiments, the Lewis acid is $TiCl_4$. In some embodiments, the quasiliving polymer is then quenched with the N-substituted pyrrole of formula I after about 98 percent monomer conversion and prior to significant aging, which can lead to undesired side reactions. The initiator, as the name implies, provides a suitable propagation center to begin the cationic polymerization. Thus the initiator can be monofunctional, having one such propagation center, difunctional, having two propagation centers, or multifunctional, which can lead to the formation of star polymers. In some embodiments, the initiator is monofunctional or difunctional. Monofunctional initiators include, but are not limited to, 2-chloro-2-phenylpropane; 2-acetoxy-2-phenylpropane; 2-propionyloxy-2-phenylpropane, 2-methoxy-2-phenylpropane, 2-ethoxy-2-phenylpropane, 2-chloro-2,4,4-trimethylpentane, 2-acetoxy-2,4,4,-trimethylpentane, 2-propionyloxy-2,4,4-trimethylpentane, 2-methoxy-2,4,4-trimethylpentane, 2-ethoxy-2,4,4-trimethylpentane, and functionally similar compounds. In some embodiments, the monofunctional initiator is 2-chloro-2,4,4-trimethylpentane. In some embodiments, the monofunctional initiator is 2-chloro-2,4,4-trimethylpentane when a single monomer such as isobutylene is used. Difunctional initiators include, but are not limited to, 1,3-di(1-chloro-1-methylethyl)-5-tert-butylbenzene, 1,3-di(1-acetoxy-1-methylethyl)-5-tert-butylbenzene, 1,3-di(1-propionyloxy-1-methylethyl)-5-tert-butylbenzene, 1,3-di(1-methoxy-1-methylethyl)-5-tert-butylbenzene, 1,3-di(1-ethoxy-1-methylethyl)-5-tert-butylbenzene, 1,4-di(1-chloro-1-methylethyl)benzene, 1,4-di(1-acetoxy-1-methylethyl)benzene, 1,4-di(1-propionyloxy-1-methylethyl)benzene, 1,4-di(1-methoxy-1-methylethyl)benzene, 1,4-di(1-ethoxy-1-methylethyl)benzene, 2,6-dichloro-2,4,4,6-tetramethylheptane, 2,6-diacetoxy-2,4,4,6-tetramethylheptane, 2,6-dipropionyloxy-2,4,4,6-tetramethylheptane, 2,6-dimethoxy-2,4,4,6-tetramethylheptane, 2,6-diethoxy-2,4,4,6-tetramethylheptane, and functionally similar compounds. In some embodiments, the difunctional initiator is 1,3-di(1-chloro-1-methylethyl)-5-tert-butylbenzene or 2,6-dichloro-2,4,4,6-tetramethylheptane. In some embodiments, the difunctional initiator is 1,3-di(1-chloro-1-methylethyl)-5-tert-butylbenzene or 2,6-dichloro-2,4,4,6-tetramethylheptane when a single monomer such as isobutylene is used.

In some embodiments, a class of products produced in accordance with the methods disclosed herein can be characterized by having a narrow molecular weight distribution Mw/Mn of less than 1.5, or, in other embodiments less, than about 1.2.

The method described above can be used for the manufacture and synthesis of telechelic polymers with terminal groups containing basic nitrogen or oxygen attached to the polymer via an N-substituted pyrrole linkage. Accordingly, provided herein are the products produced by the methods described herein.

In some embodiments, provided herein are compounds of formula IV:

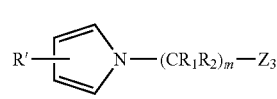

formula IV wherein:
$R_1$ and $R_2$ are, independently in each —$(CR_1R_2)$— unit, hydrogen or alkyl from 1 to 6 carbon atoms;
R' is a monovalent polyolefin group;
m is an integer from 2 to 20; and
$Z_3$ is $Z_1$ or $Z_2$ as defined above.

In some embodiments, $R_1$ and $R_2$ of formula IV are selected so that the carbon adjacent to $Z_3$ has at least one hydrogen. In some embodiments, $R_1$ and $R_2$ of formula IV are selected so that the carbon adjacent to $Z_3$ is a —$CH_2$— group. In some embodiments, $R_1$ and $R_2$ in each —$(CR_1R_2)$— unit are hydrogen. In some embodiments, m is an integer from 2 to 4 and $R_1$ and $R_2$ in each —$(CR_1R_2)$— unit are hydrogen.

In some embodiments, n is an integer from about 2 to 1000. In some embodiments, n is 3 to 500. In some embodiments, n is 4 to 260. In some embodiments, compounds for use in fuel additives are when n is from 4 to about 20 and for as dispersants and lubricating additives when n is from 6 to about 50 and when used as a viscosity index improver then n is typically from 140 to about 260.

In some embodiments, $Z_3$ is Br, CN, and $N_3$; or $NR_4R_5$, wherein $R_4$ and $R_5$ are independently selected from the group of hydrogen, alkyl, aryl, alkaryl, aralkyl; and $OR_6$, wherein $R_6$ is selected from the group of hydrogen, alkyl, aryl, alkaryl, aralkyl; and polyamino.

Further provided herein are fuel compositions comprising a major amount of hydrocarbons boiling in the gasoline or diesel range and an effective deposit-controlling amount of the compound according to formula IV.

Another aspect of compounds described herein are compounds of formula V:

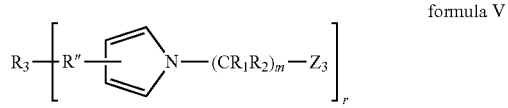

formula V wherein:
$R_1$ and $R_2$ are, independently in each —$(CR_1R_2)$— unit, hydrogen or alkyl from 1 to 6 carbon atoms;
$R_3$ is a monofunctional or polyfunctional carbocationic initiator residue of functionality r, where r can vary from 1 to 8;
R" is a divalent polyolefin group;
m is an integer from 2 to 20; and
$Z_3$ is $Z_1$ or $Z_2$ as defined above.

In some embodiments, $R_1$ and $R_2$ are selected so that the carbon adjacent to $Z_3$ has at least one hydrogen. In some embodiments, $R_1$ and $R_2$ are selected so that the carbon adjacent to $Z_3$ is a —$CH_2$— group. In some embodiments, $R_1$ and $R_2$ in each —$(CR_1R_2)$— unit are hydrogen. In some embodiments, m is an integer from 2 to 4 and $R_1$ and $R_2$ in each —$(CR_1R_2)$— unit are hydrogen.

In some embodiments, n is independently, in each of the r chain segments, an integer from about 1 to 1000. In some embodiments, n is independently, in each of the r chain segments, an integer from 2 to 500. In some embodiments, n is independently, in each of the r chain segments, an integer from 2 to 100.

In some embodiments, $Z_3$ is Br, CN, $N_3$; or $NR_4R_5$, wherein $R_4$ and $R_5$ are independently hydrogen, alkyl, aryl, alkaryl, aralkyl; or $OR_6$, wherein $R_6$ is selected from the group of hydrogen, alkyl, aryl, alkaryl, and aralkyl.

The polyisobutyl N-substituted pyrrole compounds of formula IV and formula V are typically mixtures having the PIB group attached to the N-substituted pyrrole at the 2 and/or 3 position of the pyrrole. The presence of $Z_1$ within the substituent group on the N-substituted pyrrole directs the product distribution toward a preponderance of the 3 isomer. The relative preponderance of the 3 isomer compared to the 2 isomer depends upon the reaction conditions as well as the identity of the $Z_1$ and its location within the substituent on the 1 position of the pyrrole. In some embodiments, the fraction of 3 isomer is 0.65 or higher. In some embodiments, the fraction of 3 isomer is 0.7 or higher. Additionally, suitable separation technologies such as chromatography, zone electrophoresis and the like can be employed to further refine the product. Accordingly, substantially 3-polyisobutyl N-substituted pyrrole can be formed. As used above, the term "substantially," in some embodiments, refers to having greater than 75% of the specified isomer or, in other embodiments, greater than 90%.

DETAILED DESCRIPTION

Figure 1:
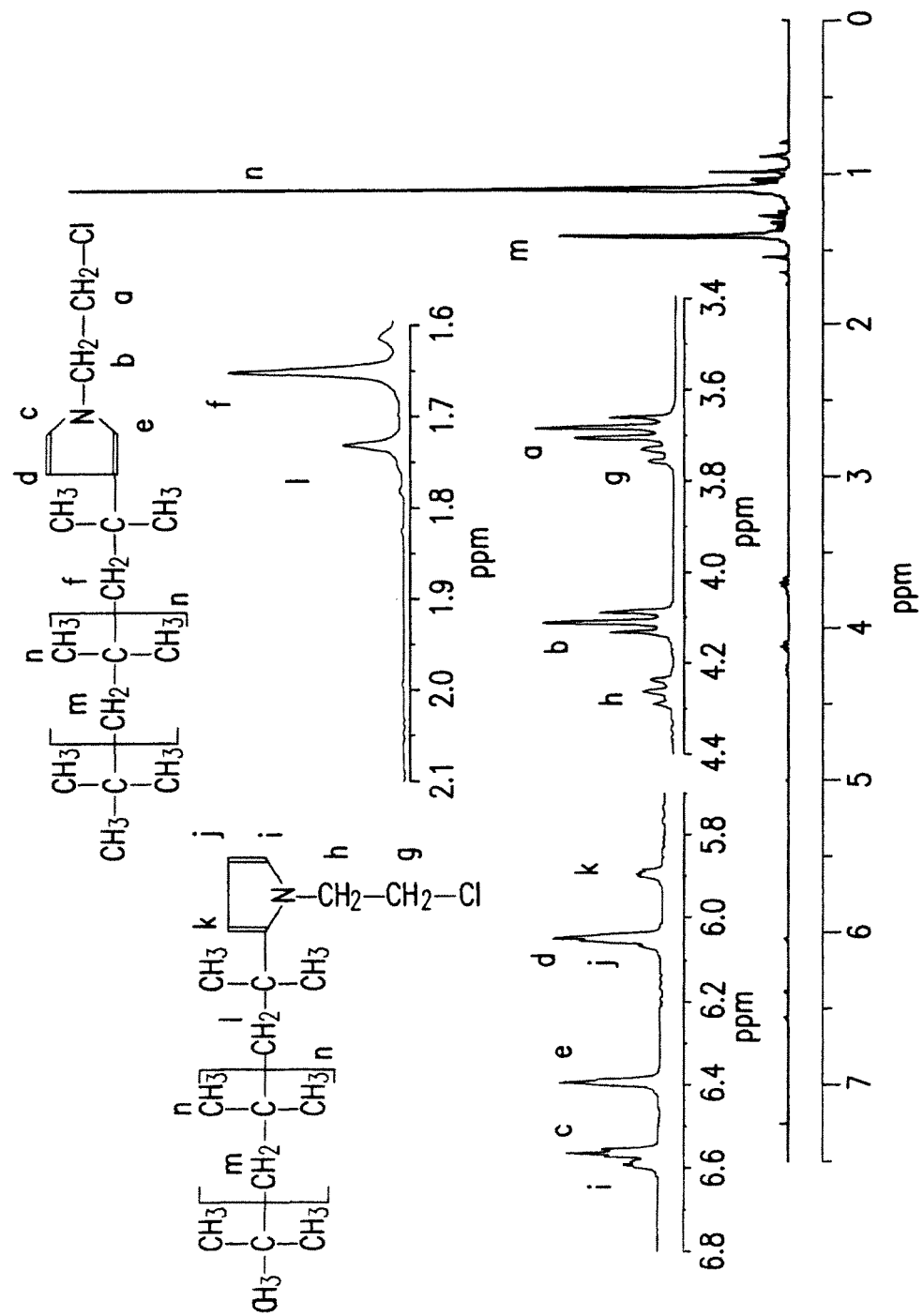
FIG. 1. shows the $^1H$ NMR spectrum of monofunctional PIB carrying primary chloride end groups prepared by quenching quasiliving PIB with 1-(2-chloroethyl)pyrrole. The product is a mixture of major and minor isomers with PIB in the 3- and 2-positions of the pyrrole ring, respectively. Expansion of the 1.6-2.1 region shows complete consumption of tert-chloride end groups as indicated by the absence of characteristic peaks at 1.96 and 1.68 ppm.

As used herein, the following terms have the following meanings.

The term "telechelic polymer" refers to polymers having one or more end groups wherein the end group has the capacity to react with another molecule or perform a specific function. Polymers having one reactive end group per molecule are said to be monofunctional. Polymers having two reactive chain ends per molecule are said to be difunctional. Polymers having more than two reactive chain ends per molecule are said to be multifunctional.

As used herein, "alkyl" refers to a uni-valent, saturated hydrocarbon chain or group of about 1 to about 20 carbons. In some embodiments, the alkyl group contains about 1 to about 15 carbons. In some embodiments, the alkyl group contains about 1 to about 10 carbons. In some embodiments, the alkyl group contains about 1 to about 8 carbons. In some embodiments, the alkyl group contains about 1 to about 6 carbons. In some embodiments, the alkyl group contains about 1 to about 3 carbons. In some embodiments, the alkyl group contains 1 to 2 carbons. In some embodiments, the alkyl group is primary. In some embodiments, the alkyl group is secondary. In some embodiments, the alkyl group is tertiary. In some embodiments, the alkyl is methyl, ethyl, n-propyl, isopropyl, isobutyl, n-butyl, sec-butyl, tert-butyl, isopentyl, neopentyl, tert-pentyl, or isohexyl. In some embodiments, the alkyl is methyl, ethyl, n-propyl, or isopropyl. In some embodiments, the alkyl is methyl. In some embodiments, the alkyl is tert-butyl. In some embodiments, the alkyl group is a straight hydrocarbon chain. In some embodiments, the alkyl group is a branched hydrocarbon chain. In some embodiments, the alkyl group is cyclic.

The term "alkoxy" refers to the group alkyl-O—. Alkoxy groups include, but are not limited to, methoxy, ethoxy, n-propoxy, iso-propoxy, n-butoxy, tert-butoxy, sec-butoxy, n-pentoxy, n-hexoxy, 1,2-dimethylbutoxy, and the like.

The term "alkenyl" refers to a monovalent branched or unbranched unsaturated hydrocarbon group having, in some embodiments, from 2 to 20 carbon atoms. In other embodiments, the alkenyl group has 2 to about 10 carbon atoms. In other embodiments, the alkenyl group has 2 to 6 carbon atoms. Is some embodiments, the alkenyl group has at least 1, and in other embodiments, from 1-2 sites of vinyl unsaturation. In some embodiments, the alkenyl group is ethenyl (—CH=CH$_2$), n-propenyl (—CH$_2$CH=CH$_2$), iso-propenyl (—C(CH$_3$)=CH$_2$), or the like.

As used herein, "aryl" refers to a univalent monocyclic or multicyclic aromatic group containing from 6 to about 30 carbons. In some embodiments, the aryl is monocyclic. In some embodiments, the aryl contains about 6 to about 15 carbons. In some embodiments, the aryl contains about 6 to about 10 carbons. In some embodiments, the aryl is fluorenyl, phenyl, naphthyl or anthyl. In some embodiments, the aryl is phenyl. In some embodiments, the aryl is substituted.

Unless otherwise constrained by the definition for the aryl substituent, such aryl groups can optionally be substituted with from 1 to 5 substituents, or, in some embodiments, 1 to 3 substituents selected from the group consisting of alkyl, alkoxy, acyl, alkylsulfanyl, alkylsulfonyl, alkyl sulfenyl, alkylcarbonyl, alkyoxycarbonyl, aminocarbonyl, aminocarbonylamino, halo, cyano, nitro, and the like.

As used herein, "EAS coupling" refers to ring alkylation of a single N-substituted pyrrole by two carbocation-terminated polyolefin chains.

The term "heteroaryl" refers to a univalent monocyclic or multicyclic aromatic group containing from 5 to 15 carbon atoms and 1 to 4 heteroatoms selected from oxygen, nitrogen, and sulfur within at least one ring. In some embodiments, the heteroaryl contains 5 to about 10 ring atoms. In some embodiments, the heteroaryl contains 5 or 6 ring atoms. In some embodiments, the heteroaryl is monocyclic. In some embodiments, the heteroatom is N, O, or S. In some embodiments, the heteroaryl contains one heteroatom. In some embodiments, the heteroaryl contains 1 to 3 N atoms. In some embodiments, the heteroaryl contains one O or S atom and one or two N atoms. Examples of "heteroaryl" used herein include, but are not limited to, furan, thiophene, pyrrole, imidazole, pyrazole, triazole, tetrazole, thiazole, oxazole, isooxazole, oxadiazole, thiadiazole isothiazole, pyridine, pyridazine, pyrazine, pyrimidine, quinoline, isoquinoline, benzofuran, benzothiophene, indole, indazole, and the like.

The term "halide" refers to a univalent fluoride, chloride, bromide, iodide, or astatide radical.

As used herein, "polyolefin group" refers to a polyolefin substituent. In some embodiments, the polyolefin group is a polyisobutyl group or a polyisobutylene group.

As used herein, "isobutylene" refers to isobutene. Also as used herein, "polyisobutylene" refers to polyisobutene.

As used herein, "polyisobutyl group" refers to a monovalent polyolefin group comprising at least 2 isobutylene monomer units. In some embodiments, the polyisobutyl group is

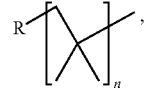

wherein R is H or alkyl of 1 to about 10 carbons, and n is an integer from about 10 to about 2000. In further embodiments, n is about 10 to about 1000. In further embodiments, n is about 10 to about 500. In further embodiments, n is about 10 to about 250. In further embodiments, n is about 10 to about 100. In further embodiments, n is about 10 to about 50.

As used herein, "polyisobutylene group" refers to a divalent polyolefin group comprising at least 2 isobutylene monomer units. In some embodiments, the polyisobutylene group is

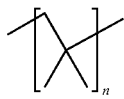

wherein n is an integer from about 10 to about 2000. In further embodiments, n is about 10 to about 1000. In further embodiments, n is about 10 to about 500. In further embodiments, n is about 10 to about 250. In further embodiments, n is about 10 to about 100. In further embodiments, n is about 10 to about 50.

In some embodiments, provided herein are methods for preparing a telechelic polymer of the formula I:

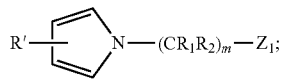

formula I wherein
$R_1$ and $R_2$ are independently in each —($CR_1R_2$)— unit, hydrogen or alkyl from 1 to 6 carbon atoms;
m is an integer from 2 to 20;
$Z_1$ is —F, —Cl, —Br, —I, —At, —CN, —NC, —$N_3$, —NCO, —OCN, —NCS or —SCN; and
R' is a monovalent polyolefin group;
comprising:
a) ionizing a polyolefin in the presence of a Lewis acid or mixture of Lewis acids to form a carbocation-terminated polyolefin;
b) reacting the carbocation-terminated polyolefin from step (a) with an N-substituted pyrrole of formula II:

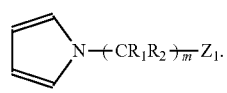

formula II

In some embodiments, at least one of $R_1$ or $R_2$ of the —C($R_1R_2$)— group adjacent to $Z_1$ is hydrogen. In some embodiments, the —($CR_1R_2$)— group adjacent to $Z_1$ is a —$CH_2$—.

In some embodiments, $R_1$ and $R_2$ are both hydrogen.
In some embodiments, m is 2-6. In some embodiments, m is 2-4. In some embodiments, m is 2-3. In some embodiments, m is 2.
In some embodiments, $Z_1$ is —F, —Cl, —Br, —I, —CN, —NC, —$N_3$, —NCO, —OCN, —NCS, or —SCN. In some embodiments, $Z_1$ is —Cl, —Br, —I, —CN, or —$N_3$. In some embodiments, $Z_1$ is —Cl, —Br, —CN, or —$N_3$. In some embodiments, $Z_1$ is —Br, —CN, or —$N_3$. In some embodiments, $Z_1$ is —Cl or —Br. In some embodiments, $Z_1$ is —Br.
In some embodiments, m is 2-6 and $R_1$ and $R_2$ are both hydrogen.

In some embodiments, m is 2-4; $Z_1$ is —Cl, —Br, —CN, or —$N_3$; and $R_1$ and $R_2$ are both hydrogen. In some embodiments, the N-substituted pyrrole of formula II is

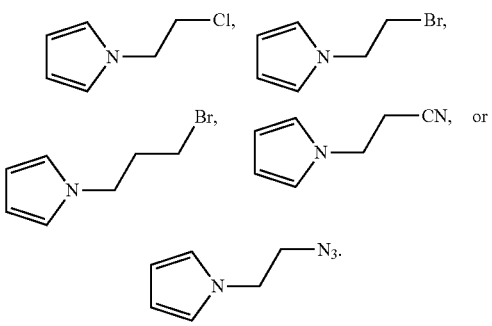

In some embodiments, the telechelic polymer of formula I is

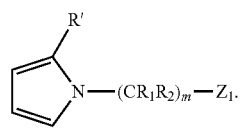

In some embodiments, the telechelic polymer of formula I is

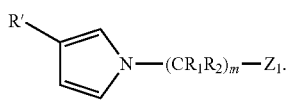

In some embodiments, R' is a polyisobutyl group.
In some embodiments, the telechelic polymer of formula I is

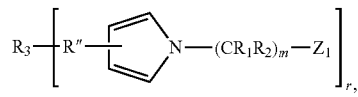

wherein R" is a divalent polyolefin group and $R_3$ is a monofunctional or polyfunctional carbocationic initiator residue of functionality r, wherein r is an integer from 1 to 8.

In some embodiments, the telechelic polymer of formula I is

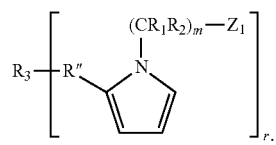

In some embodiments, the telechelic polymer of formula I is

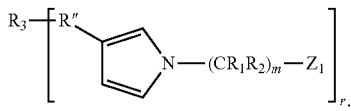

In some embodiments, the telechelic polymer of formula I is

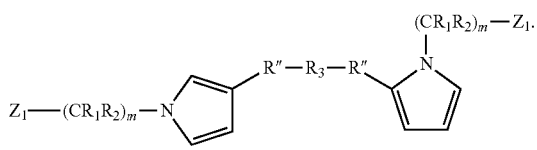

In some embodiments, R″ is a polyisobutylene group.
In some embodiments, r is 2-3.
In some embodiments, r is 2.
In some embodiments, $R_3$ is

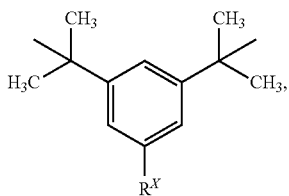

wherein $R^x$ is H or alkyl. In some embodiments, $R^x$ is tert-butyl.

In some embodiments, $R_3$ is

In some embodiments, $R_3$ is

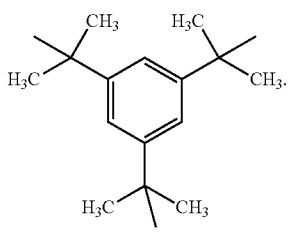 [SMILES: CC(C)(C)c1cc(C(C)(C)C)cc(C(C)(C)C)c1]

In some embodiments, $R_3$ is

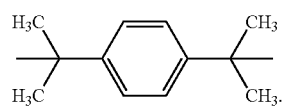

Living polymerization is known in the art and may be achieved using a variety of systems, some of which are described in U.S. Pat. Nos. 5,350,819; 5,169,914; and 4,910,321. As used herein, living carbocationic polymerization systems can comprise ideal living polymerization, based on cationic initiation in which the rates of chain transfer and termination are zero or indistinguishable from zero, and quasiliving polymerization in which reversible termination is operable, but the rates of chain transfer and irreversible termination are zero or indistinguishable from zero. Suitable systems disclosed in the art for living carbocationic polymerization are for instance: tert-alkyl halides (or ethers or esters)/$BCl_3$; tert-alkyl halides (or ethers or esters)/$TiCl_4$; cumyl halides (or ethers or esters)/$BCl_3$; cumyl halides (or ethers or esters)/$TiCl_4$; tert-alkyl halides/$BCl_3$/2,6-dimethylpyridine (2,6-DMP) (or 2,4-dimethylpyridine or 2,6-di-tert-butylpyridine); tert-alkyl halides/$TiCl_4$/2,6-DMP (or 2,4-DMP or 2,6-di-tert-butylpyridine); cumyl halide/$BCl_3$/2,6-DMP (or 2,4-DMP or 2,6-di-tert-butylpyridine); cumyl halide/$TiCl_4$/2,6-DMP (or 2,4-DMP or 2,6-di-tert-butylpyridine); $CH_3SO_3H$/$SnCl_4$+n-$Bu_4NCl$. In some embodiments, the suitable systems are hexane/MeCl/$TiCl_4$/2,6-DMP/−70° C.; MeCl/$BCl_3$/2,6-DMP/−40° C.; 1,2-$EtCl_2$/$BCl_3$/2,6-DMP/−10° C. In some embodiments, the suitable systems are those systems employing isobutylene as the monomer and that are initiated with 2-chloro-2,4,4-trimethylpentane (TMPCl) or by 5-tert-butyl-1,3,-di(1-chloro-1-methylethyl)benzene (bDCC) or 2,6-dichloro-2,4,4,6-tetramethylheptane. An important aspect to quasiliving cationic polymerization is the use of a reaction system in which the propagating centers are of sufficiently low reactivity so that transfer and termination reactions are suppressed but not so unreactive that propagation by a suitable cationic monomer is suppressed. This is facilitated by appropriately matching the stability of the carbocationic center with a suitable counterion complex, solvent polarity, polymerization temperature, other additives, etc.

Some typical conditions under which living polymerizations can be achieved, typified for isobutylene include:

(1) an initiator comprising a tertiary alkyl halide, a tertiary aralkyl halide, a tertiary alkyl ether, a tertiary aralkyl ether, a tertiary alkyl ester, a tertiary aralkyl ester, or the like;

(2) a Lewis acid co-initiator, which typically comprises a halide of titanium, boron, tin, or aluminum;

(3) optionally, a proton scavenger, proton trap and/or electron donor and/or common ion salt and/or common ion salt precursor;

(4) a solvent or cosolvent system whose dielectric constant is selected considering the choice of the Lewis acid and the monomer in accord with known cationic polymerization systems; and (5) monomers.

Initiator compounds for living carbocationic polymerization are known in the art. The type of contemplated initiator compounds can be represented by the general formula (X—$CR_aR_b)_r$—Rc wherein $R_a$ and $R_b$ are univalent radicals independently selected from the group consisting of hydrogen, alkyl, aryl, aralkyl or alkaryl groups, and can be the same or different, and X is acyloxy, alkoxy, hydroxy, or halogen. In some embodiments, $R_a$ and $R_b$ are both methyl. $R_c$ is an aliphatic or aromatic polyvalent radical with valance r, where r is an integer of 1 to 8. In some embodiments, $R_a$, $R_b$, and $R_c$, are hydrocarbon groups containing 1 to 20 carbon atoms. In some embodiments, $R_a$, $R_b$, and $R_c$, are hydrocarbon groups containing 1 to 8 carbons atoms. In some embodiments, X is a halogen. In further embodiments, X is chloride. In some embodiments, $R_c$ is aryl or alkaryl. In some embodiments, $R_c$ is 1,4-phenylene. In some embodiments, $R_c$ is 5-tert-butyl-1,3-phenylene. In some embodiments, $R_c$ is neopentylene. In some embodiments, $R_c$ is a trivalent benzene ring with the (X—CR$_a$R$_b$) groups attached at the 1, 3, and 5 positions of the ring. In some embodiments, the structure of R$_a$, R$_b$, and R$_c$ is selected to mimic the growing species derived from the monomer, e.g., a 1-phenylethyl derivative for polystyrene or 2,4,4-trimethylpentyl derivative for polyisobutylene. Suitable compounds include, for example, but are not limited to, 2-chloro-2-phenylpropane; 2-acetoxy-2-phenylpropane; 2-propionyloxy-2-phenylpropane, 2-methoxy-2-phenylpropane, 2-ethoxy-2-phenylpropane, 2-chloro-2,4,4-trimethylpentane, 2-acetoxy-2,4,4,-trimethylpentane, 2-propionyloxy-2,4,4-trimethylpentane, 2-methoxy-2,4,4-trimethylpentane, 2-ethoxy-2,4,4-trimethylpentane, 1,3-di(1-chloro-1-methylethyl)-5-tert-butylbenzene, 1,3-di(1-acetoxy-1-methylethyl)-5-tert-butylbenzene, 1,3-di(1-propionyloxy-1-methylethyl)-5-tert-butylbenzene, 1,3-di(1-methoxy-1-methylethyl)-5-tert-butylbenzene, 1,3-di(1-ethoxy-1-methylethyl)-5-tert-butylbenzene, 1,4-di(1-chloro-1-methylethyl)benzene, 1,4-di(1-acetoxy-1-methylethyl)benzene, 1,4-di(1-propionyloxy-1-methylethyl)benzene, 1,4-di(1-methoxy-1-methylethyl)benzene, 1,4-di(1-ethoxy-1-methylethyl)benzene, 2,6-dichloro-2,4,4,6-tetramethylheptane, 2,6-diacetoxy-2,4,4,6-tetramethylheptane, 2,6-dipropionyloxy-2,4,4,6-tetramethylheptane, 2,6-dimethoxy-2,4,4,6-tetramethylheptane, 2,6-diethoxy-2,4,4,6-tetramethylheptane, 1,3,5 tri(1-chloro-1-methylethyl) benzene, 1,3,5 tri(1-acetoxy-1-methylethyl)benzene, 1,3,5 tri (1-propionyloxy-1-methylethyl)benzene, 1,3,5-tri(1-methoxy-1-methylethyl)benzene, and similar compounds. Other suitable examples can be found in U.S. Pat. No. 4,946, 899, which is incorporated herein by reference in its entirety. In some embodiments, the initiator is 2-chloro-2,4,4-trimethylpentane (TMPCl), 1,4-di(1-chloro-1-methylethyl)benzene (DCC), 1,3,5 tri(1-chloro-1-methylethyl)benzene (TCC), 1,3-di(1-chloro-1-methylethyl)-5-tert-butylbenzene (bDCC), or 2,6-dichloro-2,4,4,6-tetramethylheptane.

The term "carbocationic initiator residue" as used herein refers to the polyvalent radical (—CR$_a$R$_b$)$_r$—R$_c$, where r, R$_a$, R$_b$, and R$_c$, are defined above. When r is 1, the carbocationic initiator residue is a "monovalent or univalent carbocationic initiator residue." When r is greater than 1, the carbocationic residue is a "polyvalent or multivalent carbocationic initiator residue."

Select Lewis acids are suitable as catalysts for purposes of the methods described herein. In some instances these Lewis acids are also referred to as co-initiators, and both terms are used herein. Such compounds include, but are not limited to the titanium and boron halides. In some embodiments, the Lewis acid is titanium tetrachloride, boron trichloride, aluminum trichloride, tin tetrachloride, zinc dichloride, ethyl aluminum dichloride, or others. In some embodiments, the Lewis acid is a titanium halide. In further embodiments, the Lewis acid is titanium tetrachloride. In some embodiments, the strength of the Lewis acid and its concentration should be adjusted for the particular monomer. In some embodiments, for styrene and isobutylene monomers, relatively strong Lewis acids such as TiCl$_4$, BCl$_3$, or SnCl$_4$ are used. In some embodiments, vinyl ethers can be polymerized using iodine or zinc halides. The Lewis acid is selected to comprise labile ligands such that it does not contain exclusively strongly bonded ligands such as fluoride. Additionally, the strength of these Lewis acids can be adjusted using nucleophilic additives.

The amount of the Lewis acid present in the initiator system may vary. In some embodiments, the concentration of Lewis acid exceeds the electron donor or salt concentration present. The Lewis acid concentration should not be so high as to precipitate the formed polymer, e.g., PIB.

Further, an electron donor, proton trap, proton scavenger, common ion salt, and/or common ion salt precursor may be optionally present during production of the polymer. These additives have been shown to convert traditional polymerization systems into living and/or quasiliving cationic polymerizations systems; whereby polymers having controlled structures with narrow molecular weight distribution are produced. The electron donor optionally used herein is not specifically limited to any particular compound or class of compounds, and examples thereof include, but are not limited to pyridines and n-alkyl amines, aprotic amides, sulfoxides, esters, metal compounds having an oxygen atom bonded to a metal atom, and others. Specifically, there can be mentioned pyridine compounds such as 2,6-di-tert-butylpyridine (DtBP), 2,6-dimethylpyridine (2,6-DMP), 2,4-dimethylpryidine (2,4-DMP), 2,4,6-trimethylpyridine, 2-methylpyridine, pyridine; N,N-dimethylaniline; amide compounds such as N,N-dimethylformamide, N,N-dimethylacetamide, N,N-diethylacetamide; sulfoxide compounds such as dimethyl sulfoxide; ether compounds such as diethyl ether; ester compounds such as methyl acetate, ethyl acetate; phosphate compounds such as trimethyl phosphate, tributyl phosphate, triamide hexamethylphosphate; and oxygen-containing metal compounds such as tetraisopropyl titanate. A proton scavenger is defined in U.S. Pat. No. 5,350,819. Electron donors have been defined in EPA 341 012. Both of these documents are incorporated by reference herein. Common ion salts and/or common ion salt precursors optionally may be added into the living charge. Typically, these salts are used to increase the ionic strength, suppress free ions, and beneficially interact with ligand exchange. In some embodiments, the common ion salt precursor is a quaternary ammonium salt, such as n-Bu$_4$NCl. Other suitable salts are disclosed in U.S. Pat. No. 5,225,492, which is incorporated herein by reference in its entirety.

The methods described herein are suited for the polymerization of hydrocarbon monomers, i.e., compounds containing only hydrogen and carbon atoms, especially olefins and diolefins, and normally those having from two to about twenty or, in some embodiments, from about four to eight carbon atoms. The process can be employed for the polymerization of such monomers to produce polymers of different, but uniform molecular weights, for example, from about three hundred to in excess of one hundred thousand g/mol. Such polymers can be low molecular weight liquid or viscous polymers having a molecular weight of from about two hundred to ten thousand g/mol, or solid waxy to plastic, or elastomeric materials having molecular weights of from about ten thousand to one hundred thousand g/mol, or more. Suitable monomeric materials include such compounds as isobutylene, styrene, beta-pinene, isoprene, butadiene, substituted compounds of the preceding types, and others. In some embodiments, the monomer is isobutylene, 2-methyl-butene, 3-methyl-1-butene, 4-methyl-1-pentene, beta-pinene, or styrene. In some embodiments, the monomer is isobutylene. Mixtures of monomers may be used.

Solvents influence the ionization equilibria and rates of exchange of growing species through their polarity, which can be estimated from their dielectric constants. In some embodiments, solvents having low dielectric constants are used because the ion pairs are less dissociated. Suitable solvents include, but are not limited to, low-boiling alkanes and alkyl mono or polyhalides with reasonably low freezing points to be used at polymerization temperature. Illustrative solvents include, but are not limited to, alkanes (generally C$_2$ to C$_{10}$ alkanes, including normal alkanes such as propane, normal butane, normal pentane, normal hexane, normal heptane, normal octane, normal nonane and normal decane, and branched alkanes including isobutane, isopentane, isohexane, 3-methylpentane, 2,2-dimethylbutane, 2,3-dimethylbutane and the like), alkenes and alkenyl halides (such as vinyl chloride), carbon disulfide, chloroform, ethylchloride, n-butyl chloride, methylene chloride, methyl chloride, 1,2-dichloroethane, 1,1,2,2-tetrachloroethane, sulfur dioxide, acetic anhydride, carbon tetrachloride, acetonitrile, neopentane, benzene, toluene, methylcyclohexane, chlorobenzene, 1,1-dichloroethane, 1,1-dichloroethene, 1,2-dichloroethene, n-propyl chloride, iso-propyl chloride, 1,2-dichloropropane, or 1,3-dichloropropane, to name a few of the representative liquid diluents or solvents useful in cationic polymerizations. Mixed solvents (for example combinations of those listed above) can also be used.

In some embodiments, the polymerization medium is substantially free of substances that are capable of initiating the monomers other than the purposefully-added initiator (or mixture of initiators) employed in the methods described herein. In some embodiments, the polymerization medium is substantially free of unwanted cationic polymerization initiators or promoters (i.e., adventitious initiators) such as water, alcohols, carboxylic acids and acid anhydrides, Bronsted acids, ethers, or mixtures thereof. The alcohols which should be excluded are straight or branched chain, aliphatic, aromatic, or mixed aliphatic/aromatic alcohols containing from 1 to 30 carbon atoms. Likewise, the carboxylic acid, acid anhydride and/or ether initiators to be excluded are halide substituted or unsubstituted, straight or branched chain, aliphatic, aromatic or mixed aliphatic/aromatic acids and ethers containing from about 1 to about 30 carbon atoms.

In some embodiments, the polymerization reaction medium contains less than about 20 weight ppm (part per million) of water, and less than 5 weight ppm of mercaptans, both of which can function as poisons to Lewis Acid catalysts and/or as adventitious initiators. The olefin feed can be treated to achieve the above desired levels by conventional means, e.g., by use of mole sieves and caustic washing to reduce the concentration of mercaptans and water, and remove dienes (if desired).

The polymerization reaction may be conducted batchwise or as a semicontinuous or continuous operation in which continuous streams of ingredients are delivered to the reactor; appropriate reactor systems include but are not limited to continuously stirred tank reactor systems, wherein an overflow of a slurry or solution of polymer is taken out for the recovery of the polymer therefrom, or plug flow reactors. In some embodiments, the reactor contents are stirred or agitated to achieve an even catalyst distribution therein. In some embodiments, the mode of reaction is a batch process; although theoretically a plug flow reactor may have process advantages.

The molecular weight of the polymer can be manipulated by varying the ratio of the concentrations of the monomer to the initiator as in most living polymerizations. See for example U.S. Pat. Nos. 5,350,819; 5,169,914; and 4,910,321, which are incorporated by reference herein. Control of the polymer molecular weight within defined limits of a selected target polymer molecular weight is particularly important when the polymer is intended for use in lubricating oils as a dispersant.

The catalyst amount affects the rate of conversion of the olefin monomer and hence the yield of polymer as a function of reaction time; higher amounts of Lewis acid catalyst typically yield faster conversions and higher yields. Strong Lewis acid catalyst in the absence of an electron donor species can lead to isomerizations which reduce the functionality of the polymer, and can produce undesirable chain transfer.

In view of the above, and of the fact that the Lewis acid is complexed more or less strongly by reagents which may be present in the reaction medium, the catalyst should be employed in sufficient amount to enable the reaction to proceed at a reasonable rate and in a controlled manner. In some embodiments, the catalyst concentration corresponds to about the quantitative formation of complex between the catalyst and the initiator compound. In some embodiments, the catalyst is employed at a ratio of moles of Lewis acid to equivalents of functional groups on the initiator of more than 3:1. In some embodiments, the ratio is more than 4:1. In other embodiments, the ratio is more than 6:1. In some embodiments, the range of ratio is from 3:1 to 30:1. In other embodiments, the range of ratio is 4:1 to 20:1. In further embodiments, the range of ratio is 6:1 to 10:1.

When isobutylene is the monomer, $BCl_3$ Lewis acid typically yields relatively slow propagation rates and relatively slow quenching rates compared to $TiCl_4$ Lewis acid. This is attributed to a lower ionization equilibrium in a $BCl_3$ system, which yields lower concentrations of reactive carbenium ions available for reaction with a functionalized N-substituted pyrrole of the methods described herein employed as a quenching agent. Using a $TiCl_4$ catalyst promotes faster propagation rates and more rapid quenching rates due to the larger ionization equilibrium associated with this system.

The temperature at which the polymerizations are carried out is important, since higher temperatures tend to decrease the functionalization degree. Additionally, depending upon the living or quasiliving system, too high a reaction temperature can diminish or eliminate the living character of the cationic polymerization. The usual polymerization temperature range is between about −100° C. and +10° C. In some embodiments, the polymerizations are performed at a temperature at or below −10° C. In some embodiments, the temperature is at or below −30° C. In some embodiments, the temperature is between about −80° C. and about −50° C. In some embodiments, the temperature is about −60° C. The liquid-phase reaction mixture temperature is controlled by conventional means.

Average polymerization times can vary from about 2 to about 1000 minutes. In some embodiments, the polymerization time is from about 5 to about 120 minutes. In some embodiments, the polymerization time is from about 10 to about 60 minutes. In some embodiments, the polymerization time is from about 20 to about 30 minutes. In some embodiments, polymerization is carried out for a time suitable to allow for monomer conversion above 80%. In other embodiments, polymerization is carried out for a time suitable to allow for monomer conversion above 90%. In some embodiments, polymerization is carried out for a time suitable to allow for monomer conversion above 98%. In some embodiments, polymerization is carried out for a time suitable to allow for essentially quantitative monomer conversion, but not so long that substantial aging occurs, characterized by the occurrence of chain end isomerization, proton elimination, or other termination or deactivation events, prior to quenching the living carbocationic polymerization to end cap and thus functionalize the resulting polymer with an N-substituted pyrrole.

Other methods may be used to prepare other pre-made polymers, which are also suitable for functionalization with the N-substituted pyrroles described herein. Suitable pre-made polymers are those made by an inifer technique (described below), from terminated living and quasiliving polymerization products, by conventional polymerizations followed by an extra hydro-chlorination step, or by other polymerization techniques so long that the end result is a polymer backbone having chain ends, such as tert-chloride, that can be ionized with a suitable Lewis acid catalyst, and thus suitably functionalized with the N-substituted pyrroles described herein. Methods to obtain polymers having a terminal tertiary halide group include use of a system of initiator-transfer agents, called inifers (from initiator-transfer functions). A detailed discussion of the uses for these inifers and the types of telechelic polymers prepared therefrom is found in U.S. Pat. Nos. 4,316,673 and 4,342,849, the disclosures of which are incorporated by reference herein. Such polyisobutylenes terminated with tertiary halides, typically tertiary chlorines, may be combined with a suitable catalyst or Lewis acid and the N-substituted pyrrole quenching agent to produce a functionalized polymer under the methods described herein.

These pre-made terminally halogenated polymers may be thought of as a substitute for the initiator and monomer present in a living polymerization system and are treated as equivalent, in terms of end group functionality, to the polymers prepared by the living polymerization of the monomer. Typically these halogenated polymers are added to the catalyst system by dissolving the polymer in a solvent of choice, much the same way that monomer and initiator are added to a living polymerization charge. The stoichiometry of the catalyst ingredients is calculated assuming that the pre-made polymer is a substitute for the initiator, i.e. one halide terminus is equal to one initiator site. All ingredients are added and equilibrated at the desired temperature before the N-substituted pyrrole quenching agent and the Lewis acid are introduced. In some embodiments the functionalized N-substituted pyrrole quenching agent is added, followed by the Lewis acid. In some embodiments the Lewis acid is added, followed by the functionalized N-substituted pyrrole quenching agent. In some embodiments the functionalized N-substituted pyrrole quenching agent and Lewis acid are added simultaneously. In some embodiments, the functionalized N-substituted pyrrole quenching agent and/or the Lewis acid may be first dissolved in a solvent or mixture of solvents before addition to the reaction. Functionalization proceeds according to the method described herein.

Suitable functionalized N-substituted pyrroles for end capping the tert-chloride chain end of the quasiliving carbocation polymer are said to be "soft" nucleophiles, which means they are amenable to electrophilic aromatic substitution (EAS) by the quasiliving polymer carbocation but not sufficiently nucleophilic to complex with or decompose the Lewis acid. In some embodiments, the functionalized N-substituted pyrroles are substituted with a component that is less nucleophilic than the pyrrole and which does not deactivate the catalyst complex. The lone pair of electrons on the pyrrole nitrogen atom takes part in the aromatic sextet of electrons in the five-membered aromatic pyrrole ring. This structure dramatically reduces the complexation of nitrogen with the Lewis acids and increases the nucleophilic character of the aromatic ring, thus creating a soft nucleophile which is highly reactive with carbenium ions.

In some embodiments provided herein, the functionalized N-substituted pyrroles substantially undergo only mono-substitution, i.e., after the functionalized N-substituted pyrrole quenching agent has undergone ring-substitution with one quasiliving carbocationic polymer, it does not undergo a second substitution. A second substitution onto the functionalized N-substituted pyrrole is referred to as "EAS coupling."

In some embodiments, the N-substituted pyrrole is a compound of formula II,

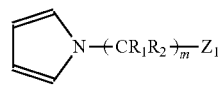

formula II wherein:
  $R_1$ and $R_2$ are, independently in each —$(CR_1R_2)$— unit, hydrogen and alkyl from 1 to 6 carbon atoms;
  m is an integer from 2 to 20; and
  $Z_1$ is —F, —Cl, —Br, —I, —At, —CN, —NC, —$N_3$, —NCO, —OCN, —NCS or —SCN.

In some embodiments, $Z_1$ is —F, —Cl, —Br, —I, —CN, —NC, —$N_3$, —NCO, —OCN, —NCS or —SCN.

Without being limited to any theory, the location of the $Z_1$-containing substituent at the 1 position of pyrrole (on the nitrogen atom of pyrrole) influences the outcome of the reaction. Other substitution patterns lead to different results. For example, as disclosed in U.S. Pat. No. 6,969,744, quenching of quasiliving PIB with unsubstituted pyrrole yields bimodal polymer product consisting of product molecules containing a pyrrole residue bonded to a single PIB chain and product molecules containing a pyrrole residue bonded to two PIB chains (i.e., EAS coupling). As a further example, U.S. Patent Application 2006/0041081 A1 discloses that quenching of quasiliving PIB with 2,5-disubstituted pyrroles yields predominantly exo-olefin PIB.

The chemistry of preparing the suitable functionalized N-substituted pyrrole compounds for use in the methods described herein is well known in the art; see for example, *The Synthesis, Reactivity, and Physical Properties of Substituted Pyrroles*, Volume 48, Part 1-2, John Wiley and Sons (1992) incorporated herein by reference in its entirety. Often a desired functionalized N-substituted pyrrole may be readily prepared from a different precursor N-substituted pyrrole by simple nucleophilic substitution. As a non-limiting example, an N-(bromoalkyl)pyrrole may be reacted under appropriate conditions with sodium azide in order to displace the bromide group and replace it with an azide group. Illustrative examples of N-substituted pyrroles that are functionalized within the N-substituent and can be suitably employed include, but are not limited to: N-(haloalkyl)pyrroles, e.g., N-(2-fluoroethyl)pyrrole, N-(3-fluoropropyl)pyrrole, N-(4-fluorobutyl)pyrrole, N-(6-fluorohexyl)pyrrole, N-(8-fluorooctyl)pyrrole, N-(2-fluoro-1-propyl)pyrrole, N-(1-fluoro-2-propyl)pyrrole, N-(2-chloroethyl)pyrrole, N-(3-chloropropyl)pyrrole, N-(4-chlorobutyl)pyrrole, N-(6-chlorohexyl)pyrrole, N-(8-chlorooctyl)pyrrole, N-(2-chloro-1-propyl)pyrrole, N-(1-chloro-2-propyl)pyrrole, N-(2-bromoethyl)pyrrole, N-(3-bromopropyl)pyrrole, N-(4-bromobutyl)pyrrole, N-(6-bromohexyl)pyrrole, N-(8-bromooctyl)pyrrole, N-(2-bromo-1-propyl)pyrrole, N-(1-bromo-2-propyl)pyrrole, N-(2-iodoethyl)pyrrole, N-(3-iodopropyl)pyrrole, N-(4-iodobutyl)pyrrole, N-(6-iodohexyl)pyrrole, N-(8-iodooctyl)pyrrole, N-(2-iodo-1-propyl)pyrrole, N-(1-iodo-2-propyl)pyrrole; N-(cyanoalkyl)pyrroles, e.g., N-(2-cyanoethyl)pyrrole, N-(3-cyanopropyl)pyrrole, N-(4-cyanobutyl)pyrrole, N-(6-cyanohexyl)pyrrole, N-(8-cyanoctyl)pyrrole, N-(2-cyano-1-propyl)pyrrole, N-(1-cyano-2-propyl)pyrrole; N-(azidoalkyl)pyrroles, e.g. N-(2-azidoethyl)pyrrole, N-(3-azidopropyl)pyrrole, N-(4-azidobutyl)pyrrole, N-(6-azidohexyl)pyrrole, N-(8-azidooctyl)pyrrole, N-(2-azido-1-propyl)pyrrole, N-(1-azido-2-propyl)pyrrole; N-(isocyanatoalkyl)pyrroles, e.g., N-(2-isocyanatoethyl)pyrrole, N-(3-isocyanatopropyl)pyrrole, N-(4-isocyanatobutyl)pyrrole, N-(6-isocyanatohexyl)pyrrole, N-(8-isocyanatooctyl)pyrrole, N-(2-isocyanato-1-propyl)pyrrole, N-(1-isocyanato-2-propyl)pyrrole; N-(isothiocyanatoalkyl)pyrroles, N-(cyanatoalkyl)pyrroles, and the like.

Techniques under which the living polymer or a polymer terminated with a tert-alkyl halide and the functionalized N-substituted pyrrole are combined are typical conditions known to those of ordinary skill in the art, such as, but not limited to, suspending the functionalized N-substituted pyrrole in a solvent and thereafter combining with the neat, suspended or dissolved living polymer. The neat functionalized N-substituted pyrrole may also be directly added to the neat, suspended or dissolved living polymer to thereby quench the polymerization. The quenching with the functionalized N-substituted pyrrole covalently bonds the functionalized N-substituted pyrrole to the carbocationic center of the living or quasiliving polymer, thus functionalizing the living polymer. The number of functionalized N-substituted pyrrole functional groups on the polymer is determined by the number of initiation sites in the initiator used to create the living polymer or the polymer terminated with tert-alkyl halides. For example, initiation of isobutylene from 2-chloro-2,4,4-trimethylpentane leads to a polymer with one propagating center and thus one functional group per polymer; whereas 1,3-di(1-chloro-1-methylethyl)-5-tert-butylbenzene will produce a polymer with two functional groups. In some embodiments, the functionalized N-substituted pyrrole-functionalized cationic polymers are nearly monodisperse, having substantially no EAS coupled polymers.

In some embodiments, provided herein are polymers having at least one terminal N-substituted pyrrole moiety, and these functionalized polymers can be derived from any suitable cationically polymerizable monomers. Thus the functionalized polymers can be homopolymers having substantially the same repeating monomer unit, or copolymers having two or more different repeating units. Particularly, AB block copolymers and ABA triblock copolymers can be formed. The functionalized polymers may also contain various hydrocarbyl headgroups based upon the selection of the initiator. The initiator can either mimic the growing chain end, e.g. a 1-phenylethyl derivative for polystyrene or 2,4,4-trimethylpentyl derivative for polyisobutylene, or may impart some desired group such as alkyl, cumyl, ester, silyl, etc. Additionally, by employing polyfunctional initiators, so called star polymers can be formed. Thus, examples of the functionalized polymers can be represented by, for a monofunctional polymer, (Initiator residue)-(Polyolefin)-(Functional N-substituted pyrrole) or, for a multifunctional initiator, (Initiator residue)-[(Polyolefin)-(Functional N-substituted pyrrole)]$_r$, where r equals the functionality of the initiator. Additionally, coupling agents can be employed to link multiple polymer chains. In the illustration above, "Initiator residue" represents the polyvalent radical ($-CR_aR_b)_r-R_c$, with $R_a$, $R_b$, $R_c$, and r as defined herein above. "Polyolefin" represents a polymer segment from at least one cationically polymerizable monomer; therefore, the functionalized N-substituted pyrrole polymers can be homopolymers, random or block copolymers, etc., and (Polyolefin) and (Functional N-substituted pyrrole) can be independently selected and thus be the same or different at each occurrence.

In some embodiments, as little as one equivalent of a functionalized N-substituted pyrrole per equivalent of chain ends during the quenching reaction is sufficient to carry out the functionalization. Greater amounts of functionalized N-substituted pyrrole are of course useful. In some embodiments, the range of ratio of functionalized N-substituted pyrrole to chain end is 1 to 20 equivalents per chain end; in some embodiments it is 1 to 5 equivalents per chain end, and in some embodiments it is 1 to 2 equivalents per chain end. (Chain ends are determined by ascertaining the number of initiation sites per initiator molecule and multiplying that number by the number of initiator molecules present.) Typically the reaction is rapid and quantitative at various temperatures. The functionalized N-substituted pyrrole may be added neat or, in some embodiments, as a solution of the pyrrole in the chosen solvent for the polymerization. The addition may be singular and immediate or may be a more slowly controlled, metered addition. Additional Lewis acid catalyst, proton trap, and/or electron donor, or any combination thereof, which are typical components of the aforementioned living polymerization systems, may be added prior to, simultaneously with, or subsequently to the addition of the functionalized N-substituted pyrrole. In some embodiments, the Lewis acid does not irreversibly react with the N-substituted pyrrole.

Once the living polymer has been reacted with the functionalized N-substituted pyrrole, the product may be used in that form, or, in some embodiments, it may be modified by known chemistries to obtain a different product.

In some embodiments, the product is reacted with a reagent or reagents to form a compound of formula III;

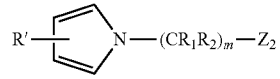

formula III wherein:

$R_1$ and $R_2$ are, independently in each $-(CR_1R_2)-$ unit, hydrogen or alkyl from 1 to 6 carbon atoms;

R' is a monovalent polyolefin group;

m is an integer from 2 to 20; and $Z_2$ is $-NR_4R_5$, $-N[(R_4)(COR_5)]$, $-N[(COR_4)(COR_5)]$, polyamino, polyamidoamino, polyaminoamido, $-OR_6$, a polyether group, polyetheramino, or $-COOR_6$;

wherein $R_4$ and $R_5$ are each, independently, hydrogen, alkyl, or aryl; and $R_6$ is hydrogen, alkyl, aryl, alkaryl, or aralkyl.

In some embodiments, $Z_2$ is $-NR_4R_5$. In further embodiments, at least one of $R_4$ and $R_5$ are hydrogen. In further embodiments, $R_4$ is hydrogen and $R_5$ is aryl. In further embodiments, $-NR_4R_5$ is

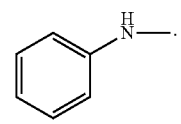

In further embodiments, $-NR_4R_5$ is $-NH_2$.

In some embodiments, the reagent is a nucleophile or reducing agent. In some embodiments, the reagent is a nucleophile. In some embodiments, the reagent is $NaN_3$ or aniline. In some embodiments, the reagent is a reducing agent. In some embodiments, the reagents are hydrogen, palladium, and carbon. In some embodiments, the reagent is borane.

In some embodiments, the compound of formula III is

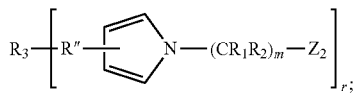

wherein R" is a divalent polyolefin group and $R_3$ is a monofunctional or polyfunctional carbocationic initiator residue of functionality r, wherein r is an integer from 1 to 8.

In some embodiments R' is a polyisobutylene group.

In some embodiments r is 2-3. In some embodiments r is 2.

In some embodiments, $R_3$ is

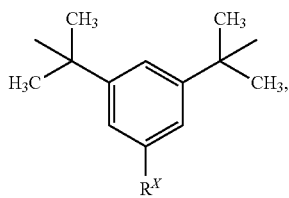

wherein $R^x$ is H or alkyl. In some embodiments $R^x$ is tert-butyl.

In some embodiments, $R_3$ is

In some embodiments, $R_3$ is

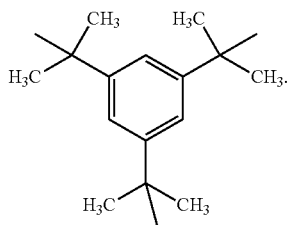 [SMILES: CC(C)(C)c1cc(C(C)(C)C)cc(C(C)(C)C)c1]

In some embodiments, $R_3$ is

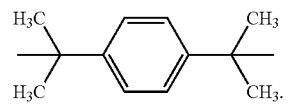

In some embodiments, $R_6$ is hydrogen.

In some embodiments, $R_6$ is not alkyl.

Non-limiting examples of the various modification reactions that may be carried out include the following. $Z_1$ may be displaced as a leaving group by a nucleophilic reagent, thereby forming a covalent bond between the nucleophilic reagent and the carbon to which $Z_1$ was formerly bonded. Alternatively, groups containing unsaturations can undergo addition reactions with nucleophiles, thereby forming a covalent bond between the nucleophile and one of the atoms of $Z_1$; in this case, $Z_1$ is not displaced from the polymer, but rather serves as a linking moiety to bind the nucleophile to the polymer. In addition, $Z_1$ may be reduced, oxidized, hydrogenated and/or hydrolyzed; for example, —$N_3$ or —CN can be reduced by a hydride-containing or other reducing agent or by catalytic hydrogenation to from a primary amine, which is thereby attached to the pyrrole ring via a hydrocarbyl tether that either contains the original number of carbon atoms or the original number of carbon atoms plus one, respectively. These processes represent a general method by which new functional groups may be attached to the polymer chain end. In some embodiments, $Z_1$ may be replaced by a halide or pseudohalide. In some embodiments, $Z_1$ may be replaced by ammonia, a primary amine, or a secondary amine to yield a basic amine function at the polymer chain end. These modification reactions may be performed in the same reactor used to react the living polymer with the functionalized N-substituted pyrrole, or they may be performed in a different reactor; that is, isolation of the functionalized N-substituted pyrrole-containing polymer prior to modification is optional.

After quenching the living polymer with the functionalized N-substituted pyrrole and optional in situ modification reactions, the product is typically subjected to conventional finishing steps which are known to those of skill in the art. These steps typically include deactivation of the Lewis acid catalyst by contacting with protic compounds such as water, an alcohol, ammonia, an amine, or mixtures thereof, a caustic/$H_2O$ wash and/or an acid/$H_2O$ wash to extract catalyst residue, a hydrocarbon/aqueous phase separation step wherein deactivated and extracted Lewis acid catalyst is isolated in the aqueous phase, and a water washing step to remove residual amounts of neutralized catalyst. The polymer product is then typically stripped in a debutanizer to remove unreacted volatile monomers, such as isobutylene, followed by a further stripping procedure to remove light end polymer (e.g., $C_{24}$ carbon polymer). The stripped polymer product is then typically dried by nitrogen.

A class of products as provided herein has a narrow molecular weight distribution (Mw/Mn). In some embodiments, the molecular weight distribution is about 4 or less. In some embodiments, the molecular weight distribution is about 2.5 or less. In further embodiments, the molecular weight distribution is 1.75 or less. In even further embodiments, the molecular weight distribution is 1.5 or less. In other embodiments, the molecular weight distribution is 1.2 or less. In some embodiments, the ranges are from 1.01 up to 1.4. Likewise, the methods described above produce polymers having a greater degree of functionalization than previously available by commercially viable processes. In some embodiments, the degree of functionalization is about 70% or more. In some embodiments, the degree of functionalization is 80% or more. In further embodiments, the degree of functionalization is 90% or more. In even further embodiments, the degree of functionalization is 98% or more, as determined by proton NMR.

The novel functionalized N-substituted pyrrole polymers described herein comprise terminally substituted polymers derived from any of the above-discussed cationically polymerizable monomers. In some embodiments, the functionalized polymers will contain at least 4 monomer units per polymer chain, and will more usually be characterized by number average molecular weights of at least 350 and up to 100,000 g/mol or more. The molecular weight range can be determined for particular polymers. In some embodiments, functionalized polymers range up to 100,000 g/mol for use as lubricant additives; and with specific ranges of 20,000 to 100,000 g/mol for use as viscosity improvers, and from 500 to 20,000 g/mol for use as dispersants and detergents. Low molecular weight polymers are useful in forming dispersants for lubricant additives and particularly useful are low molecular weight functional N-substituted pyrrole polymers. In some embodiments, detergent and dispersant functionalized polymers have an average molecular weight of from about 500 to 5,000 g/mol. In some embodiments, detergent and dispersant functionalized polymers have an average molecular weight of from 500 to 3,000 g/mol. In some embodiments, detergent and dispersant functionalized polymers have an average molecular weight of from 700 to 2,000 g/mol. In even further embodiments, detergent and dispersant functionalized polymers have an average molecular weight of from 700 to 1,500 g/mol. Difunctional terminally functionalized polymers are useful as block segments for block copolymers, for example as soft segments in thermoplastic elastomers, and difunctional and polyfunctional terminally functionalized polymers are useful as chain elements in crosslinked network polymers. In these applications, the molecular weight range is, in some embodiments, from 500 to 20,000 g/mol. In some embodiments, the molecular weight range is from 500 to 5,000 g/mol. In some embodiments, the molecular weight range is from 700 to 3,000 g/mol. In some embodiments, the molecular weights recited above are number average molecular weights measured by size exclusion chromatography equipped with multi-angle laser light scattering detection. The preparation of the polymers described herein can be conducted in a manner and under conditions to attain various molecular weight polymers. The polymers can be conveniently characterized based on molecular weight range. Polymers and copolymers of low, <5,000 g/mol, intermediate, 5,000 to 30,000 g/mol, and high, i.e., 30,000 to 100,000 g/mol, molecular weights can be prepared.

In some embodiments, provided herein are telechelic polymers of the formula VI:

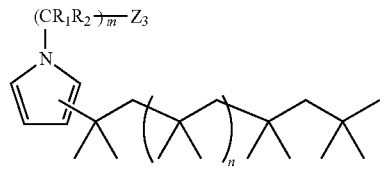

formula VI wherein:
R$_1$ and R$_2$ are, independently in each —(CR$_1$R$_2$)— unit, hydrogen or alkyl from 1 to 6 carbon atoms;
m is an integer from 2 to 20;
n is an integer from 0 to 2000; and
Z$_3$ is —F, —Cl, —Br, —I, —At, —CN, —NC, —N$_3$, —NCO, —OCN, —NCS, —SCN, —NR$_4$R$_5$, —N[(R$_4$)(COR$_5$)], —N[(COR$_4$)(COR$_5$)], polyamino, polyamidoamino, polyaminoamido, —OR$_6$, a polyether group, polyetheramino, or —COOR$_6$;
wherein R$_4$ and R$_5$ are each, independently, hydrogen, alkyl, or aryl; and R$_6$ is hydrogen, aryl, alkaryl, or aralkyl.

In some embodiments, at least one of R$_1$ or R$_2$ of the —C(R$_1$R$_2$)— group adjacent to Z$_3$ is hydrogen. In some embodiments, the —(CR$_1$R$_2$)— group adjacent to Z$_3$ is a —CH$_2$—. In some embodiments R$_1$ and R$_2$ are both hydrogen.

In some embodiments m is 2-6. In some embodiments, m is 2-4. In some embodiments, m is 2-3. In some embodiments m is 2.

In some embodiments, n is 2-1000. In some embodiments, n is 3-500. In some embodiments, n is 4-260. In some embodiments, n is 4-20. In some embodiments, n is 6-50. In some embodiments, n is 140-260.

In some embodiments, Z$_3$ is —Br, —CN, —N$_3$, or —NR$_4$R$_5$.

In some embodiments, Z$_3$ is —NR$_4$R$_5$. In some embodiments, at least one of R$_4$ and R$_5$ are hydrogen. In some embodiments, R$_4$ is hydrogen and R$_5$ is aryl. In some embodiments, —NR$_4$R$_5$ is

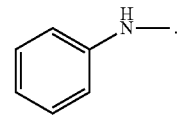

In some embodiments, —NR$_4$R$_5$ is —NH$_2$.

In some embodiments, m is 2-4, Z$_3$ is —Br, —CN, —N$_3$, or —NR$_4$R$_5$, and R$_1$ and R$_2$ are both hydrogen.

In some embodiments, R$_6$ is hydrogen.

In some embodiments, provided herein are telechelic polymers of the formula VII:

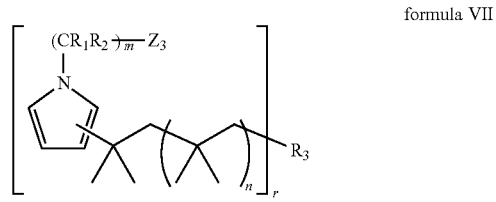

formula VII wherein:
R$_1$ and R$_2$ are, independently in each —(CR$_1$R$_2$)— unit, hydrogen and alkyl from 1 to 6 carbon atoms;
R$_3$ is a polyfunctional carbocationic initiator residue of functionality r, where r can vary from 1 to 8;
m is an integer from 2 to 20;
n is independently, in each of the r chain segments, an integer from 0 to 2000; and
Z$_3$ is —F, —Cl, —Br, —I, —At, —CN, —NC, —N$_3$, —NCO, —OCN, —NCS, —SCN, —NR$_4$R$_5$, —N[(R$_4$)(COR$_5$)], —N[(COR$_4$)(COR$_5$)], polyamino, polyamidoamino, polyaminoamido, —OR$_6$, a polyether group, polyetheramino, or —COOR$_6$;
wherein R$_4$ and R$_5$ are each, independently, hydrogen, alkyl, or aryl; and R$_6$ is hydrogen, aryl, alkaryl, or aralkyl.

In some embodiments, at least one of R$_1$ or R$_2$ of the —C(R$_1$R$_2$)— group adjacent to Z$_3$ is hydrogen. In some embodiments, the —(CR$_1$R$_2$)— group adjacent to Z$_3$ is a —CH$_2$—. In some embodiments, R$_1$ and R$_2$ are both hydrogen.

In some embodiments, m is 2-6. In some embodiments, m is 2-4. In some embodiments, m is 2-3. In some embodiments, m is 2.

In some embodiments, n, independently, in each of the r chain segments, is 2-1000. In some embodiments, n is 3-500. In some embodiments, n is 4-260. In some embodiments, n is 4-20. In some embodiments, n is 6-50. In some embodiments, n is 140-260.

In some embodiments, Z$_3$ is —Br, —CN, —N$_3$, or —NR$_4$R$_5$.

In some embodiments, $Z_3$ is $-NR_4R_5$. In some embodiments, at least one of $R_4$ and $R_5$ are hydrogen. In some embodiments, $R_4$ is hydrogen and $R_5$ is aryl. In some embodiments, $-NR_4R_5$ is

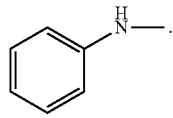

In some embodiments, $-NR_4R_5$ is $-NH_2$.

In some embodiments, m is 2-4, $Z_3$ is $-Br$, $-CN$, $-N_3$, or $-NR_4R_5$, and $R_1$ and $R_2$ are both hydrogen.

In some embodiments, r is 2-4. In some embodiments, r is 2-3. In some embodiments, r is 2.

In some embodiments, $R_6$ is hydrogen.

The compounds of formula IV are typically mixtures having the polyisobutyl group attached to the N-substituted pyrrole at the 2 and 3 position of the pyrrole. Likewise, the compounds of formula V are typically mixtures have the polyisobutylene groups attached to the N-substituted pyrrole moieties at the 2 and 3 position of the pyrrole.

Fuel Compositions and Concentrates

The compounds described herein, particularly those represented by formula IV, are useful as additives in hydrocarbon distillate fuels boiling in the gasoline or diesel range. In some embodiments, the compounds of formula IV have a low molecular weight. In some embodiments, n is selected from 2 to 20. The proper concentration of additive necessary in order to achieve the desired detergency and dispersancy varies depending upon the type of fuel employed, the presence of other detergents, dispersants, and other additives, etc. In some embodiments, the concentration of the additive is from about 25 to 7,500 ppm by weight, or in other embodiments, about 25 to 2,500 ppm by weight, in order to achieve the best results.

The additive may be formulated as a concentrate, using an inert stable oleophilic organic solvent boiling in the range of from about 150° F. to 400° F. (or 65° C. to 200° C.). In some embodiments, an aliphatic or an aromatic hydrocarbon solvent is used, such as benzene, toluene, xylene or higher-boiling aromatics or aromatic thinners. Aliphatic alcohols of from about 3 to 8 carbon atoms, such as isopropanol, isobutylcarbinol, n-butanol, and the like, in combination with hydrocarbon solvents are also suitable for use with the detergent-dispersant additive. In the concentrate, in some embodiments, the amount of the present additive will be from about 10 weight percent and generally will not exceed about 70 weight percent. In some embodiments, the amount of the additive will be from about 10 to 50 weight percent. In further embodiments, the amount of the additive will be from about 20 to 40 weight percent.

In gasoline fuels, other fuel additives may be employed with the additives described herein including, for example, oxygenates, such as t-butyl methyl ether, antiknock agents, such as methylcyclopentadienyl manganese tricarbonyl, and other dispersants/detergents, such as hydrocarbyl amines, hydrocarbyl poly(oxyalkylene) amines, hydrocarbyl poly(oxyalkylene) aminocarbamates, succinimides, or Mannich bases. Additionally, antioxidants, metal deactivators and demulsifiers may be present.

In diesel fuels, other well-known additives can be employed, such as pour point depressants, flow improvers, cetane improvers, and the like.

A fuel-soluble, nonvolatile carrier fluid or oil may also be used with the functionalized polymers described herein. The carrier fluid is a chemically inert hydrocarbon-soluble liquid vehicle, which substantially increases the nonvolatile residue (NVR) or solvent-free liquid fraction of the fuel additive, while not overwhelmingly contributing to octane requirement increase. The carrier fluid may be a natural or synthetic oil, such as mineral oil, refined petroleum oils, synthetic polyalkanes and alkenes, including hydrogenated and unhydrogenated poly(α-olefins), and synthetic polyoxyalkylene-derived oils (such carrier fluids are described, for example, in U.S. Pat. No. 4,191,537), and polyesters, such as those described, for example, in U.S. Pat. Nos. 3,756,793 and 5,004,478, and in European Patent Application Nos. 356,726, published Mar. 7, 1990, and 382,159, published Aug. 16, 1990. These carrier fluids are believed to act as a carrier for the fuel additives described herein and to assist in removing and retarding deposits. The carrier fluid may also exhibit synergistic deposit control properties when used in combination with a functionalized polymer described herein.

In some embodiments, the carrier fluids are employed in amounts ranging from about 25 to 7,500 ppm by weight of the hydrocarbon fuel. In some embodiments, the carrier fluids are employed in amounts ranging from about 25 to 2,500 ppm of the fuel. In some embodiments, the ratio of carrier fluid to deposit control additive will range from about 0.5:1 to 10:1. In further embodiments, the ratio of carrier fluid to deposit control additive will range from about 0.5:1 to 4:1. In even further embodiments, the ratio of carrier fluid to deposit control additive will range from about 0.5:1 to 2:1. When employed in a fuel concentrate, carrier fluids will generally be present in amounts ranging from about 20 to 60 weight percent or, in some embodiments, from about 30 to 50 weight percent.

Lubricating Oil Compositions and Concentrates

The compounds described herein, particularly those represented by formula IV, are useful as detergent and dispersant additives in lubricating oils. Typically, when employed in crankcase oils, such compounds can be used in amounts of about 1 to about 10 percent by weight (on an actives basis) of the total composition, e.g., less than about 5 percent by weight (on an actives basis). Actives basis indicates that only the active ingredients of the polysuccinimides are considered when determining the amount of the additive relative to the remainder of a composition. Diluents and any other inactives, such as unreacted polyolefin, are excluded. Unless otherwise indicated, in describing the lubricating oil and final compositions or concentrates, active ingredient contents are intended with respect to the compounds.

The lubricating oil used with the compounds described herein may be mineral or synthetic oils of lubricating viscosity or, in some embodiments, suitable for use in the crankcase of an internal combustion engine. Crankcase lubricating oils typically have a viscosity of about 1300 cSt at 0° F. (−17.8° C.) to 22.7 cSt at 210° F. (99° C.). Useful mineral oils include paraffinic, naphthenic and other oils that are suitable for use in lubricating oil compositions. Synthetic oils include both hydrocarbon synthetic oils and synthetic esters. Useful synthetic hydrocarbon oils include polymers of alpha olefins having suitable viscosity, e.g., the hydrogenated liquid oligomers of $C_6$ to $C_{12}$ alpha olefins, such as 1-decene trimer. Likewise, alkyl benzenes of proper viscosity such as didodecyl benzene can be used. Useful synthetic esters include the esters of both monocarboxylic acids and polycarboxylic acids as well as monohydroxy alkanols and polyols. Examples are didodecyl adipate, pentaerythritol tetracaproate, di-2-ethylhexyl adipate, dilaurylsebacate and the like. Complex esters prepared from mixtures of mono and dicarboxylic acid and mono and dihydroxy alkanols can also be used. Blends of hydrocarbon oils and synthetic oils are also useful. For example, blends of 10 to 25 weight percent hydrogenated 1-decene trimer with 75 to 90 weight percent 150 SUS (100° F.) mineral oil gives an excellent lubricating oil base.

Other additives which may be present in the formulation include detergents (overbased and non-overbased), rust inhibitors, foam inhibitors, metal deactivators, pour point depressants, antioxidants, wear inhibitors, zinc dithiophosphates and a variety of other well known additives.

The following additive components are examples of some of the components that can be favorably employed in the present invention. These examples of additives are provided to illustrate the present invention, but they are not intended to limit it:

1. Metal Detergents

In addition to the overbased calcium phenate detergent described above, other detergents which may be employed in the present invention include alkyl or alkenyl aromatic sulfonates, borated sulfonates, sulfurized or unsulfurized metal salts of multi-hydroxy alkyl or alkenyl aromatic compounds, alkyl or alkenyl hydroxy aromatic sulfonates, sulfurized or unsulfurized alkyl or alkenyl naphthenates, metal salts of alkanoic acids, metal salts of an alkyl or alkenyl multiacid, and chemical and physical mixtures thereof.

2. Anti-Wear Agents

As their name implies, these agents reduce wear of moving metallic parts. Examples of such agents include, but are not limited to, phosphates which comprise no more than 0.08 wt % of the lubricating oil composition, carbarmates, esters, and molybdenum complexes.

3. Rust Inhibitors (Anti-Rust Agents)

(a) Nonionic polyoxyethylene surface active agents: polyoxyethylene lauryl ether, polyoxyethylene higher alcohol ether, polyoxyethylene nonyl phenyl ether, polyoxyethylene octyl phenyl ether, polyoxyethylene octyl stearyl ether, polyoxyethylene oleyl ether, polyoxyethylene sorbitol monostearate, polyoxyethylene sorbitol mono-oleate, and polyethylene glycol mono-oleate.

(b) Other compounds: stearic acid and other fatty acids, dicarboxylic acids, metal soaps, fatty acid amine salts, metal salts of heavy sulfonic acid, partial carboxylic acid ester of polyhydric alcohol, and phosphoric ester.

4. Demulsifiers

Addition product of alkylphenol and ethylene oxide, polyoxyethylene alkyl ether, and polyoxyethylene sorbitan ester.

5. Friction Modifiers

Fatty alcohol, fatty acid, amine, borated ester, other esters, phosphates, phosphites and phosphonates, excluding ethoxylated amines.

6. Multifunctional Additives

Sulfurized oxymolybdenum dithiocarbamate, sulfurized oxymolybdenum organo phosphorodithioate, oxymolybdenum monoglyceride, oxymolybdenum diethylate amide, amine-molybdenum complex compound, and sulfur-containing molybdenum complex compound.

7. Viscosity Index Improvers

Polymethacrylate type polymers, ethylene-propylene copolymers, styrene-isoprene copolymers, hydrated styrene-isoprene copolymers, polyisobutylene, and dispersant type viscosity index improvers.

8. Pour Point Depressants

Polymethyl methacrylate.

9. Foam Inhibitors

Alkyl methacrylate polymers and dimethyl silicone polymers.

10 Metal Deactivators

Disalicylidene propylenediamine, triazole derivatives, thiadiazole derivatives, and mercaptobenzimidazoles.

11 Dispersants

Alkenyl succinimides, alkenyl succinimides modified with other organic compounds, alkenyl succinimides modified by post-treatment with ethylene carbonate or boric acid, pentaerythritols, phenate-salicylates and their post-treated analogs, alkali metal or mixed alkali metal, alkaline earth metal borates, dispersions of hydrated alkali metal borates, dispersions of alkaline-earth metal borates, polyamide ashless dispersants and the like or mixtures of such dispersants.

12 Anti-Oxidants

Anti-oxidants reduce the tendency of mineral oils to deteriorate in service which deterioration is evidenced by the products of oxidation such as sludge and varnish-like deposits on the metal surfaces and by an increase in viscosity. Examples of anti-oxidants useful in the present invention include, but are not limited to, phenol type (phenolic) oxidation inhibitors, such as 4,4'-methylene-bis(2,6-di-tert-butylphenol), 4,4'-bis(2,6-di-tert-butylphenol), 4,4'-bis(2-methyl-6-tert-butylphenol), 2,2'-methylene-bis(4-methyl-6-tert-butylphenol), 4,4'-butylidene-bis(3-methyl-6-tert-butylphenol), 4,4'-isopropylidene-bis(2,6-di-tert-butylphenol), 2,2'-methylene-bis(4-methyl-6-nonylphenol), 2,2'-isobutylene-bis(4,6-dimethylphenol), 2,2'-5-methylene-bis(4-methyl-6-cyclohexylphenol), 2,6-di-tert-butyl-4-methylphenol, 2,6-di-tert-butyl-4-ethylphenol, 2,4-dimethyl-6-tert-butyl-phenol, 2,6-di-tert-1-dimethylamino-p-cresol, 2,6-di-tert-4-(N,N'-dimethylaminomethylphenol), 4,4'-thiobis(2-methyl-6-tert-butylphenol), 2,2'-thiobis(4-methyl-6-tert-butylphenol), bis(3-methyl-4-hydroxy-5-tert-10-butylbenzyl)-sulfide, and bis(3,5-di-tert-butyl-4-hydroxybenzyl). Diphenylamine-type oxidation inhibitors include, but are not limited to, alkylated diphenylamine, phenyl-alpha-naphthylamine, and alkylated-alpha-naphthylamine. Other types of oxidation inhibitors include metal dithiocarbamate (e.g., zinc dithiocarbamate), and 15-methylenebis (dibutyldithiocarbamate).

It is also contemplated that compounds described herein and prepared as described herein can be employed as dispersants and detergents in hydraulic fluids, marine crankcase lubricants and the like. In some embodiments, a compound described herein is added at from 0.1 to 5 percent by weight (on an active polymer basis) to the fluid or, in further embodiments at from 0.5 to 5 weight percent (on an active polymer basis). The compounds described herein can also be used in additive concentrates, which in some embodiments include from 90 to 10 percent, e.g., 20 to 60 weight percent, of an organic liquid diluent and from 10 to 90 weight percent, e.g., 80 to 40 weight percent (on a dry basis) of the compounds described herein. Typically, the concentrates contain sufficient diluent to make them easy to handle during shipping and storage. Suitable diluents for the concentrates include any inert diluent. In some embodiments, the diluent is an oil of lubricating viscosity, so that the concentrate may be readily mixed with lubricating oils to prepare lubricating oil compositions. Suitable lubricating oils which can be used as diluents typically have viscosities in the range from about 1300 cSt at 0° F. (−17.8° C.) to 22.7 cSt at 210° F. (99° C.), although an oil of lubricating viscosity can be used.

EXAMPLES

The subject matter described herein is further illustrated by the following examples, which are not to be considered as limitative of its scope.

Example 1

Synthesis of Monofunctional Primary Chloride-Terminated PIB through In Situ Quenching of Quasiliving PIB with 1-(2-chloroethyl)pyrrole (PyCl)

The following procedure was carried out under a dry nitrogen atmosphere within a glove box equipped with a thermostatically controlled hexane/heptane cold bath set to −70° C. Into a 75 mL culture tube equipped with a Teflon-lined cap were added 10 mL (−70° C.) of $CH_3Cl$, 15 mL (−70° C.) of n-hexane, and 0.029 mL (RT, 0.027 g, 0.25 mmol) of 2,6 luitidine. This mixture was cooled to −70° C., and then 6.67 mL (−70° C., 4.7 g, 83 mmol) of IB was charged to the reactor. After 10 min equilibration with periodic swirling, 0.605 mL (RT, 0.53 g, 3.6 mmol) of TMPCl was transferred to the reactor. After 5 min equilibration with periodic swirling, 1.175 mL (2.03 g, 10.7 mmol) of $TiCl_4$ was transferred to the reactor to begin polymerization. The initial reagent concentrations were thus fixed as follows: [TMPCl]=0.11 M; [IB]=2.5 M; [26Lut]=7.5×10$^{-3}$ M; [$TiCl_4$]=0.32 M.

Polymerization was allowed to proceed for 40 min. Then, 0.82 mL (0.93 g, 7.2 mmol) (2×TMPCl) of 1-(2-chloroethyl)pyrrole (PyCl) (obtained commercially from TCI, vacuum distilled from $CaH_2$) was added to the polymerization system as a solution in 60/40 Hex/MeCl. PyCl was allowed to react with the quasiliving chain ends for 60 min. The reaction was quenched by addition of 5 mL of prechilled methanol, and subsequently, the polymer was precipitated one time into methanol to remove excess PyCl.

$^1$H NMR analysis of the resulting polymer indicated quantitative end-functionalization and formation of principally 3-PIB-1-(2-chloroethyl)pyrrole with a minor amount of 2-PIB-1-(2-chloroethyl)pyrrole. Quantitative conversion of the tert-chloride end groups was indicated by the disappearance of the characteristic peaks at 1.96 ppm and 1.68 ppm. Two triplets of equal area appeared, centered at 3.70 and 4.11 ppm, which represent the methylene groups bonded to the chlorine and nitrogen atoms, respectively, of the 3-PIB isomer. Significantly weaker, analogous signals for the 2-PIB-isomer were observed centered at 3.72 and 4.27. Three new multiplets centered at 6.05, 6.41, and 6.59 ppm were assigned to the three pyrrole ring protons of the 3-PIB isomer; three significantly weaker multiplets centered at 5.90, 6.35 and 6.51 ppm were assigned to the pyrrole ring protons of the 2-PIB isomer. Peaks at 1.65 and 1.73 ppm were assigned to the ultimate methylene unit of the PIB chain in the 3- and 2-PIB isomer, respectively.

Example 2

Synthesis of Monofunctional Primary Bromide-Terminated PIB through In Situ Quenching Reaction of Quasiliving PIB with 1-(2-bromoethyl)pyrrole (PyBr)

The following procedure was carried out under a dry nitrogen atmosphere within a glove box equipped with a thermostatically controlled hexane/heptane cold bath set to −70° C. Into a 75 mL culture tube equipped with a Teflon-lined cap were added 10 mL (−70° C.) of $CH_3Cl$, 15 mL (−70° C.) of n-hexane, and 0.029 mL (RT, 0.027 g, 0.25 mmol) of 2,6 luitidine. This mixture was cooled to −70° C., and then 6.67 mL (−70° C., 4.7 g, 83 mmol) of IB was charged to the reactor. After 10 min equilibration with periodic swirling, 0.605 mL (RT, 0.53 g, 3.6 mmol) of TMPCl was transferred to the reactor. After 5 min equilibration with periodic swirling, 1.175 mL (2.03 g, 10.7 mmol) of $TiCl_4$ was transferred to the reactor to begin polymerization. The initial reagent concentrations were thus fixed as follows: [TMPCl]=0.11 M; [IB]=2.6 M; [26Lut]=7.4×10$^{-3}$ M; [$TiCl_4$]=0.32 M.

Polymerization was allowed to proceed for 30 min. Then, 0.89 mL (1.3 g, 7.4 mmol) (2×TMPCl) of 1-(2-bromoethyl)pyrrole (PyBr) (obtained commercially from TCI, vacuum distilled from $CaH_2$) was added to the polymerization system as a solution in 60/40 Hex/MeCl. PyBr was allowed to react with the quasiliving chain ends for 60 min. The reaction was quenched by addition of 5 mL of prechilled methanol, and subsequently, the polymer was precipitated one time into methanol to remove excess PyBr.

$^1$H NMR analysis of the resulting polymer indicated quantitative end-functionalization and formation of principally 3-PIB-1-(2-bromoethyl)pyrrole with a minor amount of 2-PIB-1-(2-bromoethyl)pyrrole. Quantitative conversion of the tert-chloride end groups was indicated by the disappearance of the characteristic peaks at 1.96 ppm and 1.68 ppm. Two triplets of equal area appeared, centered at 3.52 and 4.19 ppm, which represent the methylene groups bonded to the bromine and nitrogen atoms, respectively, of the 3-PIB isomer. Methylene signals for the 2-PIB-isomer appeared relatively stronger here compared to the primary chloride functional polymer in Example 1 above, suggesting that for PyBr the EAS reaction may be less strongly directed to the 3-position compared to the case for the PyCl quencher. For the 2-PIB isomer, the methylene protons adjacent to nitrogen appear centered at 4.31, while those adjacent to bromine are nearly completely convoluted with those of the 3-PIB isomer. The signals for the pyrrole ring protons and the PIB ultimate methylene protons exhibit essentially the same pattern observed for the product obtained with the PyCl quencher in Example 1.

Example 3

Synthesis of Monofunctional Primary Chloride-Terminated PIB through In Situ Quenching Reaction of Quasiliving PIB with 1-(2-Chloroethyl)pyrrole Quasiliving polymerization of IB with TMPCl as initiator was carried out within a dry nitrogen atmosphere glovebox, equipped with an integral, cryostated hexane/heptane bath according to the following procedure. Into a round-bottom flask equipped with a mechanical stirrer, infrared probe, and thermocouple were added 100 mL of $CH_3Cl$, 150 mL of n-hexane, and 0.116 mL (0.107 g, 3.7×10$^{-3}$ M) of 2,6-lutidine. The mixture was allowed to equilibrate to −70° C. and then IB, 16.1 mL (11.2 g, 0.74 M) was charged to the reactor. After thermal equilibration, 1.26 mL (1.10 g, 0.027 M) of TMPCl was added to the reactor. To begin the polymerization, 2.45 mL (4.24 g, 0.083 M) of $TiCl_4$ was charged to the reactor. The reaction was allowed to proceed for 10 min, and then a pre-chilled solution of PyCl, prepared by dissolving 1.72 mL PyCl (1.94 g, 15.0 mmol) into 10 mL of hexane/$CH_3Cl$ (60/40, v/v, 70° C.), was added to the polymerization system. The relevant concentrations during quenching were thus: [PyCl]=0.053 M; [CE]=0.026 M; [$TiCl_4$]=0.079 M. PyCl was allowed to react with the living chain ends for 20 min. Finally, the reaction was quenched by addition of excess prechilled methanol. Subsequently, the polymer was dissolved in hexane and washed with methanol and then precipitated one time into methanol from hexane. The precipitate was collected by dissolution in hexane; the solution was washed with water, dried over MgSO4, and concentrated on a rotary evaporator. The polymer was finally vacuum dried at room temperature.

FIG. 1 shows the $^1$H NMR spectrum of the reaction product of quasiliving PIB and 1-(2-chloroethyl)pyrrole. The spectrum indicates quantitative end-functionalization via electrophilic aromatic substitution. Quantitative substitution is indicated by the absence of resonances associated with PIB tert-chloride end groups at 1.96 ppm (PIB—CH$_2$—C(CH$_3$)$_2$—Cl) and 1.68 ppm (PIB—CH$_2$—C(CH$_3$)$_2$—Cl). A new set of resonances appear at 1.65, 3.69, 4.11, 6.05, 6.40, and 6.56 ppm due to the product resulting from substitution at the 3-position of the pyrrole ring (major isomer). Substitution at the 2-position (minor isomer) is also apparent due to resonances at 1.73, 3.73, 4.27, 5.90, 6.07, and 6.59 ppm.

Figure 2:
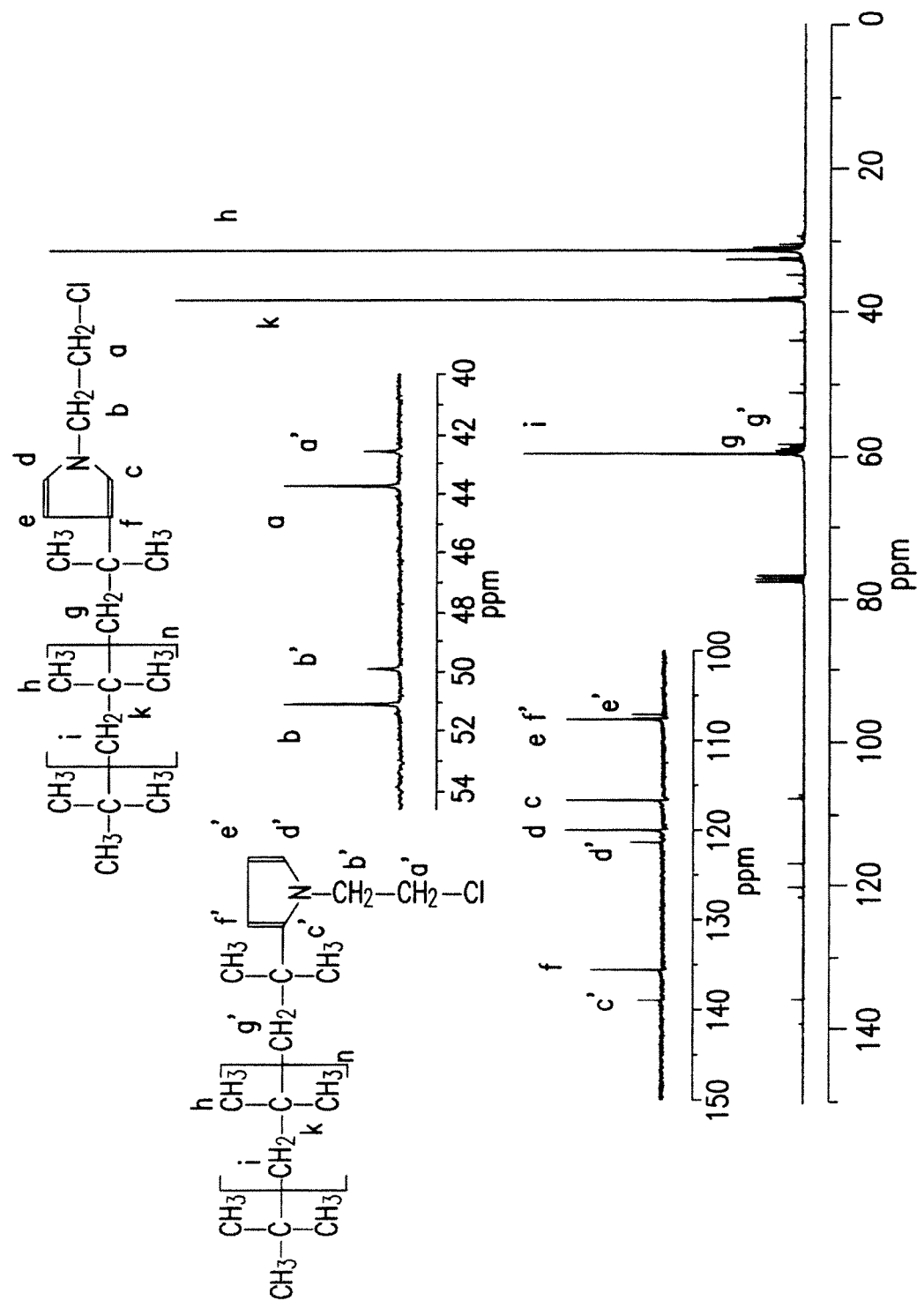
FIG. 2 shows the $^{13}C$ NMR spectrum of monofunctional PIB carrying primary chloride end groups prepared by quenching quasiliving PIB with 1-(2-chloroethyl)pyrrole. The product is a mixture of major and minor isomers with PIB in the 3- and 2-positions of the pyrrole ring, respectively.

FIG. 2 shows the $^{13}$C NMR spectrum of the product. Functionalization of the end groups was confirmed by the disappearance of the resonances at 71.9 and 35.2 ppm, representing the quaternary and geminal dimethyl carbons, respectively, adjacent to the terminal tert-chloride group, and appearance of new peaks in both the aromatic and the aliphatic regions of the spectrum, as indicated by the peak assignments shown in FIG. 2.

Figure 3:
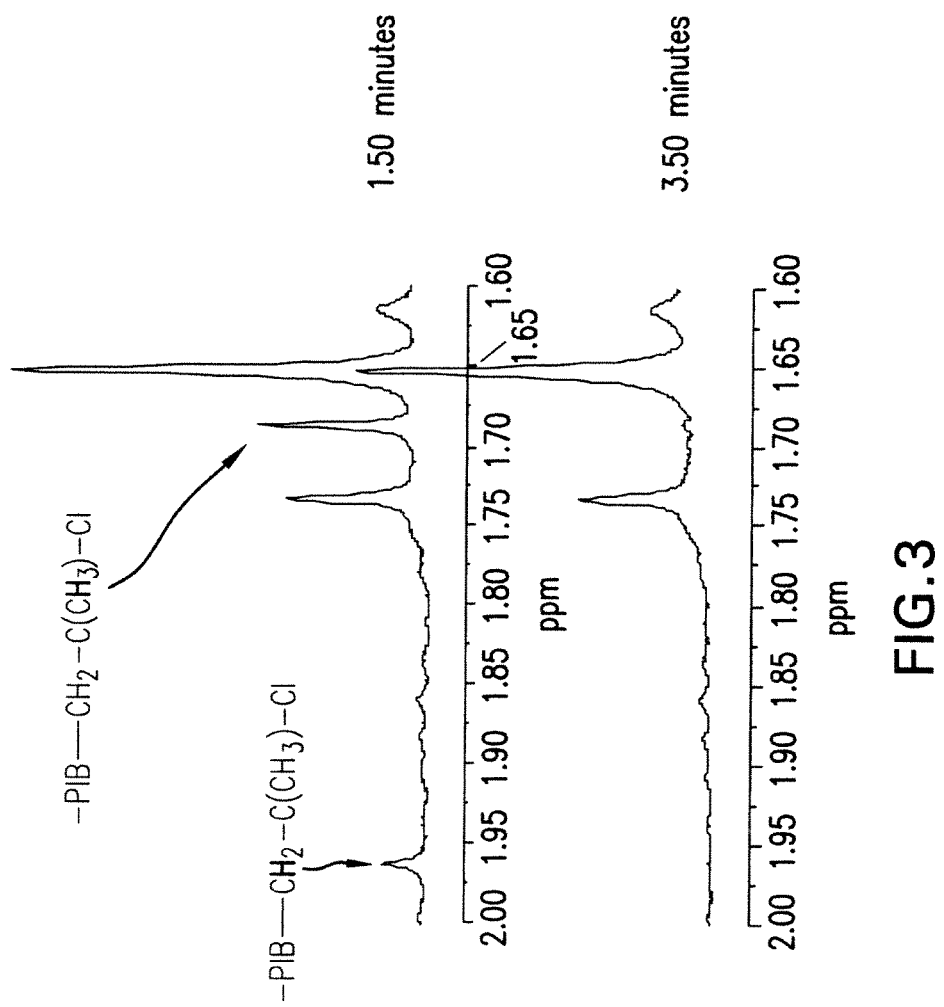
FIG. 3 shows partial $^1H$ NMR spectra of the reaction product of quasiliving PIB with 1-(2-chloroethyl)pyrrole, as a function of time.

Although the quenching reaction with PyCl was carried out for 20 min, it actually required less than 3.5 min for complete functionalization. FIG. 3 shows that the resonances due to the PIB tert-chloride groups are completely absent after 3.5 min.

Figure 4:
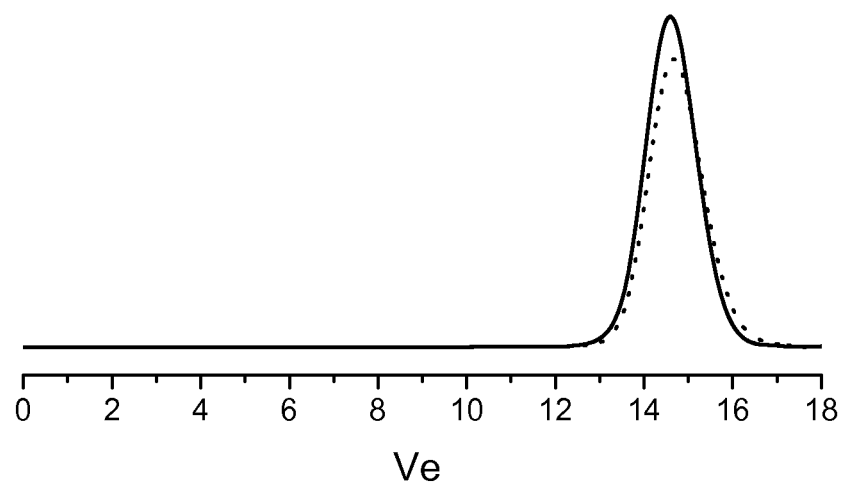
FIG. 4 shows GPC traces of PIB before (dotted) and after (solid) reaction with 1-(2-chloroethyl)pyrrole.

The GPC traces of the PIB prior to and after end-capping were essentially the same, indicating the absence of any coupling reactions or polymer degradation (FIG. 4).

Example 4

Synthesis of Monofunctional Primary Bromide-Terminated PIB through In Situ Quenching of Quasiliving PIB with 1-(2-Bromoethyl)pyrrole Quasiliving polymerization of IB with TMPCl as initiator was carried out within a dry nitrogen atmosphere glovebox, equipped with an integral, cryostated hexane/heptane bath according to the following procedure. Into a round-bottom flask equipped with a mechanical stirrer, infrared probe, and thermocouple were added 72 mL of CH$_3$Cl, 108 mL of n-hexane, and 0.116 mL (0.107 g, 5.1×10$^{-3}$ M) of 2,6-lutidine. The mixture was allowed to equilibrate to −70° C. and then IB, 9.60 mL (6.70 g, 0.62 M) was charged to the reactor. After thermal equilibration, 1.26 mL (1.10 g, 0.038 M) of TMPCl was added to the reactor. To begin the polymerization, 2.44 mL (4.22 g, 0.115 M) of TiCl$_4$ was charged to the reactor. The reaction was allowed to proceed for 10 min, and then a prechilled solution of PyBr, prepared by dissolving 1.852 mL PyBr (2.70 g, 15.5 mmol) into 10 mL of hexane/CH$_3$Cl (60/40, v/v, 70° C.), was added to the polymerization system. The relevant concentrations during quenching were thus: [PyBr]=0.076 M; [CE]=0.036 M; [TiCl$_4$]=0.108 M. PyBr was allowed to react with the living chain ends for 20 min. Finally, the reaction was quenched by addition of excess prechilled methanol. Subsequently, the polymer was dissolved in hexane and washed with methanol and then precipitated one time into methanol from hexane. The precipitate was collected by dissolution in hexane; the solution was washed with water, dried over MgSO$_4$, and concentrated on a rotary evaporator. The polymer was finally vacuum dried at room temperature.

Figure 5:
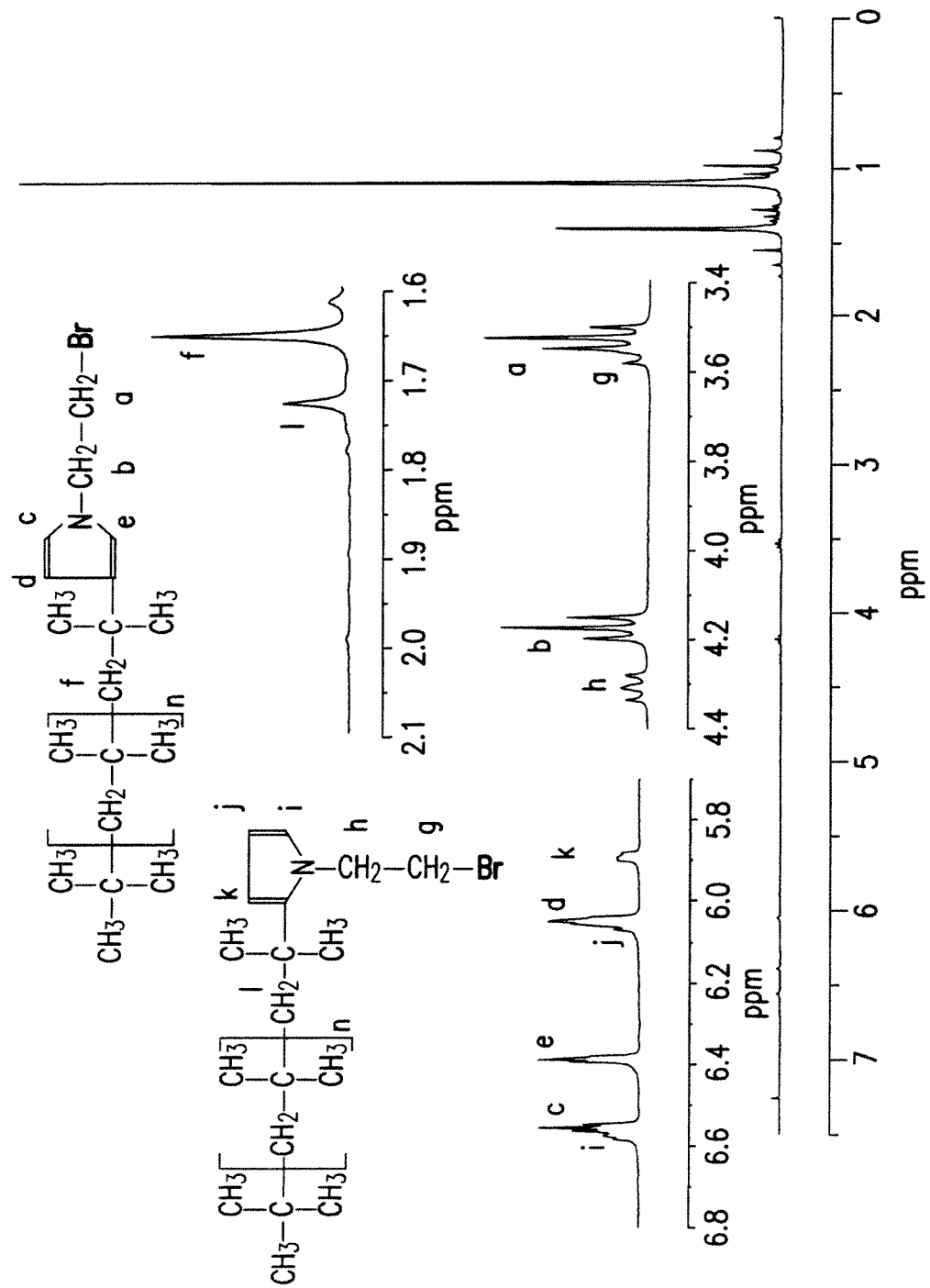
FIG. 5 shows the $^1H$ NMR spectrum of monofunctional PIB carrying primary bromide end groups prepared by quenching quasiliving PIB with 1-(2-bromoethyl)pyrrole. The product is a mixture of major and minor isomers with PIB in the 3- and 2-positions of the pyrrole ring, respectively. Expansion of the 1.6-2.1 region shows the complete consumption of tert-chloride end groups as indicated by the absence of characteristic peaks at 1.96 and 1.68 ppm.

FIG. 5 shows the $^1$H NMR spectrum of the reaction product of quasiliving PIB and 1-(2-bromoethyl)pyrrole. The spectrum indicates quantitative end-functionalization via electrophilic aromatic substitution. Quantitative substitution is indicated by the absence of resonances associated with PIB tert-chloride end groups at 1.96 ppm (PIB—CH$_2$—C(CH$_3$)$_2$—Cl) and 1.68 ppm (PIB—CH$_2$—C(CH$_3$)$_2$—Cl). A new set of resonances appear at 1.65, 3.53, 4.18, 6.05, 6.40, and 6.56 ppm due to the product resulting from substitution at the 3-position of the pyrrole ring (major isomer). Substitution at the 2-position (minor isomer) is also apparent due to resonances at 1.73, 3.58, 4.31, 5.90, 6.07, and 6.59 ppm.

Figure 6:
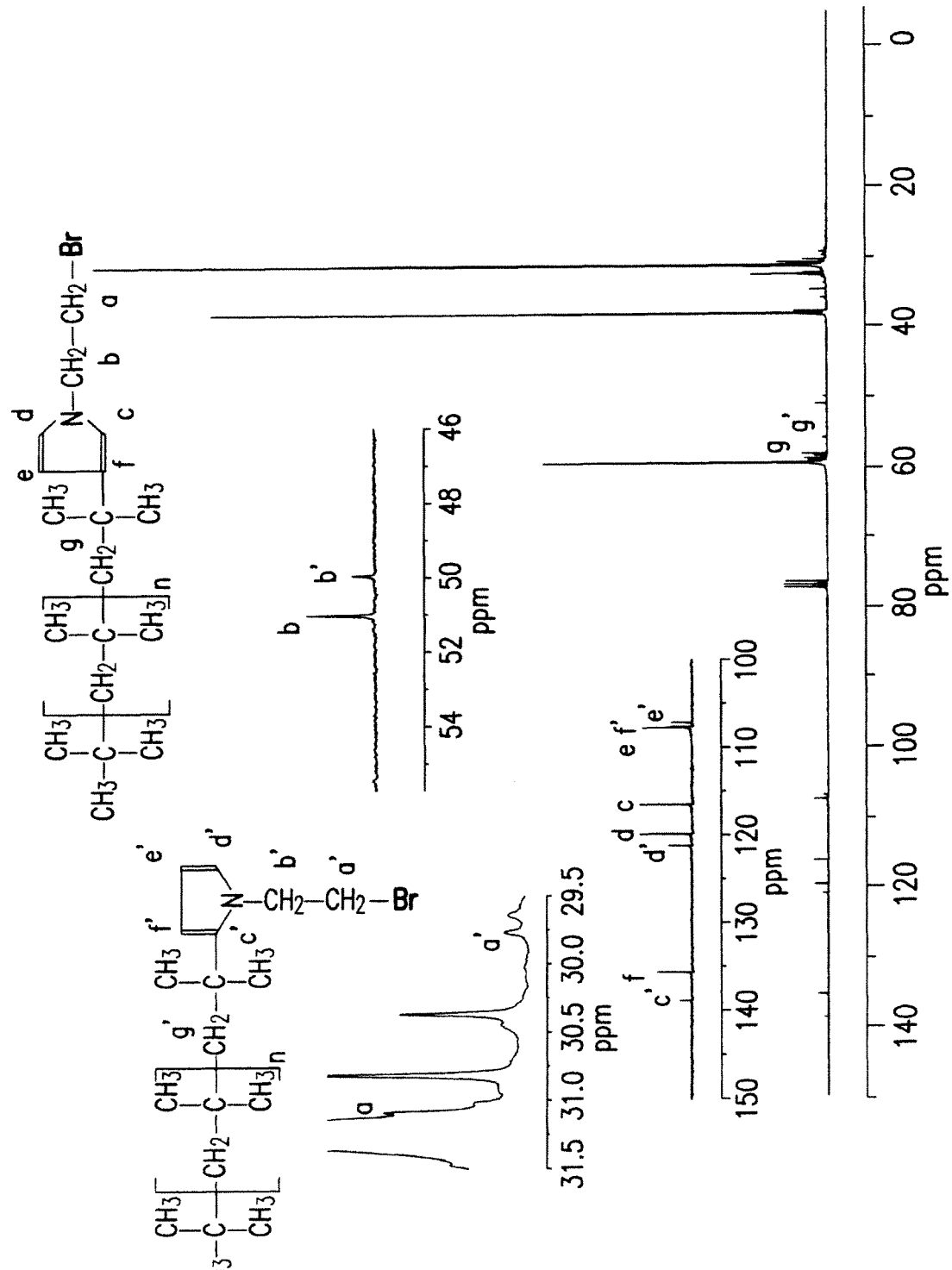
FIG. 6 shows the $^{13}C$ NMR spectrum of monofunctional PIB carrying primary bromide end groups prepared by quenching quasiliving PIB with 1-(2-bromoethyl)pyrrole. The product is a mixture of major and minor isomers with PIB in the 3- and 2-positions of the pyrrole ring, respectively.

FIG. 6 shows the $^{13}$C NMR spectrum of the product. Functionalization of the end groups was confirmed by the disappearance of the resonances at 71.9 and 35.2 ppm, representing the quaternary and geminal dimethyl carbons, respectively, adjacent to the terminal tert-chloride group, and appearance of new peaks in both the aromatic and the aliphatic regions of the spectrum, as indicated by the peak assignments shown in FIG. 6.

Figure 7:
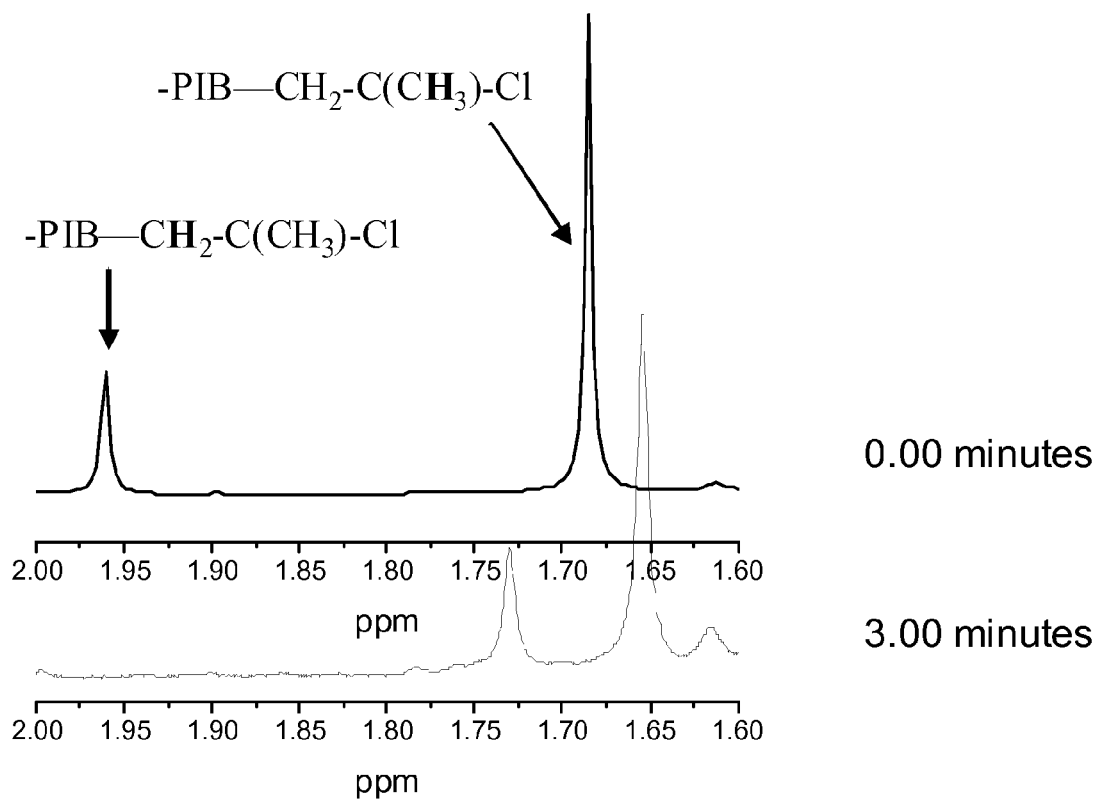
FIG. 7 shows partial $^1H$ NMR spectra of the reaction product of quasiliving PIB with 1-(2-bromoethyl)pyrrole, as a function of time.

Although the capping reaction with PyBr was carried out for 20 min, it actually required less than 3.0 min for complete functionalization. FIG. 7 shows that the resonances due to the PIB tert-chloride groups are completely absent after 3.0 min.

Figure 8:
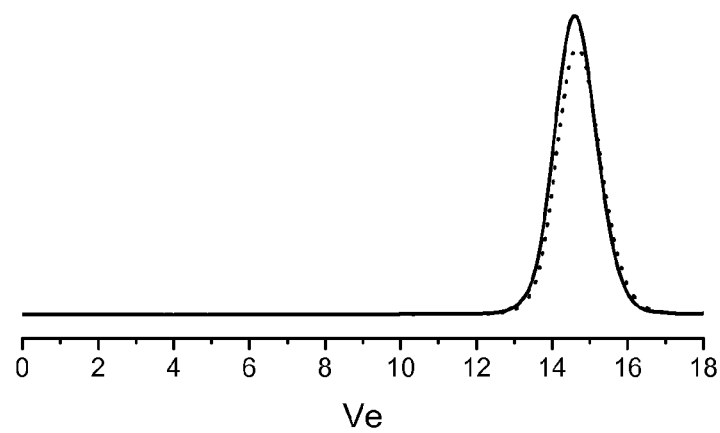
FIG. 8 shows GPC traces of PIB before (dotted) and after (solid) reaction with 1-(2-bromoethyl)pyrrole.

The GPC traces of the PIB prior to and after end-capping were essentially the same, indicating the absence of any coupling reactions or polymer degradation (FIG. 8).

Example 5

Synthesis of Difunctional Primary Chloride-Terminated PIB through In Situ Quenching of bDCC-Initiated Quasiliving PIB with 1-(2-Chloroethyl)pyrrole Quasiliving polymerization of IB with t-Bu-m-DCC as initiator was carried out within a dry nitrogen atmosphere glovebox, equipped with an integral, cryostated hexane/heptane bath according to the following procedure. Into a round-bottom flask equipped with a mechanical stirrer, infrared probe, and thermocouple were added 72 mL of CH$_3$Cl, 108 mL of n-hexane, and 0.116 mL (0.107 g, 5.3×10$^{-3}$ M) of 2,6-lutidine. The mixture was allowed to equilibrate to −70° C., and then 5.7 mL (4.0 g, 0.38 M) of IB was charged to the reactor. After thermal equilibration, 0.7182 g (0.013) of bDCC was added to the reactor. To begin the polymerization, 1.64 mL (2.84 g, 0.080 M) of TiCl$_4$ was charged to the reactor. The reaction was allowed to proceed for 26 min, and then a pre-chilled solution of PyCl, prepared by dissolving 1.157 mL PyCl (1.31 g, 10.1 mmol) into 10 mL of hexane/CH$_3$Cl (60/40, v/v, 70° C.), was added to the polymerization system. The relevant concentrations during quenching were thus: [PyCl]=0.051 M; [CE]=0.025 M; [TiCl$_4$]=0.075 M. PyCl was allowed to react with the living chain ends for 30 min. Finally, the reaction was quenched by addition of prechilled methanol. Subsequently, the polymer was precipitated one time into methanol in order to remove excess 1-(2-chloroethyl)pyrrole.

Figure 9:
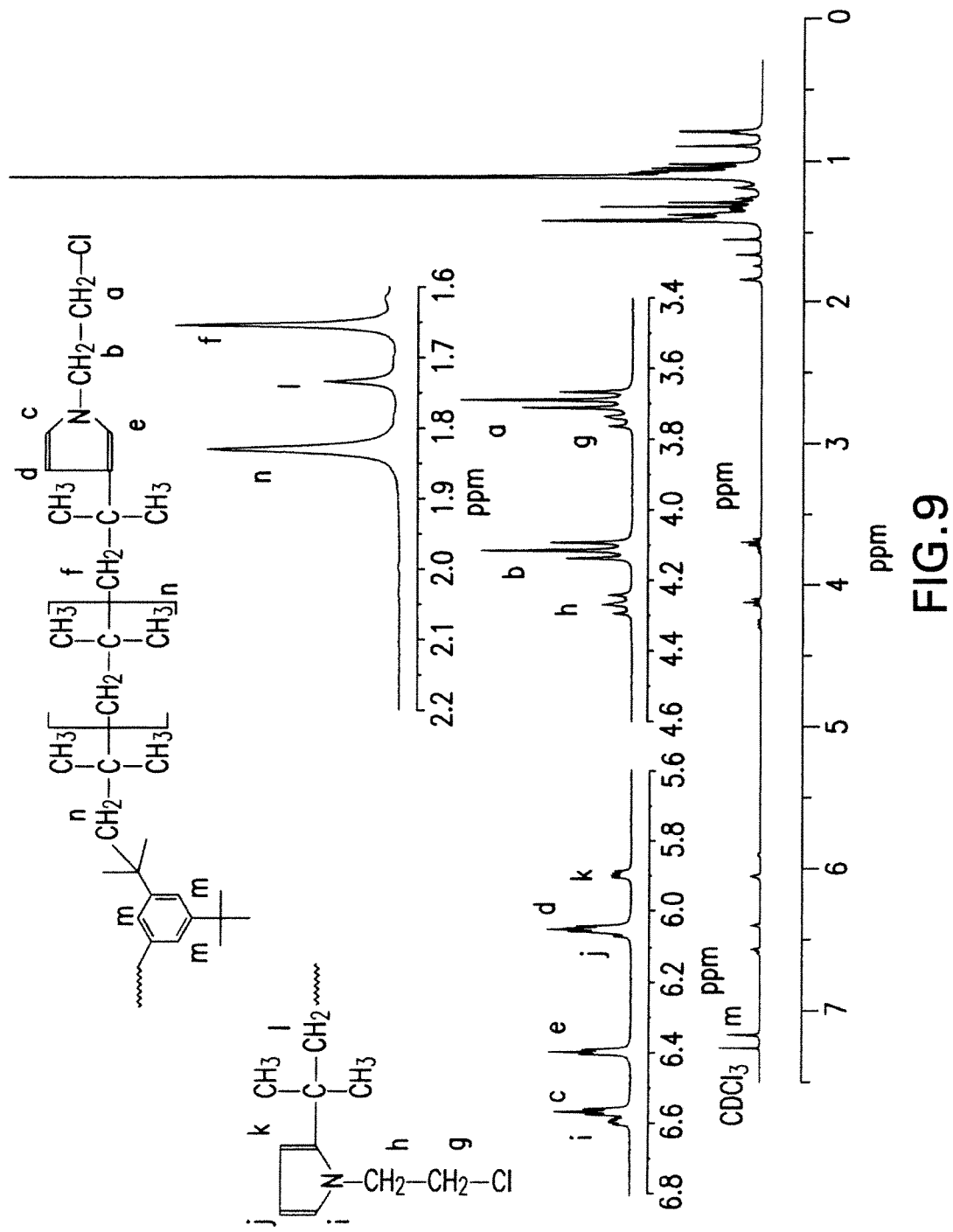
FIG. 9 shows the $^1H$ NMR spectrum of difunctional PIB carrying primary chloride end groups prepared by quenching quasiliving PIB with 1-(2-chloroethyl)pyrrole. The end groups are a mixture of major and minor isomers with PIB in the 3- and 2-positions of the pyrrole ring, respectively. Expansion of the 1.6-2.2 region shows the complete consumption of tert-chloride end groups as indicated by the absence of characteristic peaks at 1.96 and 1.68 ppm.

FIG. 9 shows the $^1$H NMR spectrum of the reaction product of difunctional quasiliving PIB and 1-(2-chloroethyl)pyrrole. Addition of the pyrrole moieties to the chain ends is indicated by the absence of resonances associated with PIB tert-chloride end groups at 1.96 ppm and 1.68 ppm. A new set of resonances appear at 1.65, 3.69, 4.11, 6.05, 6.40, and 6.56 ppm due to the product resulting from substitution at the 3-position of the pyrrole ring (major isomer). Substitution at the 2-position (minor isomer) is also apparent due to resonances at 1.73, 3.73, 4.27, 5.90, 6.07, and 6.59 ppm.

Figure 10:
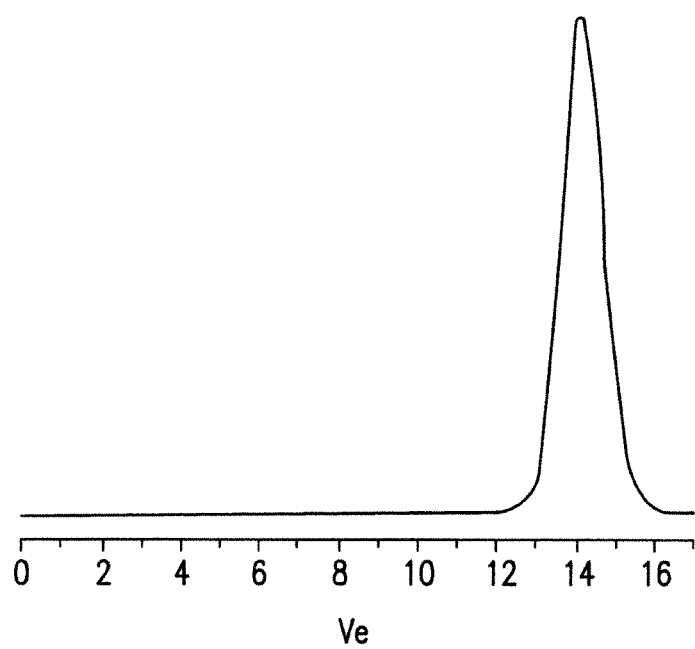
FIG. 10 shows the GPC trace of difunctional PIB after reaction with 1-(2-chloroethyl)pyrrole.

SEC analysis of the final PIB confirmed the absence of any coupling reactions or polymer degradation (FIG. 10).

The aromatic initiator residue from bDCC provided an internal reference for quantification of end group functionality by $^1$H NMR. Thus, various end group resonance areas were integrated and compared to the integrated area of the aromatic protons (m) in FIG. 9. As shown in Table 1, the results indicated essentially quantitative functionalization of the chain ends. For example, integration of the methylene protons adjacent to the chloride group (g+a) and to the nitrogen of the pyrrole ring (h+b) yielded percent end group functionality of 101%. Integration of the various pyrrole ring hydrogens yielded 90-92% end group functionality. Integration of the b protons ($-CH_2-CH_2-Cl$ of the 3-isomer) yielded the fraction of 3 isomer [b/(h+b)] as 0.73; likewise integration of the H2 proton (e) of the 3 isomer yielded the fraction of 3 isomer [e/(k+e)] as 0.73.

TABLE 1

| Peak | Peak Description | Protons | Experimental Integration | Theoretical Integration | End Group Functionality % |
|---|---|---|---|---|---|
| m | bDCC residue | 3 | — | 1.0 | — |
| h + b | $-CH_2-CH_2-Cl$ (2 and 3 isomer) | 4 | 1.34 | 1.333 | 101 |
| g + a | $-CH_2-CH_2-Cl$ (2 and 3 isomer) | 4 | 1.34 | 1.333 | 101 |
| i + c | H5-pyrrole ring (2 and 3 isomer) | 2 | 0.60 | 0.667 | 90 |
| j + d | H4-pyrrole ring (2 and 3 isomer) | 2 | 0.61 | 0.667 | 92 |
| e + k | H2-pyrrole ring (3 isomer) H3-pyrrole ring (2 isomer) | 2 | 0.61 | 0.667 | 92 |

Example 6

Synthesis of Difunctional Primary Bromide-Terminated PIB through In Situ Quenching of bDCC-Initiated Quasiliving PIB with 1-(2-Bromoethyl)pyrrole Quasiliving polymerization of IB with bDCC as initiator was carried out within a dry nitrogen atmosphere glovebox, equipped with an integral, cryostated hexane/heptane bath according to the following procedure. Into a round-bottom flask equipped with a mechanical stirrer, infrared probe, and thermocouple were added 72 mL of $CH_3Cl$, 108 mL of n-hexane, and 0.116 mL (0.107 g, $5.3\times10^{-3}$ M) of 2,6 Lutidine. The mixture was allowed to equilibrate to $-70°$ C., and then 5.7 mL (4.0 g, 0.38 M) of IB was charged to the reactor. After thermal equilibration, 0.718 g (0.013 M) of bDCC was added to the reactor. To begin the polymerization, 1.64 mL (2.84 g, 0.080 M) of $TiCl_4$ was charged to the reactor. The reaction was allowed to proceed for 26 min, and then a pre-chilled solution of PyBr, prepared by dissolving 1.24 mL PyBr (1.81 g, 10.4 mmol) into 10 mL of hexane/$CH_3Cl$ (60/40, v/v, $70°$ C.), was added to the polymerization system. The relevant concentrations during quenching were thus: [PyBr]=0.052 M; [CE]=0.025 M; [$TiCl_4$]=0.075 M. PyBr was allowed to react with the living chain ends for 30 min. Finally, the reaction was quenched by addition of prechilled methanol. Subsequently, the polymer was precipitated one time into methanol in order to remove excess of 1-(2-bromoethyl)pyrrole.

Figure 11:
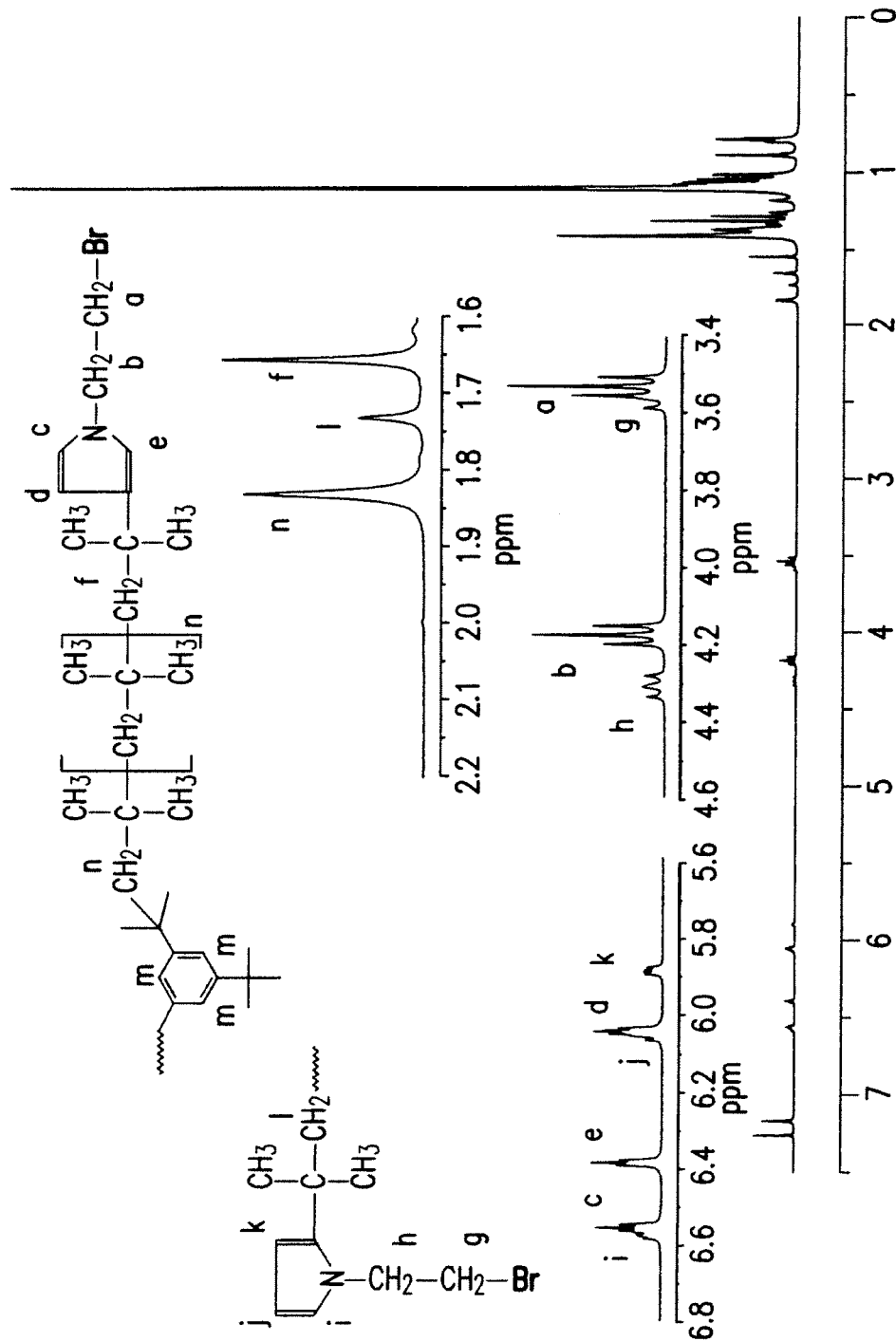
FIG. 11 shows the $^1H$ NMR spectrum of difunctional PIB carrying primary bromide end groups prepared by quenching quasiliving PIB with 1-(2-bromoethyl)pyrrole. The end groups are a mixture of major and minor isomers with PIB in the 3- and 2-positions of the pyrrole ring, respectively. Expansion of the 1.6-2.2 region shows the complete consumption of tert-chloride end groups as indicated by the absence of characteristic peaks at 1.96 and 1.68 ppm.

FIG. 11 shows the $^1H$ NMR spectrum of the reaction product of difunctional quasiliving PIB and 1-(2-bromoethyl)pyrrole. Addition of the pyrrole moieties to the chain ends is indicated by the absence of resonances associated with PIB tert-chloride end groups at 1.96 ppm and 1.68 ppm. A new set of resonances appear at 1.65, 3.53, 4.18, 6.05, 6.40, and 6.56 ppm due to the product resulting from substitution at the 3-position of the pyrrole ring (major isomer). Substitution at the 2-position (minor isomer) is also apparent due to resonances at 1.73, 3.58, 4.31, 5.90, 6.07, and 6.59 ppm.

Figure 12:
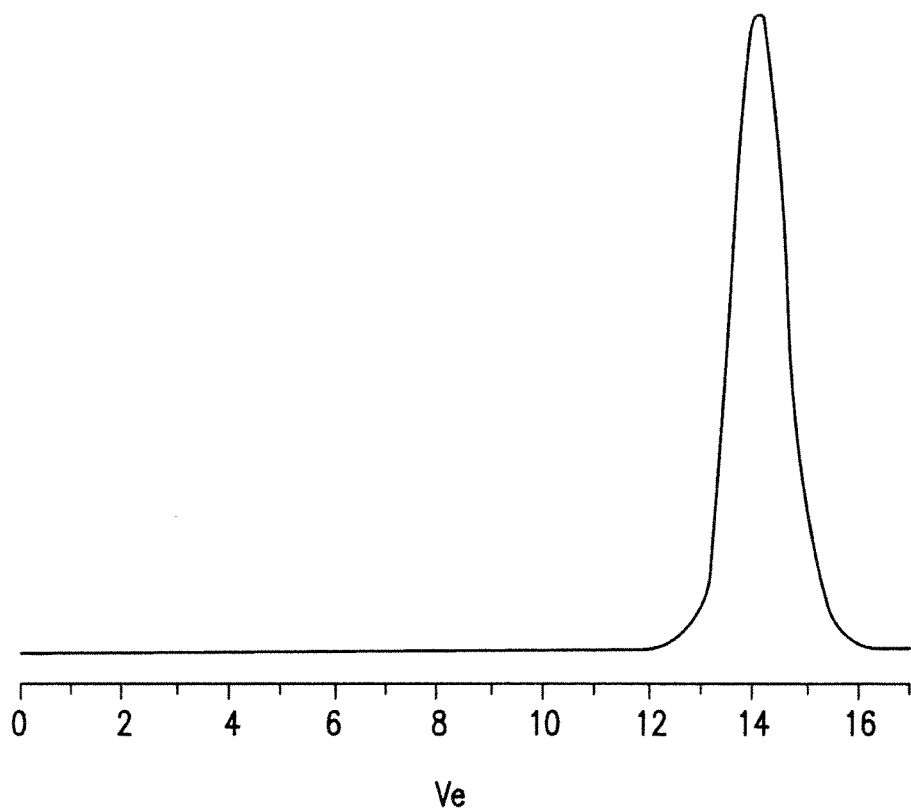
FIG. 12 shows the GPC trace of difunctional PIB after reaction with 1-(2-bromoethyl)pyrrole.

SEC analysis of the final PIB confirmed the absence of any coupling reactions or polymer degradation (FIG. 12).

The aromatic initiator residue from bDCC provided an internal reference for quantification of end group functionality by $^1H$ NMR. Thus, various end group resonance areas were integrated and compared to the integrated area of the aromatic protons (m) in FIG. 11. As shown in Table 2, the results indicated essentially quantitative functionalization of the chain ends. For example, integration of the methylene protons adjacent to the bromide group (h+b) and to the nitrogen of the pyrrole ring (g+a) yielded percent end group functionality of 101%. Integration of the various pyrrole ring hydrogens yielded 90-93% end group functionality. Integration of the b protons ($-CH_2-CH_2-Cl$ of the 3-isomer) yielded the fraction of 3 isomer [b/(h+b)] as 0.73; likewise integration of the H2 proton of the 3 isomer (e) yielded the fraction of 3 isomer [e/(k+e)] as 0.72.

TABLE 2

| Peak | Peak Description | Protons | Experimental Integration | Theoretical Integration | End Group Functionality % |
|---|---|---|---|---|---|
| m | bDCC residue | 3 | — | 1.0 | — |
| h + b | $-CH_2-CH_2-Br$ (2 and 3 isomer) | 4 | 1.34 | 1.333 | 101 |
| g + a | $-CH_2-CH_2-Br$ (2 and 3 isomer) | 4 | 1.33 | 1.333 | 100 |
| i + c | H5-pyrrole ring (2 and 3 isomer) | 2 | 0.60 | 0.667 | 90 |
| j + d | H4-pyrrole ring (2 and 3 isomer) | 2 | 0.61 | 0.667 | 92 |
| e + k | H2-pyrrole ring (3 isomer) H3-pyrrole ring (2 isomer) | 2 | 0.62 | 0.667 | 93 |

Example 7

Up-Scaling of Monofunctional Primary Bromide-Terminated PIB through In Situ Quenching of Quasiliving PIB with 1-(2-Bromoethyl)pyrrole Quasiliving polymerization of IB with TMPCl as initiator was carried out within a dry nitrogen atmosphere glovebox, equipped with an integral, cryostated hexane/heptane bath according to the following procedure. Into a round-bottom flask equipped with a mechanical stirrer, infrared probe, and thermocouple were added 680 mL of $CH_3Cl$, 1,020 mL of n-hexane, and 0.667 mL (0.614 g, $3.2\times10^{-3}$ M) of 2,6-lutidine. The mixture was allowed to equilibrate to $-70°$ C. and then IB, 96 mL (67 g, 0.66 M) was charged to the reactor. After thermal equilibration, 4.95 mL (4.33 g, 0.016 M) of TMPCl was added to the reactor. To begin the polymerization, 9.58 mL (16.6 g, 0.048 M) of $TiCl_4$ was charged to the reactor. The reaction was allowed to proceed for 25 min, and then a pre-chilled solution of PyBr, prepared by dissolving 7.24 mL PyBr (10.6 g, 60.7 mmol) into a mixture of 15 mL of hexane and 10 mL $CH_3Cl$, was added to the polymerization system. The relevant concentrations during quenching were thus: [PyBr]=0.033 M; [CE]=0.016 M; [$TiCl_4$]=0.047 M. PyBr was allowed to react with the living chain ends for 30 min. Finally, the reaction was quenched by addition of excess prechilled methanol. Subsequently, the polymer was dissolved in hexane, and the resulting solution was washed with methanol in a separatory funnel. The polymer was then precipitated one time into methanol from hexane. The swollen precipitate was re-dissolved in hexane, and the resulting solution was washed with water in a separatory funnel and dried over $MgSO_4$. The dried solution was passed through a column of silica gel. The polymer was freed of hexane by distillation using a rotary evaporator and final vacuum drying in a vacuum oven at room temperature.

$^1H$ NMR analysis of the resulting polymer indicated quantitative end-functionalization and formation of principally 3-PIB-1-(2-bromoethyl)pyrrole with a minor amount of 2-PIB-1-(2-bromoethyl)pyrrole.

GPC analysis of the final product confirmed the absence of any coupling reactions or polymer degradation.

Example 8

Synthesis of Monofunctional Primary Bromide-Terminated PIB through In Situ Quenching of Quasiliving PIB with 1-(3-bromopropyl)pyrrole (PyBrP)

N-(3-Bromopropyl)pyrrole (PyBrP) was synthesized by N-alkylation of pyrrolyl sodium salt with 1,3-dibromopropane in DMSO and purified by fractional distillation.

Quasiliving polymerization of IB with TMPCl as initiator was carried out within a dry nitrogen atmosphere glovebox, equipped with an integral, cryostated hexane/heptane bath according to the following procedure. Into a round-bottom flask equipped with a mechanical stirrer, infrared probe, and thermocouple were added 108 mL of $CH_3Cl$, 72 mL of n-hexane, and 0.07 mL (64 mg, $3.1\times10^{-3}$ M) of 2,6-lutidine. The mixture was allowed to equilibrate to $-70°$ C. and then IB, 9.6 mL (6.7 g, 0.62 M) was charged to the reactor. After thermal equilibration, 1.26 mL (1.10 g, 0.038 M) of TMPCl was added to the reactor. To begin the polymerization, 2.44 mL (4.22 g, 0.12 M) of $TiCl_4$ was charged to the reactor. The reaction was allowed to proceed for 10 min, and then a pre-chilled solution of PyBrP, prepared by dissolving 2.00 mL PyBrP (2.72 g, 14.5 mmol) into a mixture of 15 mL of hexane and 10 mL $CH_3Cl$, was added to the polymerization system. The relevant concentrations during quenching were thus: [PyBrP]=0.066 M; [CE]=0.034 M; [$TiCl_4$]=0.101 M. PyBrP was allowed to react with the living chain ends for 60 min. Finally, the reaction was quenched by addition of excess prechilled methanol. Subsequently, the polymer was dissolved in hexane and washed with methanol and then precipitated one time into methanol from hexane. The precipitate was collected by dissolution in hexane; the solution was washed with water, dried over $MgSO_4$, and concentrated on a rotary evaporator. The polymer was finally vacuum dried at room temperature.

$^1H$ NMR analysis of the resulting polymer indicated quantitative end-functionalization and formation of principally 3-PIB-1-(3-bromopropyl)pyrrole with a minor amount of 2-PIB-1-(3-bromopropyl)pyrrole. Quantitative conversion of the tert-chloride end groups was indicated by the disappearance of the characteristic peaks at 1.96 ppm and 1.68 ppm. Three multiplets of equal area, representing the methylene units of the trimethylene tether of the 3-PIB isomer were observed centered at 3.29 (triplet, $—CH_2—CH_2—CH_2—Br$), 2.21 (multiplet, $—CH_2—CH_2—CH_2—Br$), and 3.99 ppm (triplet, $—CH_2—CH_2—CH_2—Br$). Weaker, analogous signals for the 2-PIB isomer were observed centered at 3.50, 2.35, and 4.13 ppm. The pyrrole ring protons of the 3-PIB isomer were observed as multiplets at 6.02, 6.38, and 6.55 ppm, and those of the 2-PIB isomer were observed at 5.88, 6.05 and 6.59 ppm. Singlets at 1.65 and 1.73 ppm were assigned to the ultimate methylene unit of the PIB chain in the 3- and 2-PIB isomer, respectively.

Figure 13:
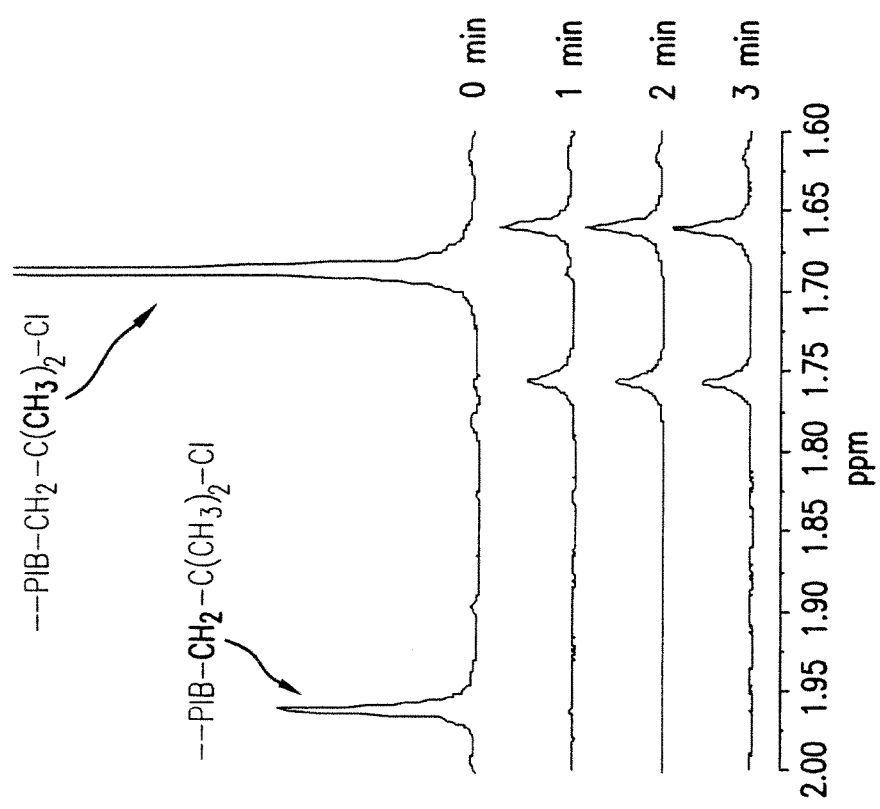
FIG. 13 shows partial $^1H$ NMR spectra of the reaction product of monofunctional quasiliving PIB with 1-(3-bromopropyl)pyrrole, as a function of time.

Although quenching was carried out for 60 min, NMR analysis of aliquots removed from the reactor at various times showed that quantitative quenching was complete in under three minutes (FIG. 13).

GPC analysis of the final polymer showed no evidence of coupling products.

Example 9

Synthesis of Difunctional Primary Bromide-Terminated PIB through In Situ Quenching of Quasiliving PIB with 1-(3-bromopropyl)pyrrole N-(3-Bromopropyl)pyrrole (PyBrP) was synthesized by N-alkylation of pyrrolyl sodium salt with 1,3-dibromopropane in DMSO and purified by fractional distillation.

Quasiliving polymerization of IB with bDCC as initiator was carried out within a dry nitrogen atmosphere glovebox, equipped with an integral, cryostated hexane/heptane bath according to the following procedure. Into a round-bottom flask equipped with a mechanical stirrer, infrared probe, and thermocouple were added 108 mL of $CH_3Cl$, 72 mL of n-hexane, and 0.07 mL (64 mg, $3.2\times10^{-3}$ M) of 2,6-lutidine. The mixture was allowed to equilibrate to $-70°$ C. and then IB, 5.4 mL (3.8 g, 0.36 M) was charged to the reactor. After thermal equilibration, 0.7182 g (0.013 M) of bDCC was added to the reactor. To begin the polymerization, 1.64 mL (2.84 g, 0.080 M) of $TiCl_4$ was charged to the reactor. The reaction was allowed to proceed for 15 min, and then a pre-chilled solution of PyBrP, prepared by dissolving 1.38 mL PyBrP (1.88 g, 10.0 mmol) into a mixture of 15 mL of hexane and 10 mL $CH_3Cl$, was added to the polymerization system. The relevant concentrations during quenching were thus: [PyBrP]=0.047 M; [CE]=0.023 M; [$TiCl_4$]=0.070 M. PyBrP was allowed to react with the living chain ends for 30 min. Finally, the reaction was quenched by addition of excess prechilled methanol. Subsequently, the polymer was dissolved in hexane and washed with methanol and then precipitated one time into methanol from hexane. The precipitate was collected by dissolution in hexane; the solution was washed with water, dried over $MgSO_4$, and concentrated on a rotary evaporator. The polymer was finally vacuum dried at room temperature.

Figure 14:
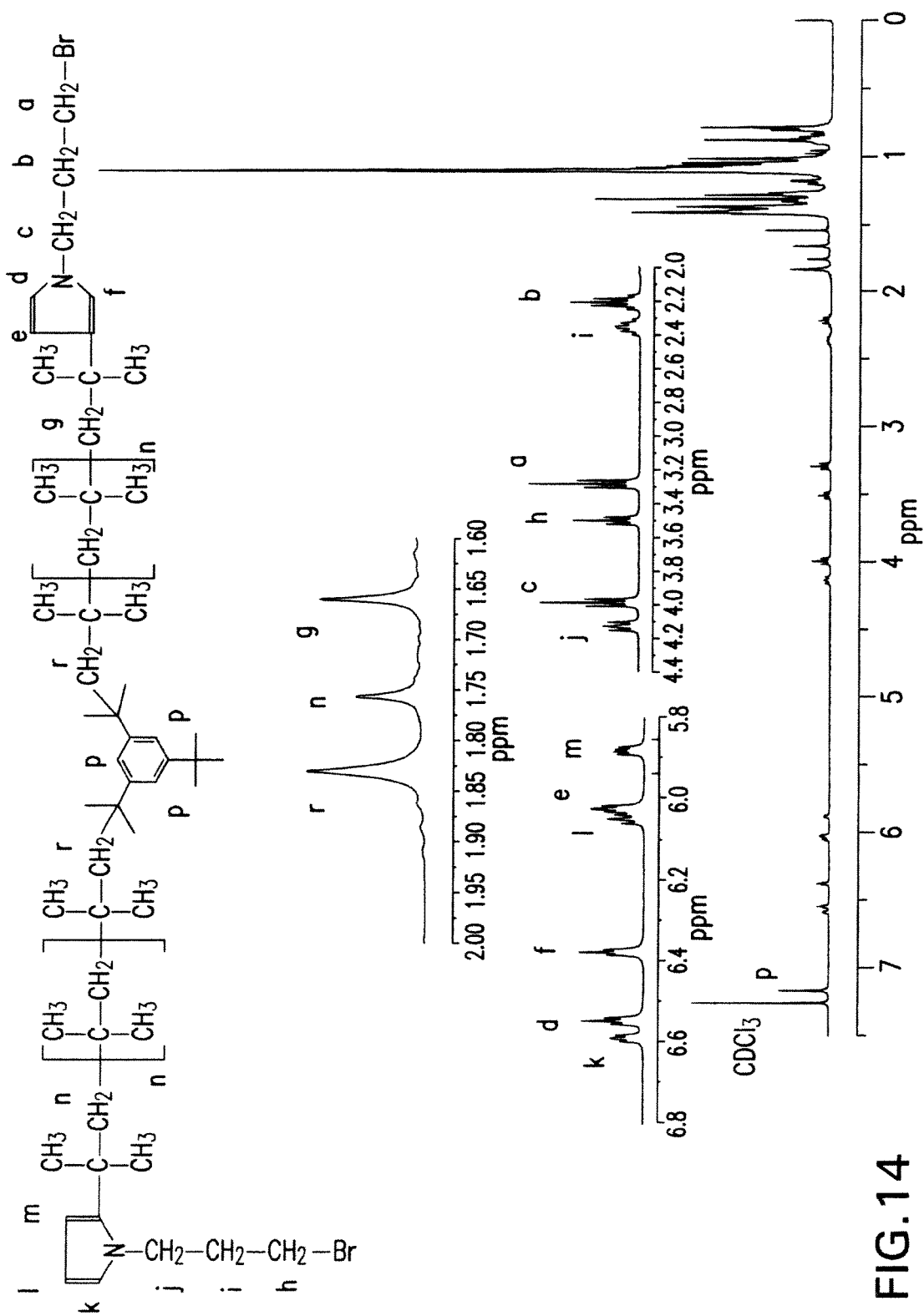
FIG. 14 shows the $^1H$ NMR spectrum of difunctional PIB carrying primary bromide end groups prepared by quenching quasiliving PIB with 1-(3-bromopropyl)pyrrole. The product is a mixture of major and minor isomers with PIB in the 3- and 2-positions of the pyrrole ring, respectively.

FIG. 14 shows the $^1H$ NMR spectrum of the reaction product of difunctional quasiliving PIB and 1-(3-bromopropyl) pyrrole. Addition of the pyrrole moieties to the chain ends is indicated by the absence of resonances associated with PIB tert-chloride end groups at 1.96 ppm and 1.68 ppm. A new set of resonances appears at 1.65, 2.21, 3.29, 3.99, 6.02, 6.38, and 6.55 ppm due to the product resulting from substitution at the 3-position of the pyrrole ring (major isomer). The product resulting from substitution at the 2-position (minor isomer) is observed at 1.73, 2.35, 3.50, 4.13, 5.88, 6.05, and 6.59 ppm.

Figure 15:
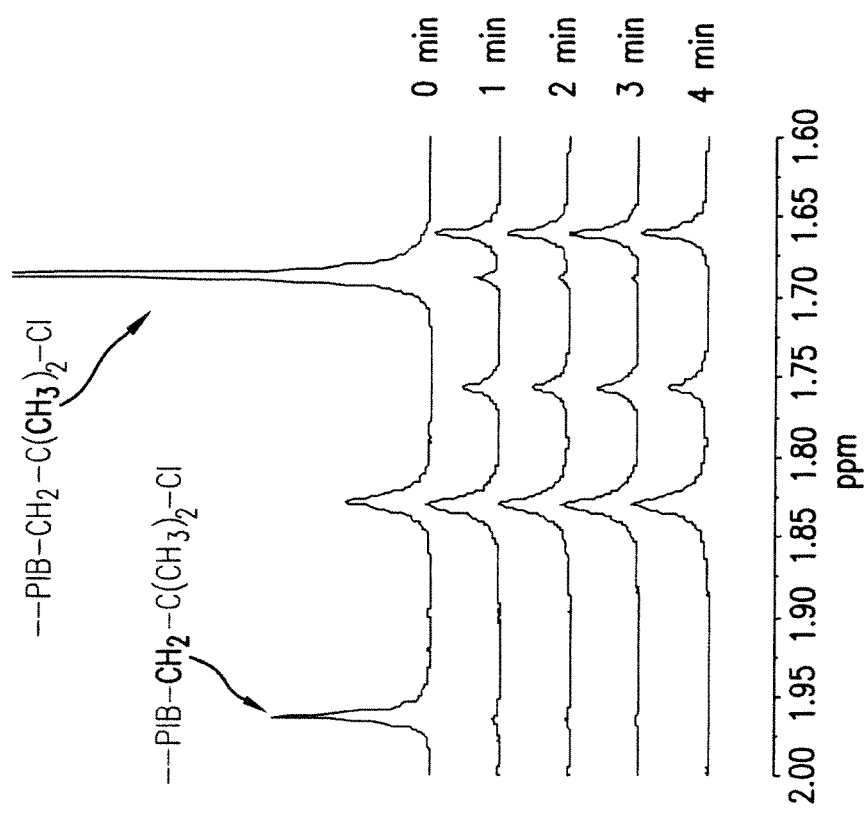
FIG. 15 shows partial $^1$H NMR spectra of the reaction product of difunctional quasiliving PIB with 1-(3-bromopropyl)pyrrole, as a function of time.

Although quenching was carried out for 30 min, NMR analysis of aliquots removed from the reactor at various times showed that quantitative quenching was complete in under three minutes (FIG. 15).

SEC analysis of the final PIB confirmed the absence of any coupling reactions or polymer degradation.

Example 10

Up-Scaling of Difunctional Primary Bromide-Terminated PIB through In Situ Quenching of Quasiliving PIB with 1-(2-Bromoethyl)pyrrole Quasiliving polymerization of IB with bDCC as initiator was carried out within a dry nitrogen atmosphere glovebox, equipped with an integral, cryostated hexane/heptane bath according to the following procedure. Into a round-bottom flask equipped with a mechanical stirrer, infrared probe, and thermocouple were added 680 mL of $CH_3Cl$, 1,020 mL of n-hexane, and 0.667 mL (0.614 g, $3.2 \times 10^{-3}$ M) of 2,6-lutidine. The mixture was allowed to equilibrate to −70° C. and then IB, 85.95 mL (60.0 g, 0.59 M) was charged to the reactor. After thermal equilibration, 7.494 g (0.013 M) of bDCC was added to the reactor. To begin the polymerization, 17.16 mL (29.7 g, 0.086 M) of $TiCl_4$ was charged to the reactor. The reaction was allowed to proceed for 55 min, and then a prechilled solution of PyBr, prepared by dissolving 12.97 mL PyBr (18.9 g, 109 mmol) into a mixture of 15 mL of hexane and 10 mL $CH_3Cl$, was added to the polymerization system. The relevant concentrations during quenching were thus: [PyBr]=0.059 M; [CE]=0.028 M; [$TiCl_4$]=0.085 M. PyBr was allowed to react with the living chain ends for 60 min. Finally, the reaction was quenched by addition of excess prechilled methanol. Subsequently, the polymer was dissolved in hexane, and the resulting solution was washed with methanol in a separatory funnel. The polymer was then precipitated one time into methanol from hexane. The swollen precipitate was re-dissolved in hexane, and the resulting solution was washed with water in a separatory funnel and dried over $MgSO_4$. The dried solution was passed through a column of silica gel. The polymer was freed of hexane by distillation using a rotary evaporator and final vacuum drying in a vacuum oven at room temperature.

The $^1H$ NMR spectrum of the product was similar to FIG. 11. Peak integration analysis (Table 3) indicated quantitative functionalization of the chain ends. Integration of the methylene protons adjacent to the bromide group (h+b) and to the nitrogen of the pyrrole ring (g+a) yielded percent end group functionality of 107-108%. Integration of the various pyrrole ring hydrogens yielded 96-98% end group functionality. Integration of the b protons (—$CH_2$—$CH_2$—Br of the 3-isomer) yielded the fraction of 3 isomer [b/(h+b)] as 0.73; likewise integration of the H2 proton of the 3 isomer (e) yielded the fraction of 3 isomer [e/(k+e)] as 0.70.

TABLE 3

| Peak | Peak Description | Protons | Experimental Integration | Theoretical Integration | End Group Functionality % |
|---|---|---|---|---|---|
| m | bDCC residue | 3 | — | 1.0 | — |
| h + b | —$CH_2$—$CH_2$—Br (2 and 3 isomer) | 4 | 1.42 | 1.333 | 107 |
| g + a | —$CH_2$—$CH_2$—Br (2 and 3 isomer) | 4 | 1.44 | 1.333 | 108 |
| i + c | H5-pyrrole ring (2 and 3 isomer) | 2 | 0.64 | 0.667 | 96 |
| j + d | H4-pyrrole ring (2 and 3 isomer) | 2 | 0.65 | 0.667 | 98 |
| e + k | H2-pyrrole ring (3 isomer) H3-pyrrole ring (2 isomer) | 2 | 0.64 | 0.667 | 96 |

Example 11

Synthesis of Monofunctional Primary Bromide-Terminated PIB Through Reaction of Monofunctional tert-Chloride-Terminated PIB with 1-(2-Bromoethyl)pyrrole in the Presence of $TiCl_4$ Monofunctional tert-chloride-terminated PIB was prepared within a dry nitrogen atmosphere glovebox, equipped with an integral, cryostated hexane/heptane bath, according to the following procedure. Into a round-bottom flask equipped with a mechanical stirrer, infrared probe, and thermocouple were added 654.5 mL of $CH_3Cl$, and 0.58 mL (0.53 g, $6.2 \times 10^{-3}$ M) of 2,6-lutidine. The mixture was allowed to equilibrate to −70° C. and then IB, 97.15 mL (67.81 g, 1.51 M) was charged to the reactor. After thermal equilibration, 6.12 mL (5.35 g, 0.045 M) of TMPCl was added to the reactor. To begin the polymerization, 41.63 mL (63.69 g, 0.680 M) of $BCl_3$ was charged to the reactor. The reaction was allowed to proceed for 7 h. Finally, the reaction was quenched by addition of excess prechilled methanol. Subsequently, the polymer was dissolved in hexane and washed with methanol and then precipitated one time into methanol from hexane. The precipitate was collected by dissolution in hexane; the solution was washed with water, dried over MgSO4, and concentrated on a rotary evaporator. The polymer was finally vacuum dried at room temperature. SEC analysis of the purified polymer revealed Mn=1,985 g/mol.

The pre-formed tert-chloride-terminated PIB described above was quenched with 1-(2-bromoethyl)pyrrole at −70° C. within a dry nitrogen atmosphere glove box equipped with an integral, cryostated hexane/heptane cold bath, according to the following procedure. Into a 75 mL culture tube equipped with a Teflon-lined cap were added 2.0 g of the tert-chloride-terminated PIB (Mn=1,985 g/mol, 0.037 M), 10 mL of $CH_3Cl$, and 15 mL of n-hexane. The mixture was cooled to −70° C. and homogenized by periodically swirling. Then, 0.33 mL (0.57 g, 0.110 M) of $TiCl_4$ was charged to the reactor, followed by a pre-chilled solution of PyBr, prepared by dissolving 0.25 mL PyBr (0.37 g, 2.1 mmol) into a mixture of 6 mL of hexane and 4 mL $CH_3Cl$, was added to the polymerization system. The relevant concentrations during quenching were thus: [PyBr]=0.056 M; [CE]=0.027 M; [$TiCl_4$]=0.080 M. PyBr was allowed to react with the living chain ends for 10 min, at which time the reaction was quenched by addition of prechilled methanol. Subsequently, $CH_3Cl$ was evaporated; the polymer was dissolved in hexane and washed with methanol and then precipitated one time into methanol from hexane in order to remove excess of PyBr. The precipitated was collected by dissolution in hexane; the solution was concentrated on a rotavap, and the polymer was finally vacuum dried at room temperature.

$^1H$ NMR analysis of the resulting polymer indicated quantitative end-functionalization and formation of principally 3-PIB-1-(2-bromoethyl)pyrrole with a minor amount of 2-PIB-1-(2-bromoethyl)pyrrole. Quantitative functionalization was indicated by complete disappearance of the tert-chloride peaks at 1.96 ppm and 1.68 ppm and appearance of two triplets of equal area, centered at 3.52 and 4.19 ppm, which represent the methylene groups bonded to the bromine and nitrogen atoms, respectively, of the 3-PIB isomer. Methylene signals for the 2-PIB-isomer also appeared centered at 3.58 and 4.31 ppm. The signals for the pyrrole ring protons and the PIB ultimate methylene protons were present and exhibited the same pattern observed for the product obtained with the PyBr quencher in the previous examples above. No olefin was detected.

Example 12

Synthesis of Primary Azide-Terminated PIB through Post-Polymerization Reaction of Primary Chloride-Terminated PIB with Sodium Azide Monofunctional primary chloride-terminated PIB was prepared within a dry nitrogen atmosphere glovebox, equipped with an integral, cryostated hexane/heptane bath, according to the following procedure. Into a round-bottom flask equipped with a mechanical stirrer, infrared probe, and thermocouple were added 340 mL of $CH_3Cl$, 510 mL of n-hexane, and 0.33 mL (0.30 g, $3.1\times10^{-3}$ M) of 2,6-lutidine. The mixture was allowed to equilibrate to −70° C. and then IB, 47.5 mL (33.2 g, 0.65 M) was charged to the reactor. After thermal equilibration, 2.47 mL (2.16 g, 0.016 M) of TMPCl was added to the reactor. To begin the polymerization, 4.79 mL (8.28 g, 0.048 M) of $TiCl_4$ was charged to the reactor. The reaction was allowed to proceed for 34 min, and then a pre-chilled solution of PyCl, prepared by dissolving 3.77 mL PyCl (4.26 g, 32.9 mmol) into 25 mL of hexane/$CH_3Cl$ (60/40, v/v, −70° C.), was added to the polymerization system. PyCl was allowed to react with the living chain ends for 30 min. Finally, the reaction was quenched by addition of excess prechilled methanol. Subsequently, the polymer was dissolved in hexane and washed with methanol and then precipitated one time into methanol from hexane. The precipitate was collected by dissolution in hexane; the solution was washed with water, dried over $MgSO_4$, and concentrated on a rotary evaporator. The polymer was finally vacuum dried at room temperature. SEC analysis of the purified polymer revealed Mn=2,660 g/mol.

The pre-formed primary chloride-terminated PIB described above (mixture of 2 and 3 isomers) was reacted with sodium azide under a dry nitrogen atmosphere in a flask according to the following procedure. 1-(2-Chloroethyl)pyrrole-PIB (Mn=2,660 g/mol, 10 g, 3.76 mmol) was dissolved in 22.1 mL of dry heptane in a flask, and then sodium azide (0.729 g, 11.21 mmol) in 22.1 mL of dry DMF was added. The resulting biphasic mixture was stirred and heated to 90° C., and the reaction was allowed to proceed for 24 h. During the course of reaction, the formerly biphasic mixture became monophasic. At the end of the reaction, upon cooling, a biphasic mixture was again observed, and the heptane and DMF layers were separated. The heptane phase was washed with methanol, and precipitated into methanol. The precipitate was collected by dissolution in hexane and precipitated a second time into methanol. The precipitate was again collected by dissolution into hexane, and the solution was concentrated on a rotary evaporator, and the polymer was finally vacuum dried at room temperature.

Figure 16:
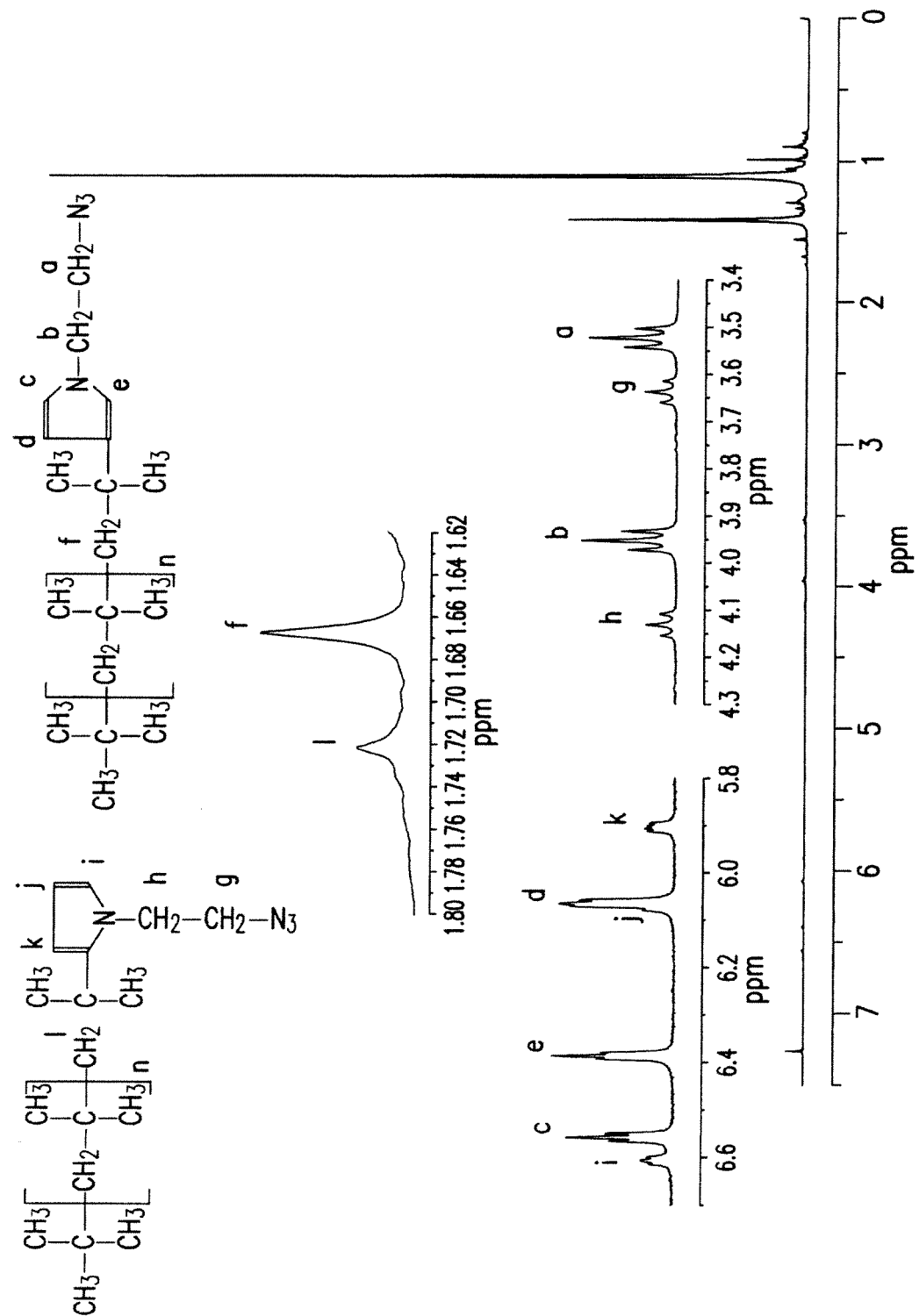
FIG. 16 shows the $^1$H NMR spectrum of monofunctional 1-(2-azidoethyl)pyrrole-PIB (mixed 2- and 3-isomers) obtained by post-polymerization replacement of chloride by azide ion.

FIG. 16 shows the $^1H$ NMR spectrum of the resulting polymer with peak assignments. Addition of the azide was indicated by the disappearance of the peaks at 3.69 (3-PIB-Py-$CH_2$—$CH_2$—Cl), 3.73 (2-PIB-Py-$CH_2$—$CH_2$—Cl), 4.11 (3-PIB-Py-$CH_2$—$CH_2$—Cl), and 4.27 ppm (2-PIB-Py-$CH_2$—$CH_2$—Cl) and appearance of new peaks at 3.52 and 3.95 ppm (3-isomer, major) and 3.64 and 4.13 ppm (2-isomer, minor) due to presence of the 1-(2-azidoethyl)pyrrole moieties at the chain ends.

Example 13

Synthesis of Monofunctional Primary Cyanide-Terminated PIB through In Situ Quenching of Quasiliving PIB with 1-(2-cyanoethyl)pyrrole (PyCN)

Quasiliving polymerization of IB with TMPCl as initiator was carried out within a dry nitrogen atmosphere glovebox, equipped with an integral, cryostated hexane/heptane bath according to the following procedure. Into a round-bottom flask equipped with a mechanical stirrer, infrared probe, and thermocouple were added 99.6 mL of $CH_3Cl$, 66.4 mL of n-hexane, and 0.062 mL (0.058 g, 0.54 mmol) of 2,6-lutidine, and then the mixture was equilibrated to −70° C. IB, 11.3 mL (7.87 g, 140.4 mmol), was charged to the reactor. After 10 min of stirring 0.61 mL (0.53 g, 3.6 mmol) of TMPCl was transferred to the reactor. After 5 min of stirring, 0.32 mL (0.55 g, 2.91 mmol) of $TiCl_4$ was transferred to the reactor by a needle. The reaction was allowed to proceed for 40 min. Then, a pre-chilled slurry of PyCN, prepared by dispersing 1.23 mL PyCN (1.29 g, 10.7 mmol) into a mixture of 10 mL of hexane and 15 mL $CH_3Cl$, was added, followed by an additional 1.65 mL (1.29 g, 10.7 mmol) $TiCl_4$. The relevant concentrations during quenching were thus: [PyCN]=0.052 M; [CE]=0.017 M; [$TiCl_4$]=0.087 M. PyCN was allowed to react with the living chain ends for 40 min. Finally, the reaction was quenched by addition of prechilled methanol. Subsequently, the polymer was dissolved in hexane and washed with methanol and then precipitated one time into methanol from hexane. The precipitate was collected by dissolution in hexane, the solution was concentrated on a rotary evaporator, and the polymer was finally vacuum dried at room temperature.

Figure 17:
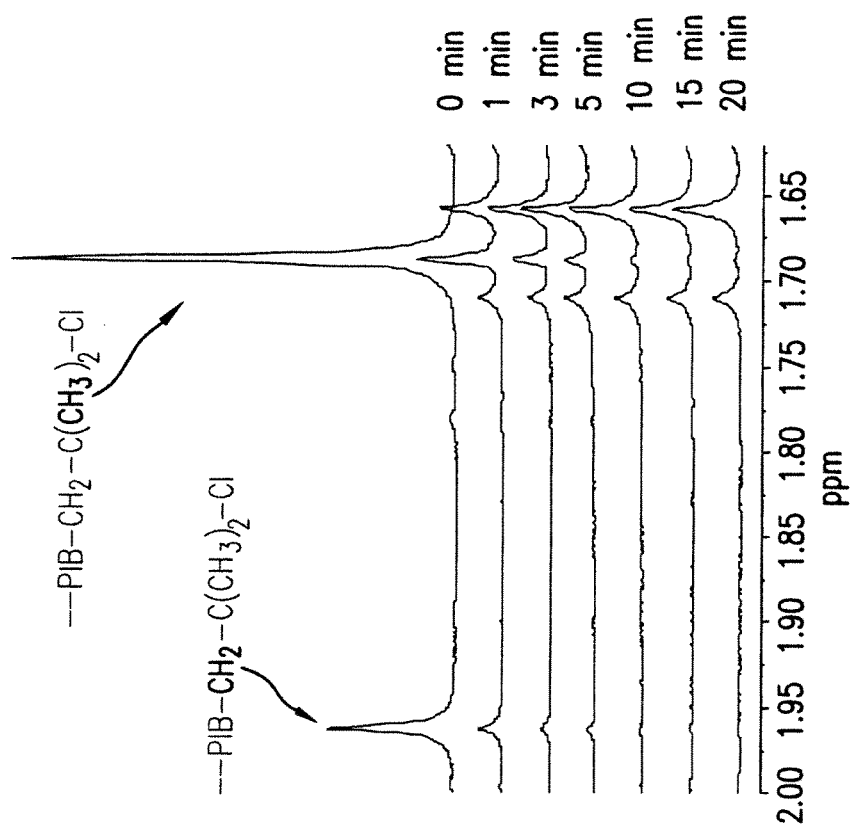
FIG. 17 shows partial $^1$H NMR spectra of the reaction product of monofunctional quasiliving PIB with 1-(2-cyanoethyl)pyrrole, as a function of time.

FIG. 17 shows the partial $^1H$ NMR spectra of aliquots removed from the reactor at various times. The progress of quenching by 1-(2-cyanoethyl)pyrrole can be observed by the disappearance of the methyl protons (1.68 ppm) and the methylene protons (1.96 ppm) adjacent to the terminal tert-chloride groups of the quasiliving PIB precursor. Functionalization was complete within 20 min.

Example 14

Synthesis of Difunctional Primary Cyanide-Terminated PIB through In Situ Quenching of Quasiliving PIB with 1-(2-cyanoethyl)pyrrole Quasiliving polymerization of IB with bDCC as initiator was carried out within a dry nitrogen atmosphere glovebox, equipped with an integral, cryostated hexane/heptane bath according to the following procedure. Into a round-bottom flask equipped with a mechanical stirrer, infrared probe, and thermocouple were added 99.6 mL of $CH_3Cl$, 66.4 mL of n-hexane, and 0.062 mL (0.057 g, $3.0\times10^{-3}$ M) of 2,6-lutidine. The mixture was allowed to equilibrate to −70° C. and then IB, 11.3 mL (7.89 g, 0.79 M), was charged to the reactor. After thermal equilibration, 0.517 g (1.80 mmol) of bDCC was added to the reactor. To begin the polymerization, 0.32 mL (0.55 g, 0.016 M) of $TiCl_4$ was charged to the reactor. The reaction was allowed to proceed for 49 min. Then, a pre-chilled slurry of PyCN, prepared by dispersing 1.23 mL (1.29 g, 10.7 mmol) of PyCN into a mixture of 10 mL of hexane and 15 mL $CH_3Cl$, was added, followed by an additional 1.65 mL (2.85 g, 15.0 mmol) $TiCl_4$. The relevant concentrations during quenching were thus: [PyCN]=0.052 M; [CE]=0.017 M; [$TiCl_4$]=0.087 M. PyCN was allowed to react with the living chain ends for 5 h. Finally, the reaction was quenched by addition of prechilled methanol. Subsequently, the polymer was dissolved in hexane and washed with methanol and then precipitated one time into methanol from hexane. The precipitate was collected by dissolution in hexane, the solution was concentrated on a rotary evaporator, and the polymer was finally vacuum dried at room temperature.

Figure 18:
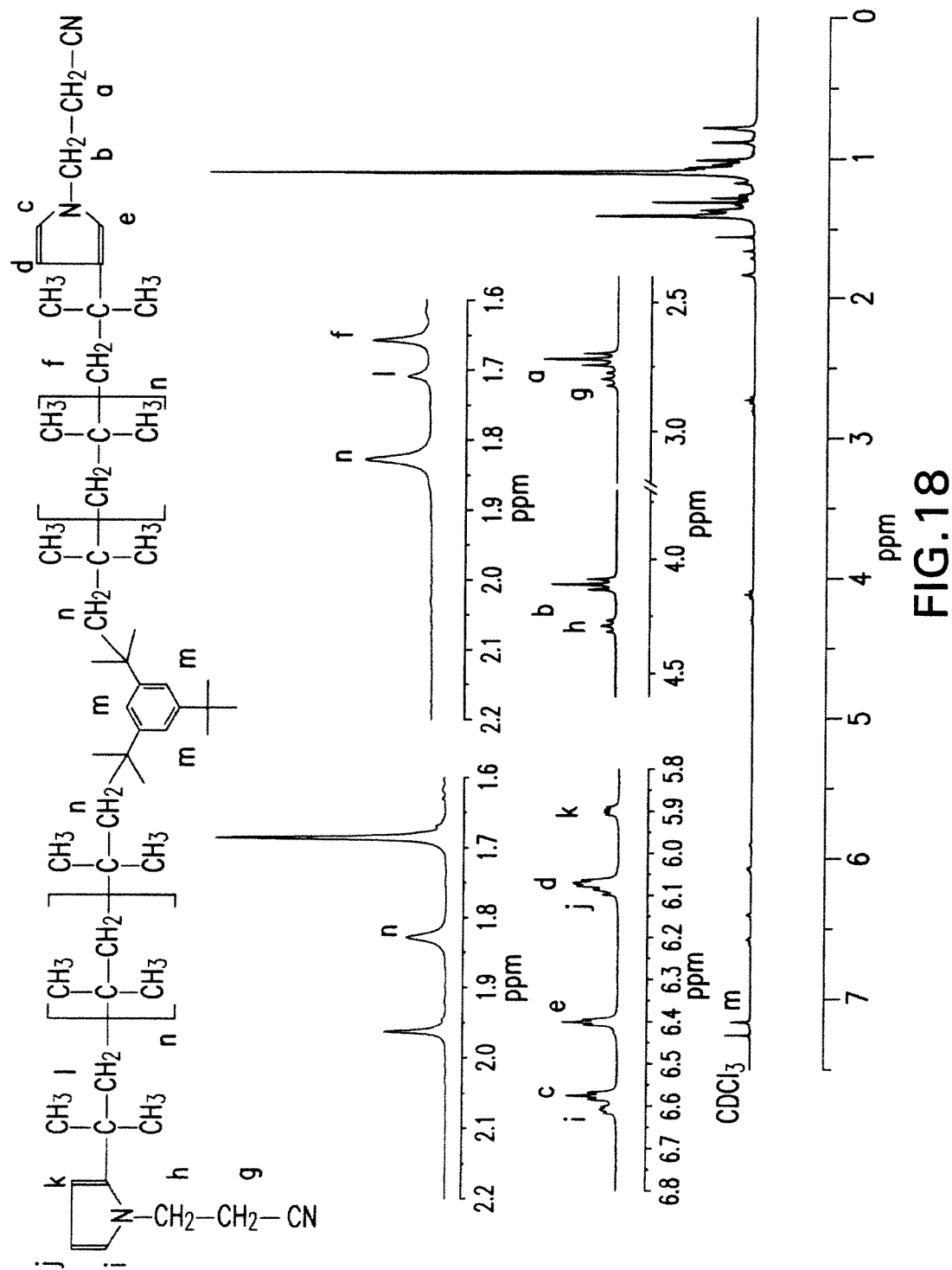
FIG. 18 shows the $^1$H NMR spectrum of monofunctional PIB carrying primary cyanide end groups prepared by quenching quasiliving PIB with 1-(2-cyanoethyl)pyrrole. The product is a mixture of major and minor isomers with PIB in the 3- and 2-positions of the pyrrole ring, respectively. An expansion of the 1.6-2.2 region, before and after quenching, shows the complete consumption of tert-chloride end groups.

FIG. 18 shows the $^1H$ NMR spectrum of the resulting polymer with peak assignments. Addition of the capping agent was indicated by the disappearance of the peaks at 1.96 ppm (—PIB—$CH_2$—$C(CH_3)_2$—Cl) and 1.68 ppm (—PIB—$CH_2$—$C(CH_3)_2$—Cl) and appearance of new peaks at 1.66, 2.72, 4.11, 6.07, 6.40 and 6.57 ppm (3-isomer, major) and 1.71, 2.80, 4.29, 5.90, 6.10 and 6.60 ppm (2-isomer, minor) due to presence of the 1-(2-cyanoethyl)pyrrole moieties at the chain ends.

Figure 19:
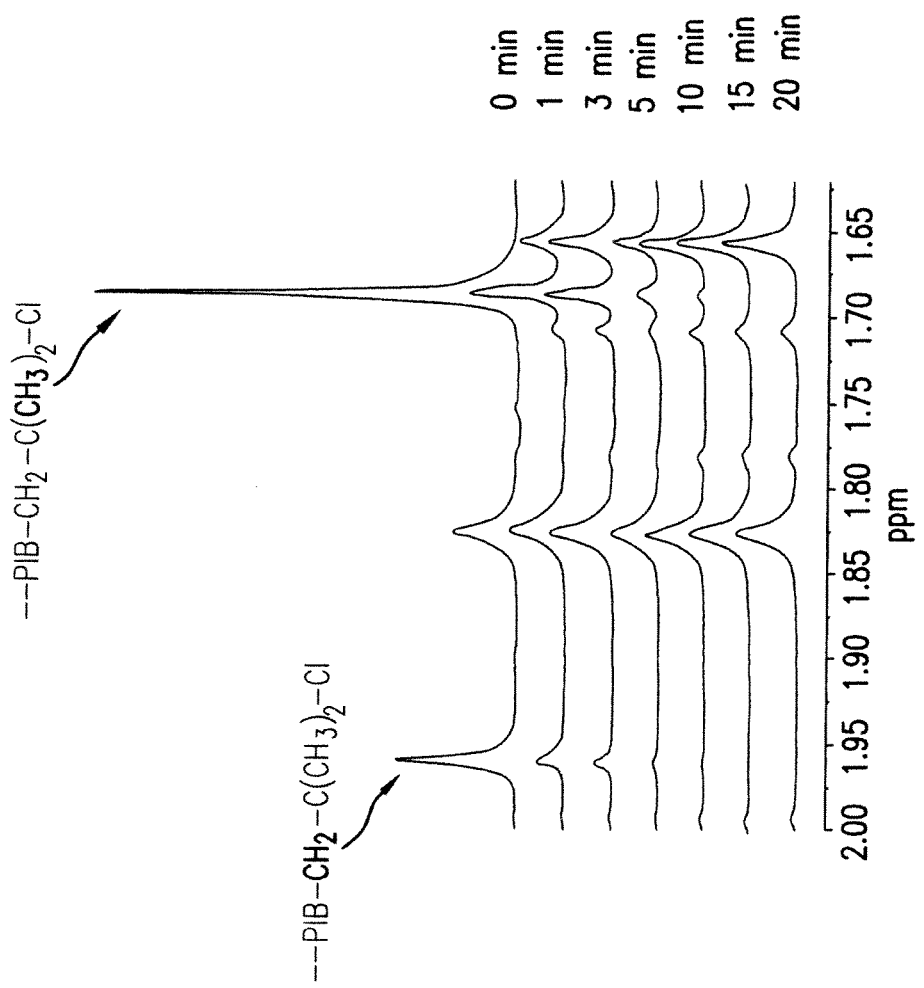
FIG. 19 shows partial $^1$H NMR spectra of the reaction product of difunctional quasiliving PIB with 1-(2-cyanoethyl)pyrrole, as a function of time.

FIG. 19 shows the partial $^1$H NMR spectra of aliquots removed from the reactor at various times. The progress of quenching by 1-(2-cyanoethyl)pyrrole can be observed by the disappearance of the methyl protons (1.68 ppm) and the methylene protons (1.96 ppm) adjacent to the terminal tert-chloride groups of the quasiliving PIB precursor. Functionalization was complete within 20 min.

Figure 20:
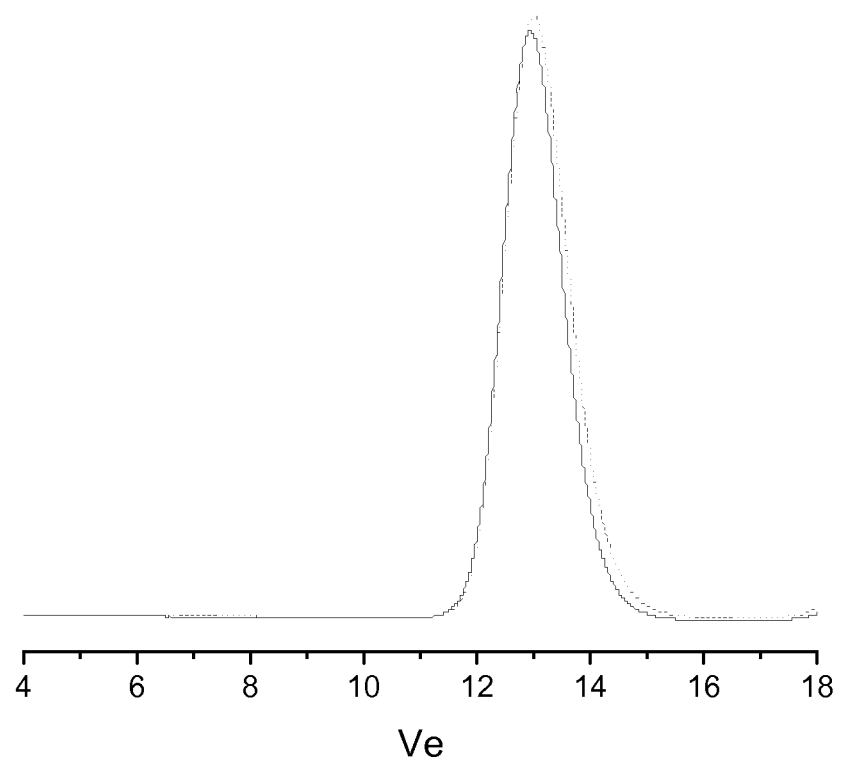
FIG. 20 shows GPC traces of difunctional PIB before (dotted) and after (solid) reaction with 1-(2-cyanoethyl)pyrrole.

The GPC traces of the PIB prior to and after end-capping were essentially the same, indicating the absence of any coupling reactions or polymer degradation (FIG. 20).

The aromatic initiator residue from bDCC provided an internal reference for quantification of end group functionality by $^1$H NMR. Thus, various end group resonance areas were integrated and compared to the integrated area of the aromatic protons (m) in FIG. 18. As shown in Table 4, the results indicated essentially quantitative functionalization of the chain ends. For example, integration of the methylene protons adjacent to the cyano group (h+b) and to the nitrogen of the pyrrole ring (g+a) yielded percent end group functionality of 103 and 104%. Integration of the various pyrrole ring hydrogens yielded 96% end group functionality. Integration of the b protons (—CH$_2$—CH$_2$—CN of the 3-isomer) yielded the fraction of 3 isomer [b/(h+b)] as 0.71; likewise integration of the H2 proton of the 3 isomer (e) yielded the fraction of 3 isomer [e/(k+e)] as 0.70.

TABLE 4

| Peak | Peak Description | Protons | Experimental Integration | Theoretical Integration | End Group Functionality % |
|---|---|---|---|---|---|
| m | bDCC residue | 3 | — | 1.0 | — |
| h + b | —CH$_2$—CH$_2$—CN (2 and 3 isomer) | 4 | 1.37 | 1.333 | 103 |
| g + a | —CH$_2$—CH$_2$—CN (2 and 3 isomer) | 4 | 1.39 | 1.333 | 104 |
| i + c | H5-pyrrole ring (2 and 3 isomer) | 2 | 0.64 | 0.667 | 96 |
| j + d | H4-pyrrole ring (2 and 3 isomer) | 2 | 0.64 | 0.667 | 96 |
| e + k | H2-pyrrole ring (3 isomer) H3-pyrrole ring (2 isomer) | 2 | 0.64 | 0.667 | 96 |

Example 15

Synthesis of Difunctional Primary Azide-Terminated PIB through Reaction of Di-tert-Chloride-Terminated PIB with 1-(2-Azidoethyl)pyrrole in the Presence of TiCl$_4$ 1-(2-Azidoethyl)pyrrole was prepared by reaction of excess NaN$_3$ with 1-(2-bromoethyl)pyrrole in a 50/50 (v/v) heptane/dimethylformamide mixture at 90° C. for 24 h.

The following procedure was carried out under a dry nitrogen atmosphere within a glove box equipped with a thermostatically controlled hexane/heptane cold bath set to −70° C. Into a 75 mL culture tube equipped with a Teflon-lined cap were added 0.53 g of pre-formed, difunctional tert-chloride-terminated PIB (Mn=2,099 g/mol, 0.019 M tert-Cl end groups), 10 mL of CH$_3$Cl, 15 mL of n-hexane, and 0.008 mL (0.007 g, 2.6×10$^{−3}$ M) of 2,6 lutidine. The mixture was cooled to −70° C. and homogenized by periodically swirling. Then, 0.55 mL (0.95 g, 0.192 M) of TiCl$_4$ was transferred to the reactor, followed by a pre-chilled solution of 1-(2-azidoethyl)pyrrole (PyAz), prepared by dissolving 0.123 g (1.0 mmol) PyAz into 15 mL of n-hexane and 10 mL of CH$_3$Cl. The relevant concentrations during quenching were thus: [PyAz]=0.052 M; [CE]=0.010 M; [TiCl$_4$]=0.098 M. PyAz was allowed to react with the living chain ends for 10 min, at which time the reaction was quenched by addition of pre-chilled methanol. Subsequently, CH$_3$Cl was evaporated; the polymer was dissolved in hexane and washed with methanol and then precipitated one time into methanol from hexane in order to remove excess of PyAz. The precipitated was collected by dissolution in hexane; the solution was concentrated on a rotavap, and the polymer was finally vacuum dried at 40° C.

Figure 21:
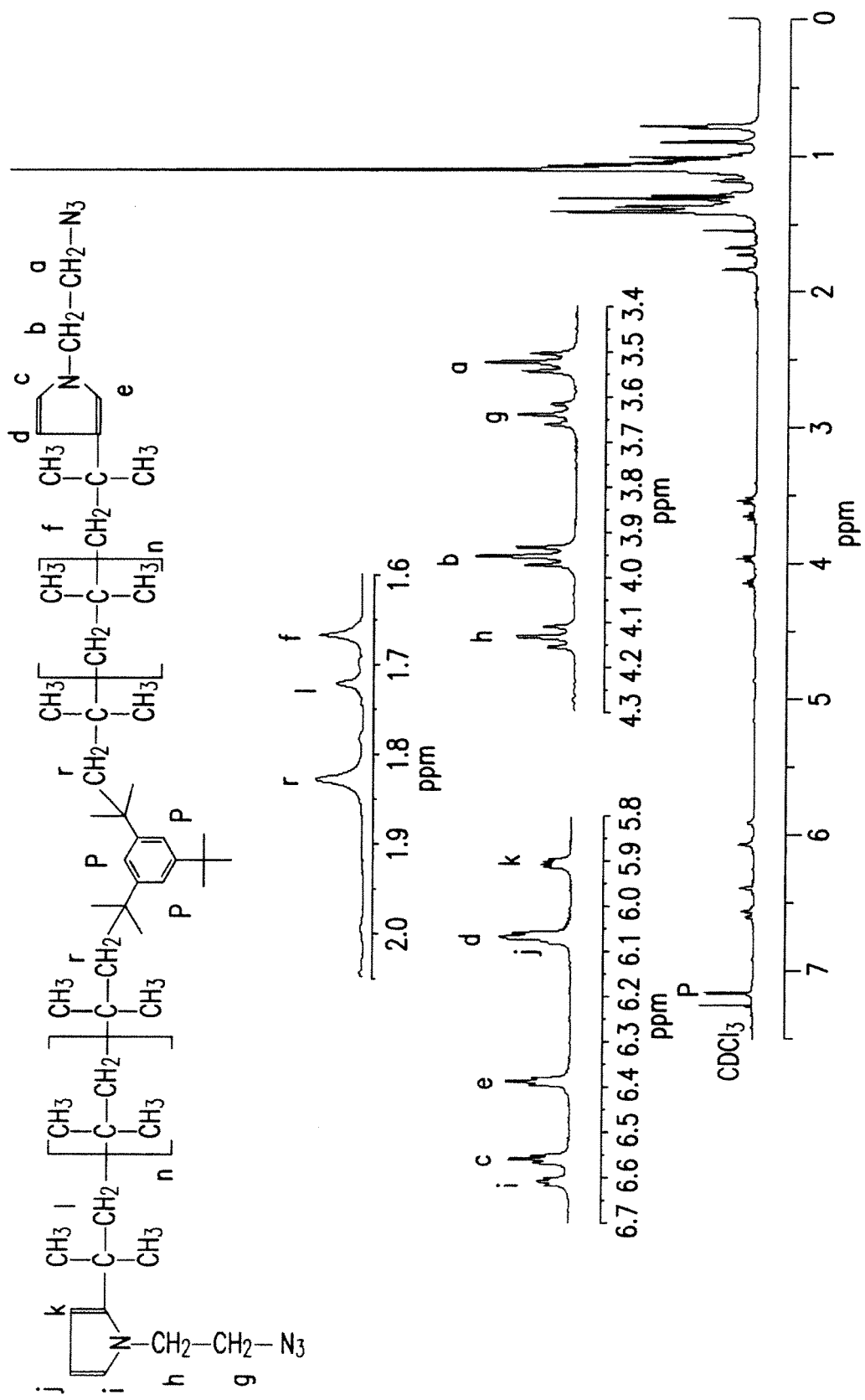
FIG. 21 shows the $^1$H NMR spectrum of difunctional PIB carrying primary cyanide end groups prepared by reaction of tert-chloride-terminated PIB with 1-(2-azidoethyl)pyrrole in the presence of TiCl$_4$. The product is a mixture of major and minor isomers with PIB in the 3- and 2-positions of the pyrrole ring, respectively.

FIG. 21 shows the $^1$H NMR spectrum of the resulting polymer with peak assignments. Addition of the capping agent was indicated by the disappearance of the tert-chloride peaks at 1.96 and 1.68 ppm and appearance of new peaks at 1.67, 3.52, 3.95, 6.07, 6.40 and 6.57 ppm (3-isomer, major) and 1.72, 3.64, 4.13, 5.90, 6.10 and 6.60 ppm (2-isomer, minor) due to presence of the 1-(2-azidoethyl)pyrrole moieties at the chain ends.

Figure 22:
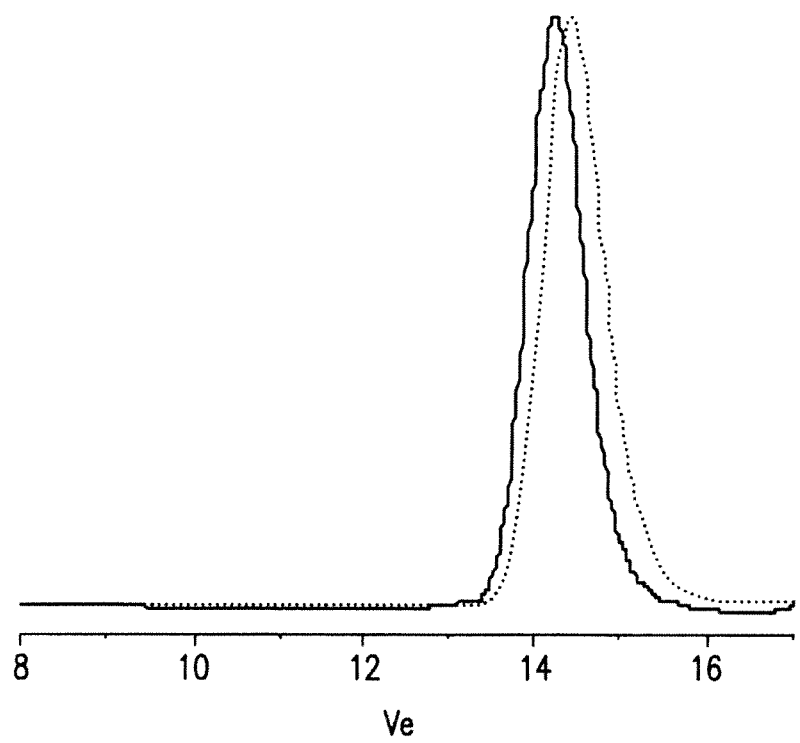
FIG. 22 shows GPC traces of difunctional PIB before (dotted) and after (solid) reaction with 1-(2-azidoethyl)pyrrole.

The GPC traces of the PIB prior to and after end-capping were essentially the same, indicating the absence of any coupling reactions or polymer degradation (FIG. 22).

Peak integration analysis (Table 5) indicated high functionalization of the chain ends. Integration of the methylene protons adjacent to the azido group (h+b) and to the nitrogen of the pyrrole ring (g+a) yielded percent end group functionality of 98-99%. Integration of the b protons (—CH$_2$—CH$_2$—N$_3$ of the 3-isomer) yielded the fraction of 3 isomer [b/(h+b)] as 0.62; likewise integration of the H2 proton of the 3 isomer (e) yielded the fraction of 3 isomer [e/(k+e)] as 0.61. Functionalization with azido groups was not perfectly quantitative due to the presence of mixed exo/endo olefins, estimated to be about 1-2%.

TABLE 5

| Peak | Peak Description | Protons | Experimental Integration | Theoretical Integration | End Group Functionality % |
|---|---|---|---|---|---|
| m | bDCC residue | 3 | — | 1.0 | — |
| h + b | —CH$_2$—CH$_2$—N$_3$ (2 and 3 isomer) | 4 | 1.31 | 1.333 | 98 |
| g + a | —CH$_2$—CH$_2$—N$_3$ (2 and 3 isomer) | 4 | 1.32 | 1.333 | 99 |

Example 16

Synthesis of Amine-Terminated PIB via Reduction of the Product of Example 12 (Azide-Terminated PIB) with Hydrogen in the Presence of a Palladium Catalyst A solution prepared from the product of Example 12, 1-(2-azidoethyl)pyrrole-PIB (0.5 g, 0.2 mmol) and tetrahydrofuran (60 mL) and containing 0.055 g of 10% palladium on charcoal was hydrogenated at 35 psi for 19 h on a Parr low-pressure hydrogenator. The mixture was filtered under a nitrogen blanket through Celite and the product was concentrated by rotary evaporation of the solvent.

$^1$H NMR analysis of the product, 1-(2-aminoethyl)pyrrole-PIB, indicated that the conversion of azide to amine was complete after 19 h reduction time. The methylene protons of the ethylene bridge were used to monitor reaction conversion.

In the amine product, the methylene protons adjacent to pyrrole were observed at 4.1 (2-isomer, minor) and 3.8 (3-isomer, major), and the methylene protons adjacent to the amine group were observed at 3.1 (2-isomer, minor) and 3.0 (3-isomer, major). No residual resonances due to azide-PIB were observed.

Example 17

Synthesis of Amine-Terminated PIB via the Reduction of 1-(2-Cyanoethyl)pyrrole-PIB with Borane To a solution prepared from 1-(2-cyanoethyl)pyrrole-PIB (29.6 g, 11.9 mmol) and tetrahydrofuran (90 mL) was added a solution of borane-dimethyl sulfide (1.18 mL, 12.5 mmol borane) dropwise via syringe. The mixture was stirred at 65° C. for 15 h and then allowed to cool to room temperature. A solution of 4.0 M sodium hydroxide (20 mL) was added at a slow dropwise pace to the reaction mixture, which was chilled to 5° C. by ice water bath. The mixture was then refluxed at 65° C. for 12 h. Once cooled to room temperature, hexane was added and the organic layer was washed with water and brine (3×20 mL). The organic layer was dried over magnesium sulfate and filtered, and the solvent removed to yield the final product (yield 22.2 g).

Proton NMR analysis of the product, 1-(3-aminopropyl) pyrrole-PIB, indicated that the conversion of the cyano group to amine was complete after the allotted reaction time. Reaction conversion was monitored by observing the disappearance of the methylene protons of the ethylene tether of the reactant and the appearance of the methylene protons of the 1,3-propylene tether of the product. In the amine product, the methylene protons adjacent to pyrrole were observed at 4.0 (2-isomer, minor) and 3.8 ppm (3-isomer, major), and the new methylene protons adjacent to the amine group were observed at 2.8 (2-isomer, minor) and 2.7 ppm (3-isomer, major). The central methylene protons (2-position of the 1,3-propylene tether) of the two isomers were observed as multiplets with chemical shifts between 1.8 and 2.0. No residual chemical shifts assigned to cyano-PIB were observed.

Example 18

Synthesis of 1-(2-Anilinoethyl)pyrrole-PIB via Reaction of the Product of Example 7 (1-(2-bromoethyl)pyrrole-PIB) with Aniline To a solution prepared from the product of Example 7,1-(2-bromoethyl)pyrrole-PIB (10.8 g, 4.5 mmol), and anisole (60 mL) were added aniline (12.3 mL, 135.0 mmol) and N,N-diisopropylethylamine (7.84 mL, 45 mmol) via syringe. The mixture was stirred at 130° C. with aliquots taken periodically to check the reaction progress. Substitution of the terminal bromide by aniline was complete after 44 h. The solution was stripped under vacuum to yield the crude product (11.64 g). The crude product was dissolved in hexane (125 mL) and washed with a 50:50 (v:v) solution of methanol:water. The organic solution was dried over magnesium sulfate, and the product was concentrated on a rotary evaporator (yield 10.14 g).

Proton NMR analysis of the product, 1-(2-anilinoethyl) pyrrole-PIB, indicated that the conversion of the bromide group to amine was complete after 44 h. The methylene protons of the ethylene tether were used to monitor reaction conversion. In the product, the methylene protons adjacent to pyrrole were observed at 4.2 (2-isomer, minor) and 4.05 ppm (3-isomer, major), and the methylene protons adjacent to the aniline moiety were observed at 3.55 (2-isomer, minor) and 3.45 ppm (3-isomer, major). No residual resonances due to bromoethyl-PIB were observed.

Example 19

Soot Dispersancy Results

Soot dispersancy tests were also carried out on Examples 17 and 18, as well as Comparative Example A at different dosages in the soot thickening bench test. The details of this test are described in U.S. Pat. No. 5,716,912, the entire contents of which are incorporated by reference herein. In the soot thickening bench test, the kinematic viscosity of an oil is measured before and after the introduction of homogeneously dispersed carbon black. Since carbon black is known to agglomerate, this normally causes an increase in the kinematic viscosity of the oil. An additive that is effective in preventing the agglomeration of carbon black will generally perform well at soot dispersancy. Consequently, an additive that gives a lower viscosity increase in the presence of carbon black is expected to perform better than an additive that gives a higher viscosity increase in the presence of carbon black. Table 6 lists the results of the soot thickening bench tests; for reference, the result for the baseline oil containing no additive is also listed.

TABLE 6

| Example | Dosage (wt. %) | % Viscosity Increase |
|---|---|---|
| Baseline (No dispersant) | 0 | 280.0 |
| 17 | 2 | 219.4 |
|  | 6 | 220.4 |
| 18 | 2 | 243.4 |
|  | 6 | 239.3 |
| A | 2 | 273.8 |
|  | 6 | 282.3 |

The results of the soot thickening bench test indicate that the percent viscosity increase using the PIB-amines of Examples 17 and 18 was lower than the percent viscosity increase in a formulated oil that does not contain any dispersant (Baseline). Furthermore, the viscosity increase in oils containing either Examples 17 or 18 is lower than that of Comparative Example A, indicating that Examples 17 and 18 display better dispersancy. This test indicates that the PIB-amines of Examples 17 and 18 have good dispersant properties.

While the subject matter described herein has been described with reference to specific embodiments, this application is intended to cover those various changes and substitutions that may be made by those skilled in the art without departing from the spirit and scope of the appended claims.

Comparative Example A

Synthesis of Monofunctional N-methylpyrrole-PIB via the In Situ Quenching of Quasiliving PIB with N-methylpyrrole Monofunctional PIB terminated with N-methylpyrrole was produced according to the method described in U.S. Pat. No. 6,969,744. Quasiliving polymerization of IB with TMPCl as initiator was carried out within a dry nitrogen atmosphere glovebox, equipped with an integral, cryostated hexane/heptane bath according to the following procedure.

Into a round-bottom flask equipped with a mechanical stirrer and thermocouple were added 513.0 mL of CH$_3$Cl, 557.0 mL of n-hexane, and 1.5 mL of 2,6-lutidine, and then the mixture was equilibrated to −60° C. IB, 212.7 mL (2.6 mol), was charged to the reactor. After 10 min of stirring 9.43 g, (0.063 mol) of TMPCl was transferred to the reactor. After 5 min of stirring, 4.87 mL (0.044 mol) of TiCl$_4$ was transferred to the reactor. The reaction was allowed to proceed for 66 min at which time the solution was separated into 2 equal volume aliquots. After 8 min (74 min total polymerization time), 4.2 mL (0.048 mol) N-methylpyrrole and then 8.7 mL (0.079 mol) TiCl$_4$ were charged to one of the aliquots. This solution was allowed to react for 50 min, after which time the reaction was terminated with 45 ml methanol (equilibrated at −60° C.). The solution was removed from the glove box, and the volatile components were allowed sufficient time to evaporate under ambient conditions. Subsequently, the PIB-hexane solution was washed with a dilute HCl solution followed by deionized water, and then dried over magnesium sulfate. The solids were filtered and the PIB was concentrated via a rotary evaporator.

$^1$H NMR spectroscopy indicated that all of the PIB chain ends were terminated with N-methylpyrrole moieties (mixture of 2 and 3 isomers). Integration of the resonances due to the N-methyl substituent indicated that the 3:2 isomer ratio was approximately 55:45.

What is claimed is:

1. A method for preparing a telechelic polymer of formula I:

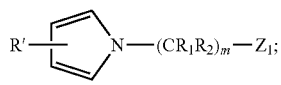

formula I wherein:
R$_1$ and R$_2$ are independently in each —(CR$_1$R$_2$)— unit, hydrogen or alkyl from 1 to 6 carbon atoms;
m is an integer from 2 to 20;
Z$_1$ is —F, —Cl, —Br, —I, —At, —CN, —NC, —N$_3$, —NCO, —OCN, —NCS, or —SCN; and
R' is a monovalent polyolefin group;

comprising:
a) ionizing a polyolefin in the presence of a Lewis acid or mixture of Lewis acids to form a carbocation-terminated polyolefin; and
b) reacting the carbocation-terminated polyolefin from step (a) with an N-substituted pyrrole of formula II:

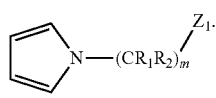

formula II

2. The method of claim 1, wherein R$_1$ and R$_2$ are both hydrogen.
3. The method of claim 1, wherein m is an integer from 2-6.
4. The method of claim 1, wherein m is 2 or 3.
5. The method of claim 1, wherein Z$_1$ is —Cl, —Br, —CN, or —N$_3$.
6. The method of claim 1, wherein the N-substituted pyrrole of formula II is

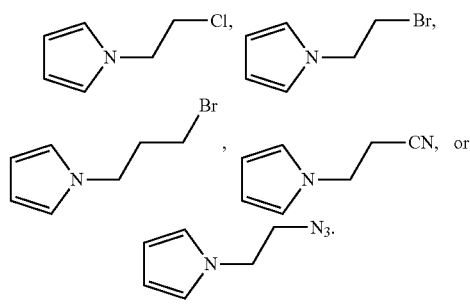

7. The method of claim 1, wherein the telechelic polymer of formula I is

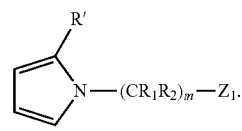

8. The method of claim 1, wherein the telechelic polymer of formula I is

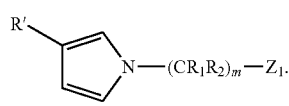

9. The method of claim 1, wherein R' is a polyisobutyl group.

10. A method for preparing a telechelic polymer of the formula:

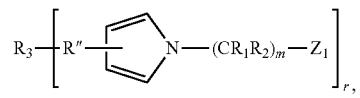

wherein:
R$_1$ and R$_2$ are independently in each —(CR$_1$R$_2$)— unit, hydrogen or alkyl from 1 to 6 carbon atoms;
m is an integer from 2 to 20;
Z$_1$ is —F, —Cl, —Br, —I, —At, —CN, —NC, —N$_3$, —NCO, —OCN, —NCS, or —SCN;
R" is a divalent polyolefin group: and
R$_3$ is a monofunctional or polyfunctional carbocationic initiator residue of functionality r, wherein r is an integer from 1 to 8;

comprising:
a) ionizing a polyolefin in the presence of a Lewis acid or mixture of Lewis acids to form a carbocation-terminated polyolefin; and
b) reacting the carbocation-terminated polyolefin from step (a) with an N-substituted pyrrole of formula II:

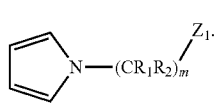

formula II

11. The method of claim 10, wherein R" is a polyisobutylene group.

12. The method of claim 10, wherein r is 2.

13. The method of claim 10, wherein the ionized polyolefin is a quasiliving carbocationic polyolefin and the method is performed under quasiliving carbocationic polymerization conditions.

14. The method of claim 13, wherein the quasiliving carbocationic polyolefin is prepared by adding a Lewis acid and a monomer to an initiator in the presence of an electron donor, common ion salt, or common ion salt precursor.

15. The method of claim 14, wherein the Lewis acid is a titanium tetrahalide or boron trihalide.

16. The method of claim 14, wherein the monomer is isobutylene.

17. The method of claim 1, further comprising:
reacting the telechelic polymer formed in claim 1 with a reagent or reagents to form a compound of formula III;

formula III

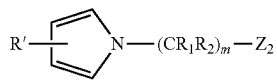

wherein:
$R_1$ and $R_2$ are, independently in each —$(CR_1R_2)$— unit, hydrogen or alkyl from 1 to 6 carbon atoms;
R' is a monovalent polyolefin group;
m is an integer from 2 to 20; and
$Z_2$ is —$NR_4R_5$, —$N[(R_4)(COR_5)]$, —$N[(COR_4)(COR_5)]$, polyamino, polyamidoamino, polyaminoamido, —$OR_6$, a polyether group, polyetheramino, or —$COOR_6$;
wherein:
$R_4$ and $R_5$ are each, independently, hydrogen, alkyl, or aryl; and
$R_6$ is hydrogen, alkyl, aryl, alkaryl, or aralkyl.

18. The method of claim 17, wherein $Z_2$ is —$NR_4R_5$.

19. The method of claim 18, wherein $R_4$ is hydrogen and $R_5$ is aryl.

20. The method of claim 18, wherein —$NR_4R_5$ is $NH_2$.

21. The method of claim 17, wherein the reagent is a nucleophile or reducing agent.

22. The method of claim 10, further comprising:
reacting the telechelic polymer formed in claim 10 with a reagent or reagents to form a compound of the formula:

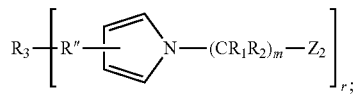

wherein:
$R_1$ and $R_2$ are, independently in each —$(CR_1R_2)$— unit, hydrogen or alkyl from 1 to 6 carbon atoms;
R" is a divalent polyolefin group;
$R_3$ is a monofunctional or polyfunctional carbocationic initiator residue of functionality r, wherein r is an integer from 1 to 8;
m is an integer from 2 to 20; and
$Z_2$ is —$NR_4R_5$, —$N[(R_4)(COR_5)]$, —$N[(COR_4)(COR_5)]$, polyamino, polyamidoamino, polyaminoamido, —$OR_6$, a polyether group, polyetheramino, or —$COOR_6$;
wherein:
$R_4$ and $R_5$ are each, independently, hydrogen, alkyl, or aryl; and
$R_6$ is hydrogen, alkyl, aryl, alkaryl, or aralkyl.

23. The method of claim 22, wherein R" is a polyisobutylene group.

24. The method of claim 22, wherein r is 2.

25. The product prepared by the method of claim 1.

26. The product prepared by the method of claim 17.

27. The method of claim 1, wherein the ionized polyolefin is a quasiliving carbocationic polyolefin and the method is performed under quasiliving carbocationic polymerization conditions.

28. The method of claim 10, wherein $R_1$ and $R_2$ are both hydrogen.

29. The method of claim 10, wherein m is an integer between 2-6.

30. The method of claim 10, wherein m is 2 or 3.

31. The method of claim 10, wherein $Z_1$ is —Cl, —Br, —CN, or —$N_3$.

32. The method of claim 10, wherein the N-substituted pyrrole of formula II is

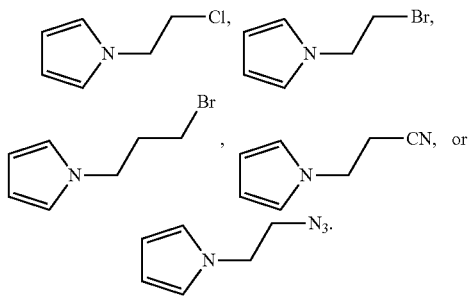

33. The method of claim 22, wherein $Z_2$ is —$NR_4R_5$.

34. The method of claim 33, wherein $R_4$ is hydrogen and $R_5$ is aryl.

35. The method of claim 22, wherein $Z_2$ is $NH_2$.

36. The method of claim 22, wherein the reagent is a nucleophile or reducing agent.

* * * * *